US010452857B2

(12) United States Patent
Taldo et al.

(10) Patent No.: US 10,452,857 B2
(45) Date of Patent: Oct. 22, 2019

(54) SYSTEMS AND METHODS FOR PROVIDING FILE LEVEL SECURITY

(71) Applicant: Cyber Reliant Corporation, Annapolis, MD (US)

(72) Inventors: Michael D. Taldo, Eldersburg, MD (US); John Michael Suit, Mount Airy, MD (US)

(73) Assignee: CYBER RELIANT CORPORATION, Annapolis, MD (US)

( * ) Notice: Subject to any disclaimer, the term of this patent is extended or adjusted under 35 U.S.C. 154(b) by 313 days.

(21) Appl. No.: 14/935,834

(22) Filed: Nov. 9, 2015

(65) Prior Publication Data

US 2016/0148013 A1    May 26, 2016

Related U.S. Application Data

(60) Provisional application No. 62/076,578, filed on Nov. 7, 2014.

(51) Int. Cl.
*G06F 21/62*    (2013.01)
*G06F 21/31*    (2013.01)

(52) U.S. Cl.
CPC .......... *G06F 21/6218* (2013.01); *G06F 21/31* (2013.01); *G06F 21/6227* (2013.01)

(58) Field of Classification Search
CPC .. G06F 21/62; G06F 21/6218; G06F 21/6227; G06F 21/31

USPC ................... 713/165, 150, 166, 167
See application file for complete search history.

(56) References Cited

U.S. PATENT DOCUMENTS 9,225,691 B1 * 12/2015 Balasubramanian ... G06F 21/00
2005/0152548 A1 * 7/2005 Wasilewski .......... H04N 7/1675
    380/216
2015/0356114 A1 * 12/2015 Smith .................... G06F 16/182
    707/756

* cited by examiner

*Primary Examiner* — Ashokkumar B Patel
*Assistant Examiner* — Quazi Farooqui
(74) *Attorney, Agent, or Firm* — Whiteford, Taylor & Preston, LLP; Gregory M. Stone

(57) ABSTRACT

Storage end points, whether they are local, remote, network, or cloud, such as DROPBOX and APPLE, present security issues for the general public and corporate consumers. These storage end points are not always encrypted. Even when the end user does perform encryption, the drawback to normal implementations is that the entirety of the file, the file key, and the key store are encrypted and stored in a single location. Computers can be hacked and encryption can be broken when given access and time. Disclosed is a system and method that enhances file level security by shredding the file, file pointers, and key store into parts, allowing the parts to be stored in different storage end points specified by the user.

16 Claims, 60 Drawing Sheets

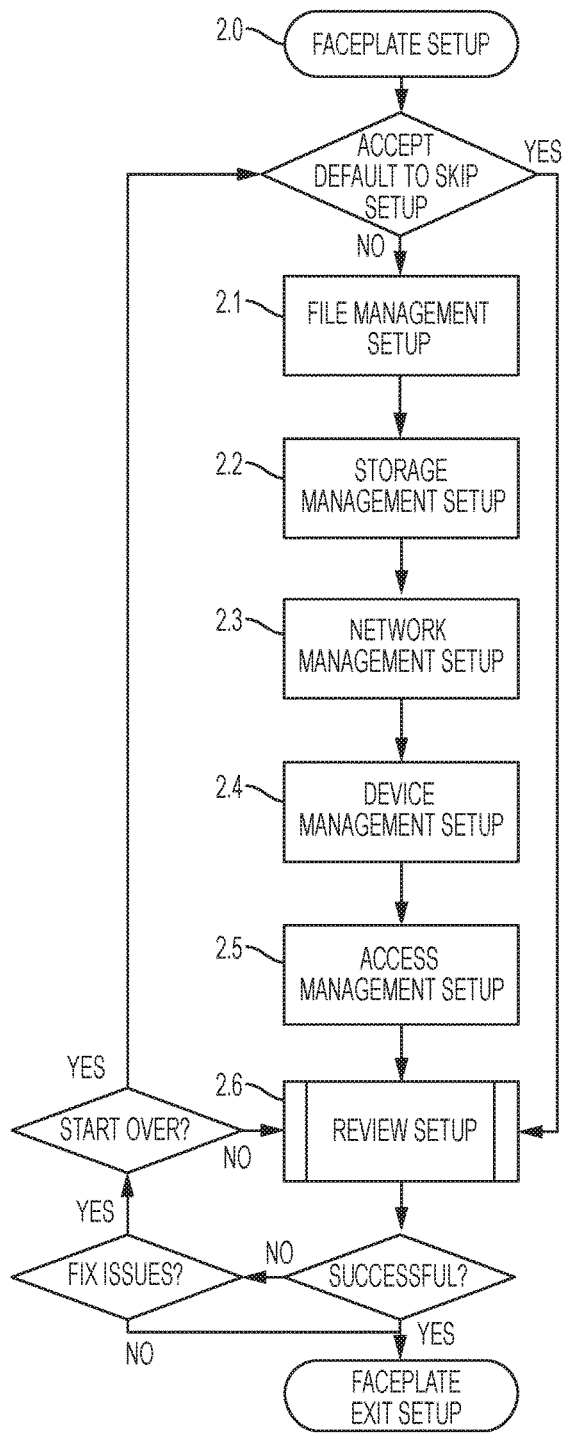
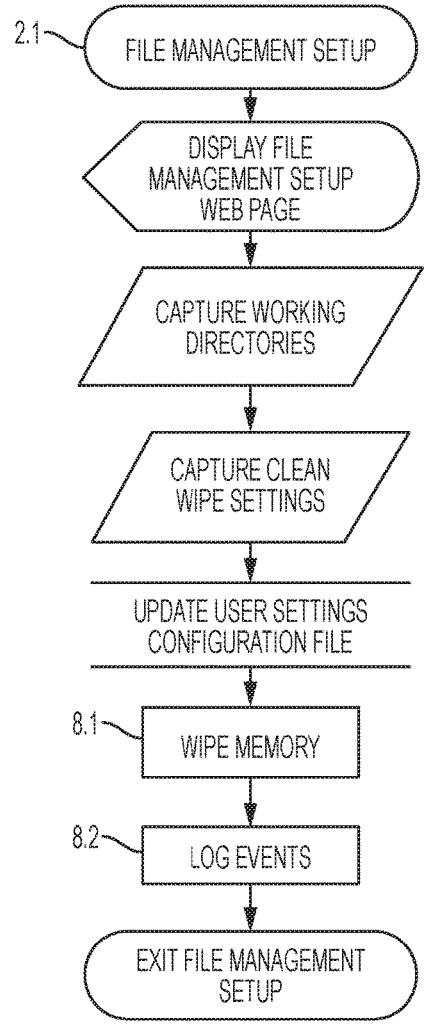
FIG. 6A
FIG. 6B

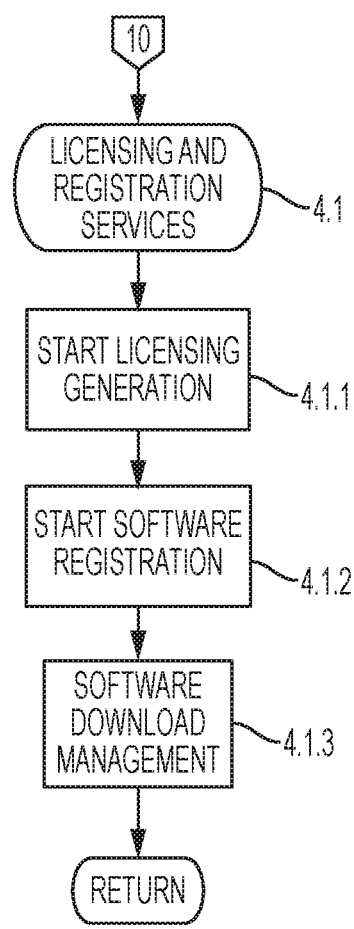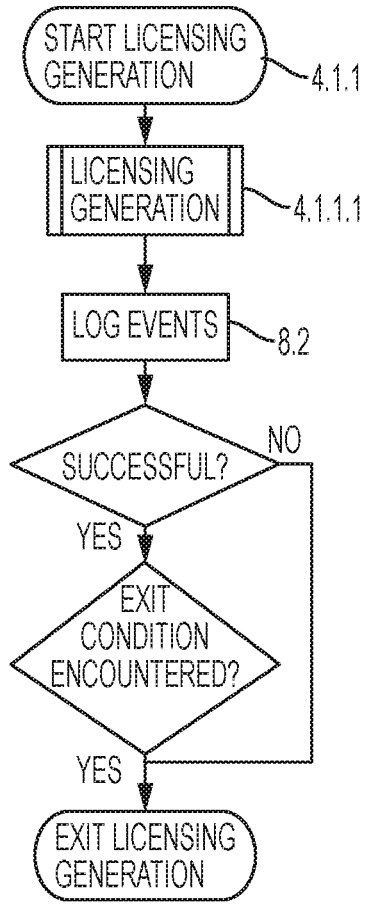
FIG. 23A
FIG. 23B

SYSTEMS AND METHODS FOR PROVIDING FILE LEVEL SECURITY

CROSS REFERENCE TO RELATED APPLICATION

This application is based upon co-pending and co-owned U.S. Provisional Patent Application Ser. No. 62/076,578 entitled "Systems and Methods for Providing File Level Security," filed with the U.S. Patent and Trademark Office on Nov. 7, 2015, the specification of which is incorporated herein by reference.

FIELD OF THE INVENTION

The invention relates to file security, and more particularly to systems and methods for file level security when storing or sharing files.

BACKGROUND OF THE INVENTION

When working with file security, the traditional approach to securing any file or set of files is to encrypt the entirety of the file as a whole. Many API's exist to encrypt files and many applications include those API's to perform the encryption and decryption. One common aspect of such API's is the encryption of the entire file and the storage of that file. For API's, OpenSSL or Crypto++ are common examples of API's. Likewise, Norton and APG are common examples of applications. Unfortunately, if someone is able to overcome such encryption, they have access to the full file, such that these prior protective encryption methods warrant improvement.

Another common feature with applications that handle files, such as WINZIP, is the ability to break files into parts and put them back together. While useful for storing and transferring large files, such tools do little to protect against nefarious efforts to obtain such files. Similarly, many applications can write data in the cloud, to network drives, local drives and other removable mounted devices similar to SD cards, all of which carry risk of unauthorized access.

Data storage redundancy, also known as software RAID (Redundant Array of Independent Disks), is a well-known methodology for providing a failsafe in the event that hardware should fail. When a file is written with any RAID 1 and above, the data written is copied to different locations. Should any location fail, the file can still be recovered because parts of the file are repeated in different file locations. While such redundancy provides a helpful backup function, it again does nothing to protect against unauthorized file access.

SUMMARY OF THE INVENTION

Disclosed herein are systems and methods for combining functions of file encryption, parsing files into parts, parsing the key store into parts, parsing the file pointers into parts, applying software RAID, and storing written data to local attached devices, network attached devices, removable devices such as SD cards and cloud storage end points for the file parts. To that, one or more parts can optionally be identified as the sentinel. Presence of the sentinel, or access to it, is required for the software to access and decrypt files. As used herein, the sentinel or sentinels, as established by the user, can be, but are not limited to, an encrypted non-shredded data storage device, an encrypted non-shredded key store location, or a simple network access point that the system and method require access to in order to allow the file parts to be retrieved, decrypted, reconstructed, and presented.

The advantages of such a system may include one or more of the following advantages: the user can use different devices to access data files; the data files are broken apart into pieces, encrypted and stored; the different parts are treated much like software RAID for recoverability, such that should access fail or become corrupted, the file can still be recovered; the locations of the stored data include any combination of local storage, network storage, removable storage and cloud storage; it would be onerous and time consuming for anyone to attempt to locate and decrypt the stored data processed pursuant to the system and method set forth herein; and data stored in the public domain remains truly private. The sentinel(s) configured as set forth in accordance with certain aspects of an embodiment of the invention can be set to aid in the prevention of unauthorized decryption and access.

BRIEF DESCRIPTION OF THE DRAWINGS

The numerous advantages of the present invention may be better understood by those skilled in the art by reference to the accompanying drawings in which:

FIG. 1b shows an OS support evaluation process 1.1 for use in the installation process of FIG. 1a.

FIG. 1c shows a hardware and firmware evaluation process 1.2 for use in the installation process of FIG. 1a.

FIG. 2a shows a licensing selection process 1.3 for use in the installation process of FIG. 1a.

FIG. 2b shows a registration and license process 1.3.1 for use in the licensing selection process of FIG. 2a.

FIG. 5 shows an authentication and authorization setup process 1.4 for use in the installation process of FIG. 1a.

FIG. 6a shows an application setup process 2.0 in accordance with certain aspects of the invention.

FIG. 6b shows a file management setup process 2.1 for use in the application setup process of FIG. 6a.

FIG. 6c shows a storage management setup process 2.2 for use in the application setup process of FIG. 6a.

FIG. 10a shows a network management setup process 2.3 for use in the application setup process of FIG. 6a.

FIG. 10b shows an access management setup process 2.5 for use in the application setup process of FIG. 6a.fs FIG. 10c shows a review setup process 2.6 for use in the application setup process of FIG. 6a.

FIG. 11 shows a device management setup process 2.4 for use in the application setup process of FIG. 6a.

FIG. 12 shows an update N counter process 2.2.1.1.1 for use in the create removable locations process of FIG. 9a.

FIG. 13b shows menu options presented to a user through the file operation processes of FIG. 13a.

FIG. 14 shows an authentication and authorization process 3.0.1 for use in the file operation processes of FIG. 13a.

FIG. 15 shows a get share and relying trust information process 3.0.2 for use in the file operation processes of FIG. 13a.

FIG. 16 shows a read local configuration process 3.0.3 for use in the file operation processes of FIG. 13a.

FIG. 17 shows a retrieve File DB and keystore process 3.0.4 for use in the file operation processes of FIG. 13a.

FIG. 18 shows a select file process 3.0.5 for use in the file operation processes of FIG. 13a.

FIG. 23a shows licensing and registration services 4.1 for use with the CRC services of FIG. 22.

FIG. 23b shows a start licensing generation process 4.1.1 for use with the licensing and registration services of FIG. 23a.

FIG. 23c shows a start software registration process 4.1.2 for use with the licensing and registration services of FIG. 23a.

FIG. 23d shows a start software download management process 4.1.3 for use with the licensing and registration services of FIG. 23a.

FIG. 24b shows a start file sharing services process 4.2.1 for use with the relying party trust services of FIG. 24a.

FIG. 24c shows a start device management services process 4.2.2 for use with the relying party trust services of FIG. 24a.

FIG. 25b shows a start payment processing services process 4.3.1 for use with the payment processing services of FIG. 25a.

FIG. 26b shows a storage management process 5.1 for use with the manage accounts, devices, and storage process of FIG. 26a.

FIG. 28 shows a device management process 5.2 for use with the manage accounts, devices, and storage process of FIG. 26a.

FIG. 29 shows a manage sharing process 5.3 for use with the manage accounts, devices, and storage process of FIG. 26a.

FIG. 41b shows a set errors/events/logs reporting process 6.4.1 for use with the set system performance reporting process of FIG. 41a.

FIG. 41c shows a set application uptime reporting process 6.4.2 for use with the set system performance reporting process of FIG. 41a.

FIG. 41d shows a set connection time/ability reporting process 6.4.3 for use with the set system performance reporting process of FIG. 41a.

FIG. 42b shows a run reports process 6.5.1 for executing reports selected in the run reports process of FIG. 42a.

DETAILED DESCRIPTION

The following description is of a particular embodiment of the invention, set out to enable one to practice an implementation of the invention, and is not intended to limit the preferred embodiment, but to serve as a particular example thereof. Those skilled in the art should appreciate that they may readily use the conception and specific embodiments disclosed as a basis for modifying or designing other methods and systems for carrying out the same purposes of the present invention. Those skilled in the art should also realize that such equivalent assemblies do not depart from the spirit and scope of the invention in its broadest form.

In accordance with certain aspects of an embodiment of the invention, a software system is provided by which a user can securely store parts of a single file in one or more selected different storage locations. Each file, and more particularly the separate parts of the file, may be encrypted with a different key. Using concepts of software RAID, the file data parts would be accessible or recoverable should some part of the access points become inaccessible or the file become corrupted.

Figure 13A:
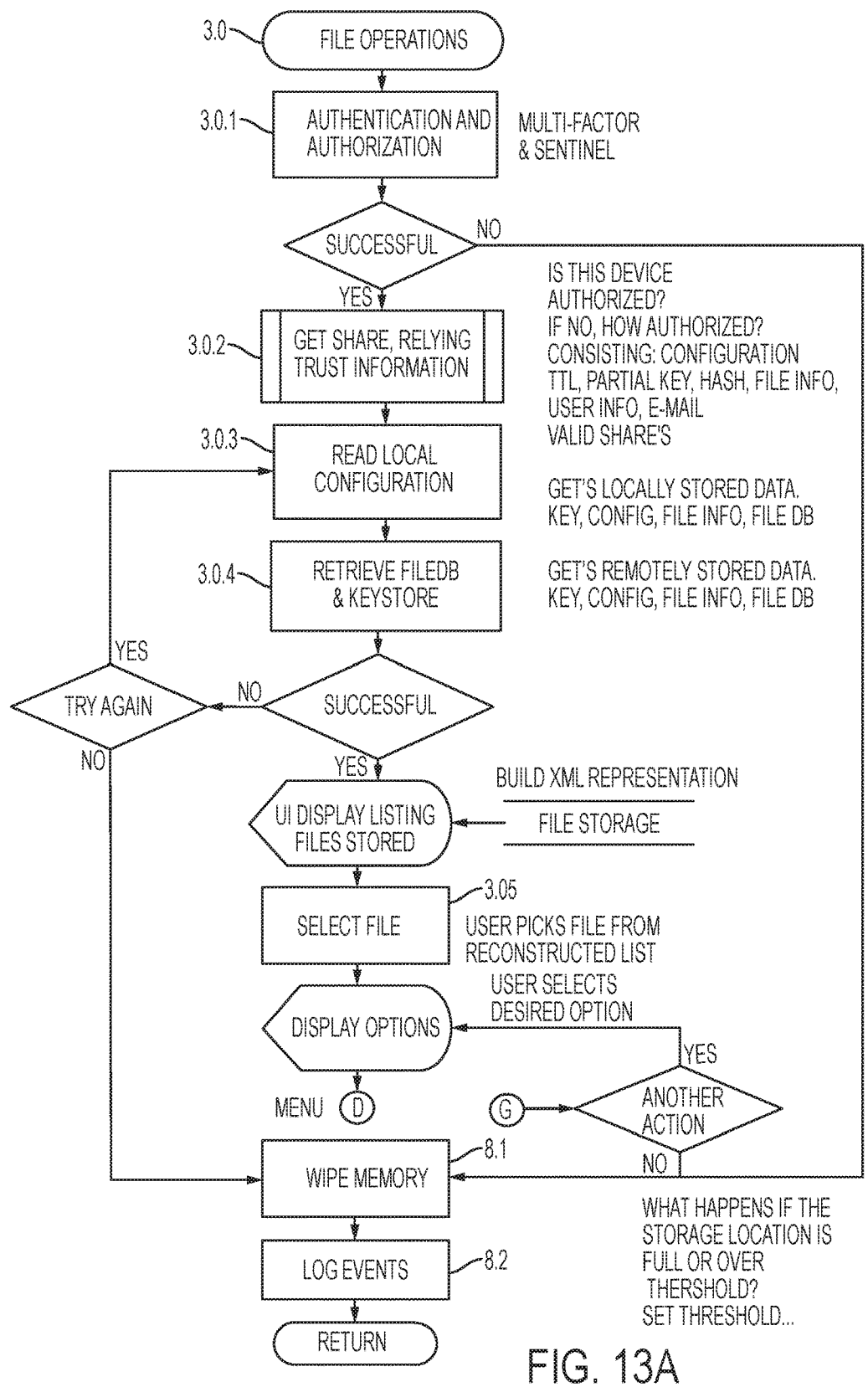
FIG. 13a shows file operation processes 3.0 in accordance with certain aspects of the invention.
Figure 13B:
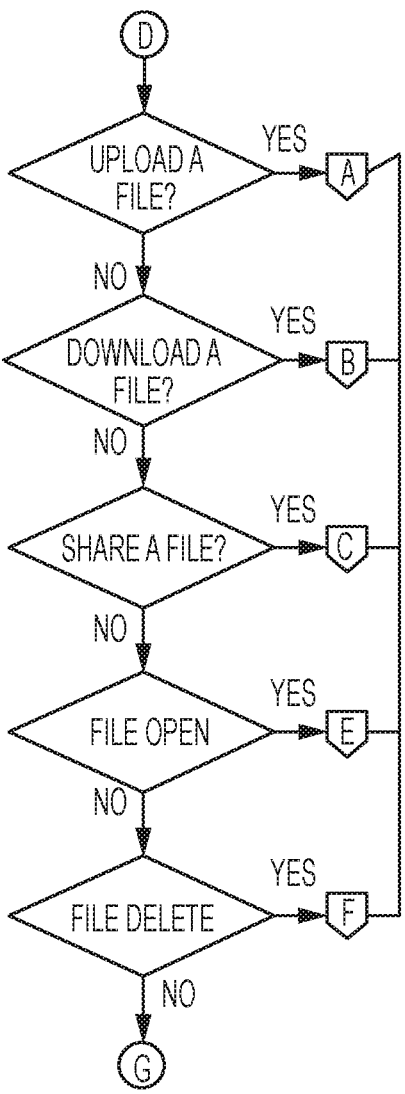
Figure 14:
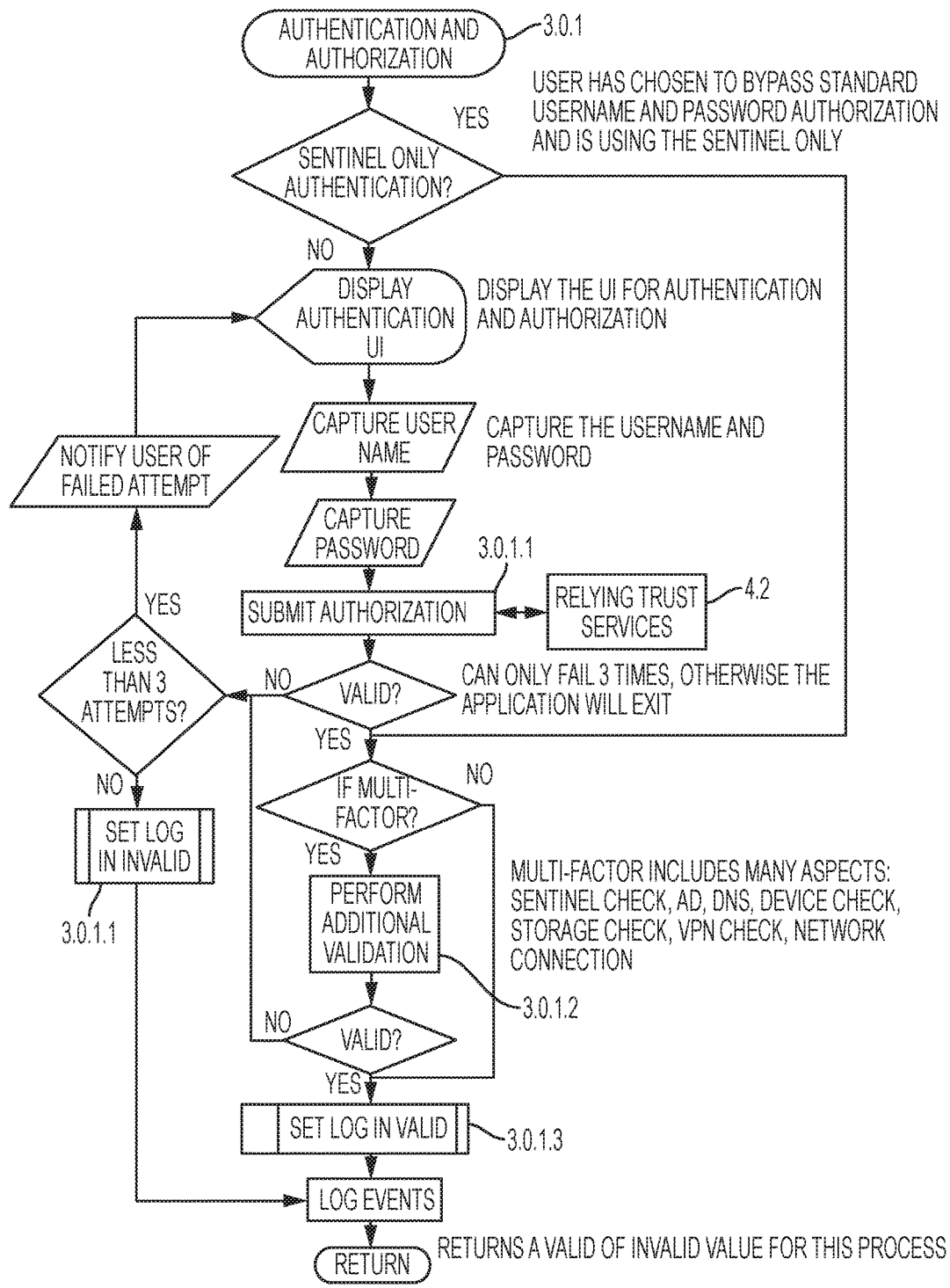
Figure 15:
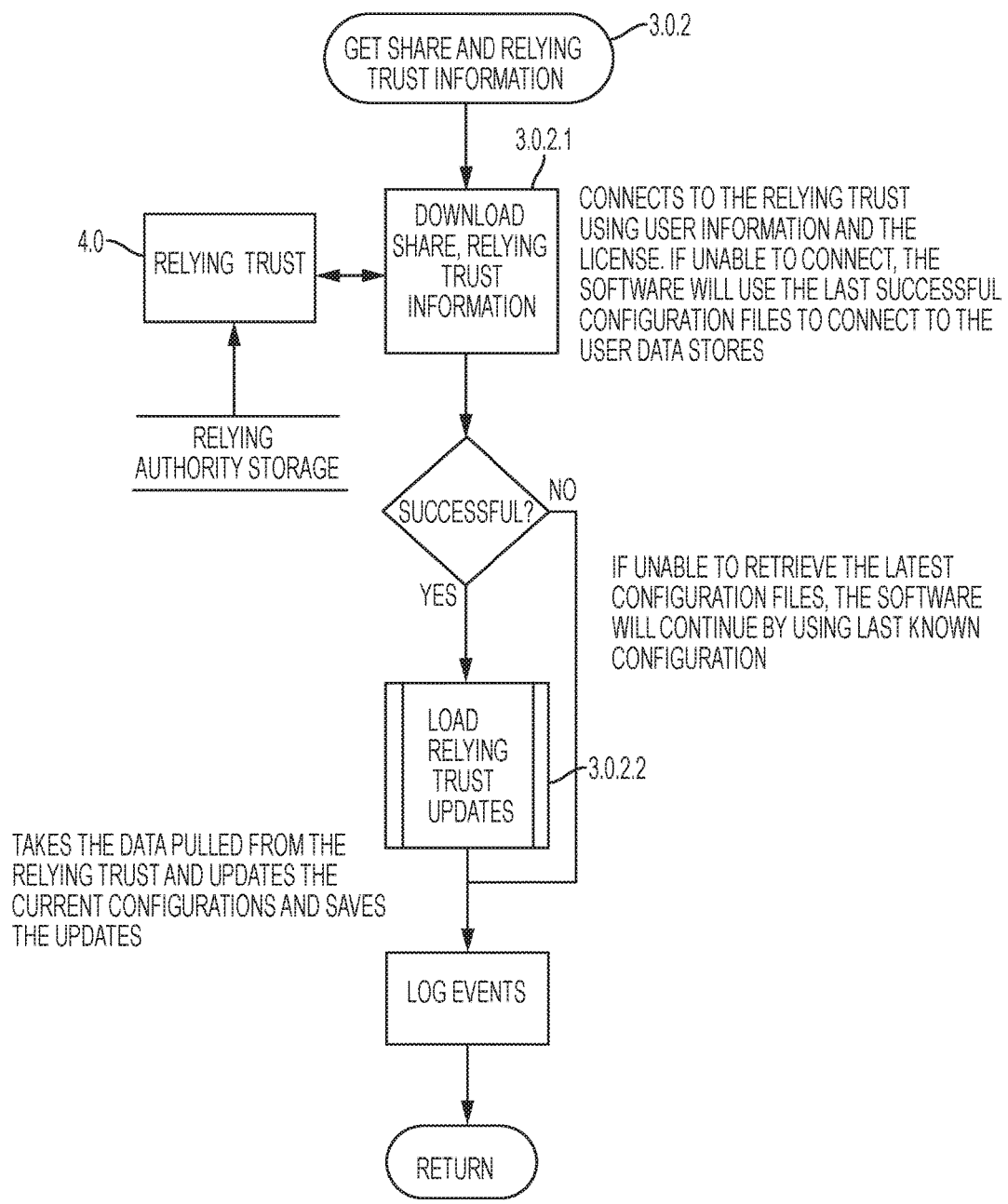
Figure 16:
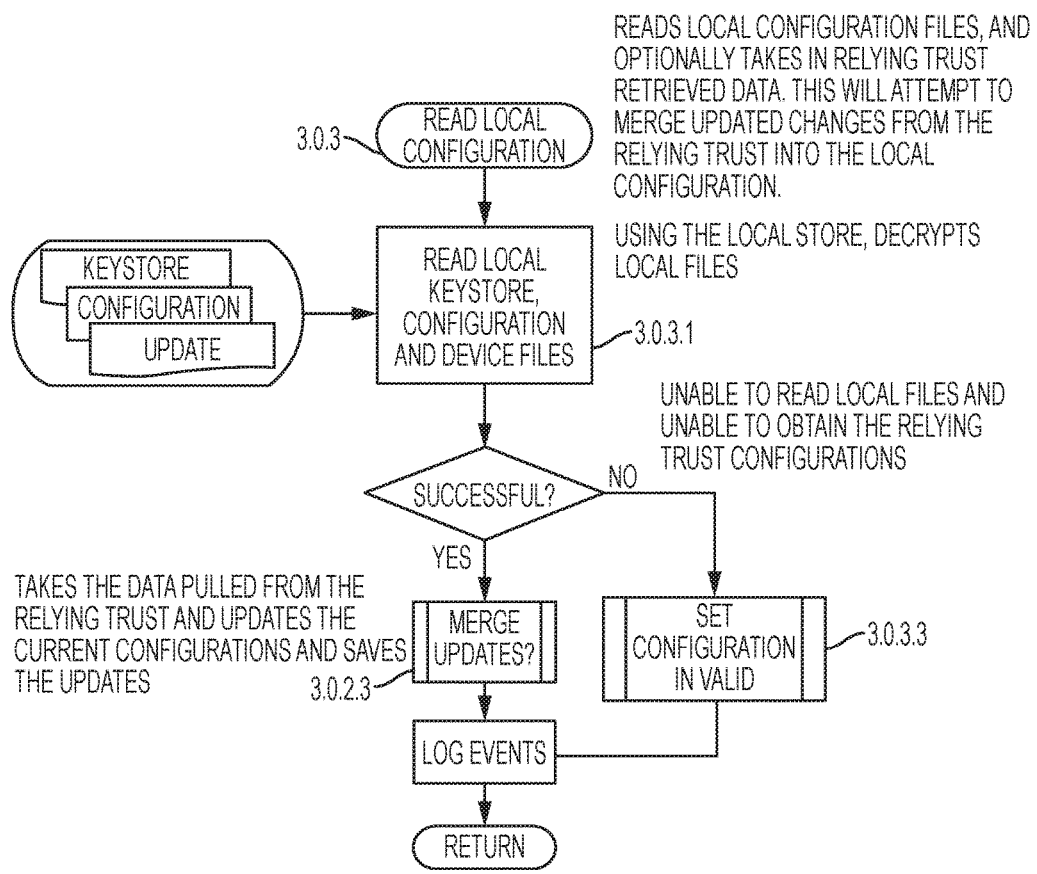
Figure 17:
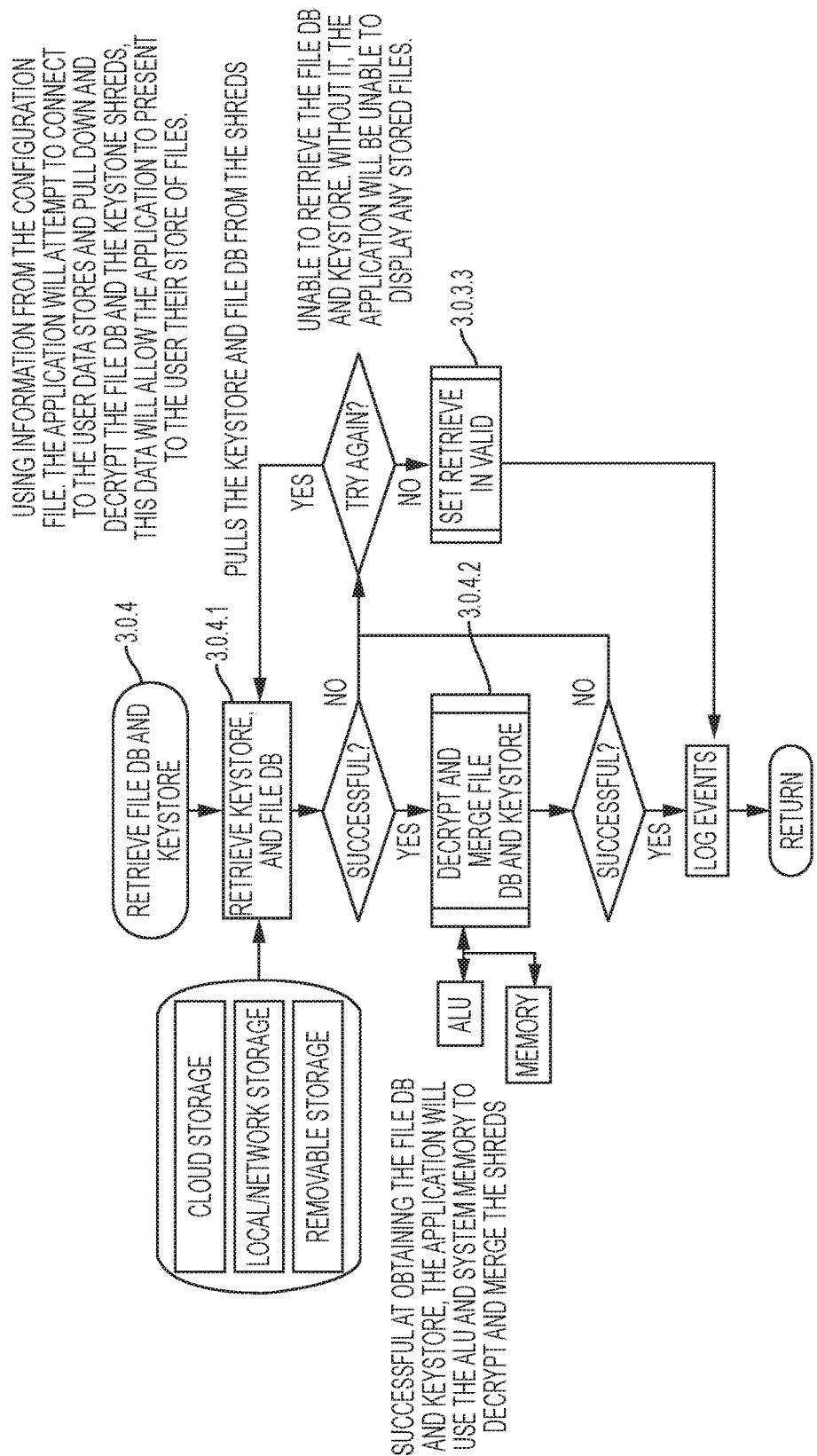
Figure 24C:
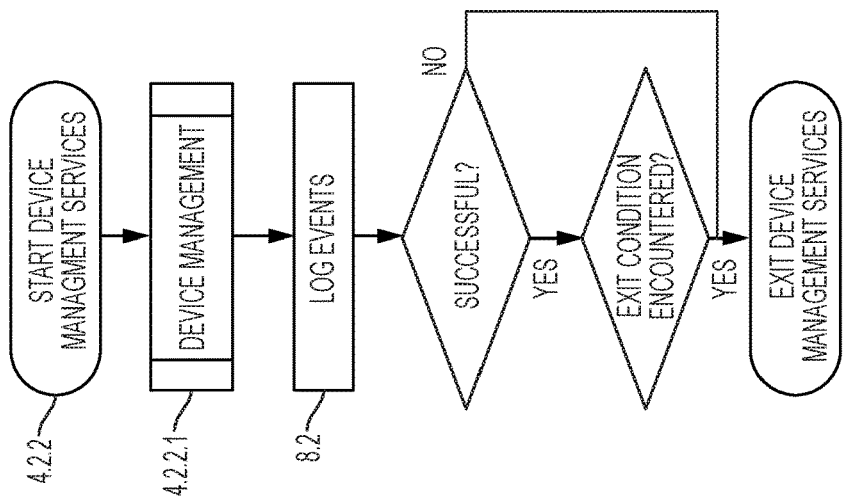
Figure 24B:
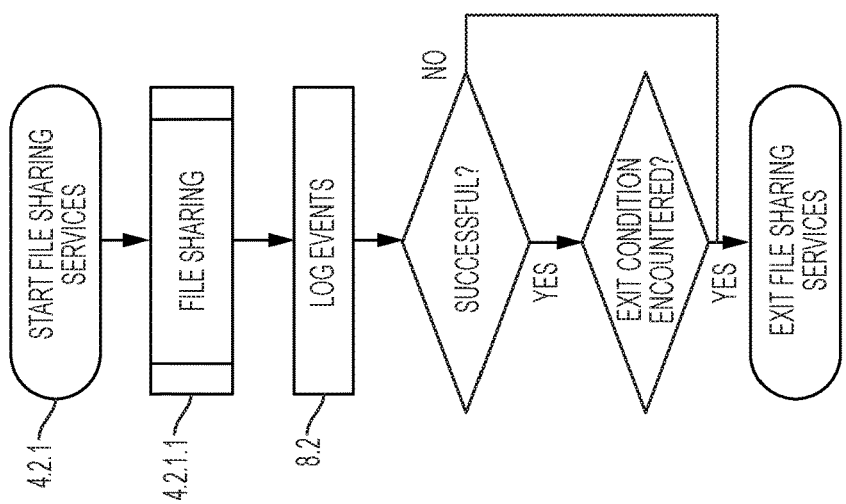
Figure 24A:
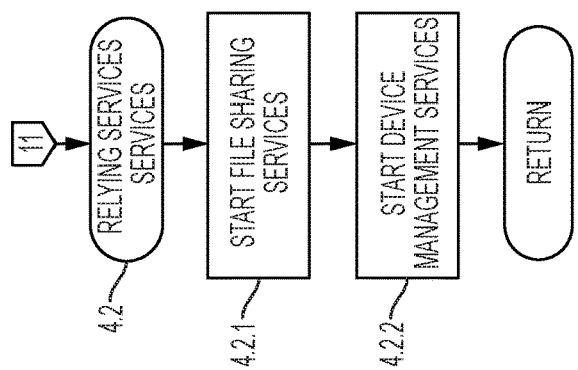
FIG. 24a shows relying party trust services 4.2 for use with the CRC services of FIG. 22.

Utilizing a hardware input device of standard configuration, such as a personal computer or the like executing the application described herein, the user opens the application using the standard user interface for that given hardware. Typically, a person of ordinary skill in the art will have made this process simple, such as by placing a link to the application on the desktop or display for the user to select. The application provided in accordance with aspects of the invention will launch, using the graphics chip to render the display. The application can then be said to be in a running state. At this time, the application will attempt to authenticate and authorize the user. User authentication may be accomplished in a number of ways as may be defined by the user when installed or reconfigured, and may include: user name and password, or use of a sentinel, or, multi-factor that is a combination. A multi-factor authentication preferably includes user name, password and sentinel. The user name and password may be collected and then validated locally by the application. Once validated, the sentinel will also be automatically validated. There are several methods by which sentinel validation may be carried out, including but not limited to checking the availability of a network connection, checking the availability of a named path to an SD card, and validating the user with an active directory service or domain name service. As can been seen in FIG. 14, if either of the multi-factor authentication attempts fails after three attempts, the user will not have access to the system. The application will wipe the memory clean, log the failed attempt and close. Upon successful completion of the authentication and authorization process, the application will connect to a relying party trust service (as shown FIG. 24a at process 4.2), which provides the services necessary for file sharing and assisting with device management. The https protocol and network API may be used to confirm device authorization, share information, user configuration file, share configuration files, and partial keystore. As can be seen in FIGS. 13a, 13b and 15, if unable to connect to the relying party trust, the application will continue with the last known good file set stored locally. If successful in retrieving information from the relying party trust and successful in reading the last known good configuration files, the application will merge any new configuration or share information from the relying trust into the local configuration files as described in FIG. 17. At this point, as shown in FIG. 17, the application will attempt to connect to the user data stores using information from the configuration file to retrieve the keystore and FileDB shreds. In accordance with standard methods known to those skilled in the art, the configured storage may be attached. Example storage types may include network storage, local file system storage, cloud storage, and removable storage.

Storage 10 may be accomplished over a TCP/IP network in virtual environments. This is the fiber, Ethernet, SCSII, NAS, or even SATA connection from the physical host to the physical storage device. This is used by the system to send and receive file content and metadata.

Network connectivity to storage provides a physical connection from the storage devices to the network infrastructure. This is typically a TCP/IP, fiber, or direct Ethernet connection.

Physical storage devices may likewise be provided and identified by a logical unit number or LUN. In computer storage, a logical unit number or LUN is a number used to identify a logical unit, which is a device addressed by the SCSI protocol or similar protocols such as fiber channel or iSCSI. A LUN may be used with any device that supports read/write operations, such as a tape drive, but is most often used to refer to a logical disk as created on a SAN. Though not technically correct, the term "LUN" is often also used to refer to the drive itself.

Further, cloud storage may be provided, comprising a service model in which data is maintained, managed and backed up remotely and made available to users over a network (typically the Internet).

If the application is not successful in retrieving the keystore and File DB shreds from the user data stores, the application will give the user the option to try again, as seen in FIG. 13a. If successful, the application will use the arithmetic logic unit ("ALU") and memory to decrypt and recombine the shreds of the File DB and keystore.

The keystore utilizes mutual authentication, also called two-way authentication, which is a process in which both entities in a communications link authenticate each other. In a network environment, the client authenticates the server and vice-versa. In this way, network users can be assured that they are doing business exclusively with legitimate entities, and servers can be certain that all would-be users are attempting to gain access for legitimate purposes. The Graphics engine will then be used to render the display of the available file and share information stored by the application in the user defined locations.

Once the system is viewable, normal user activities such as uploading a file and sharing a file are available via the application menu, such as upload a file, download a file, share a file, file open and file delete.

Figure 6C:
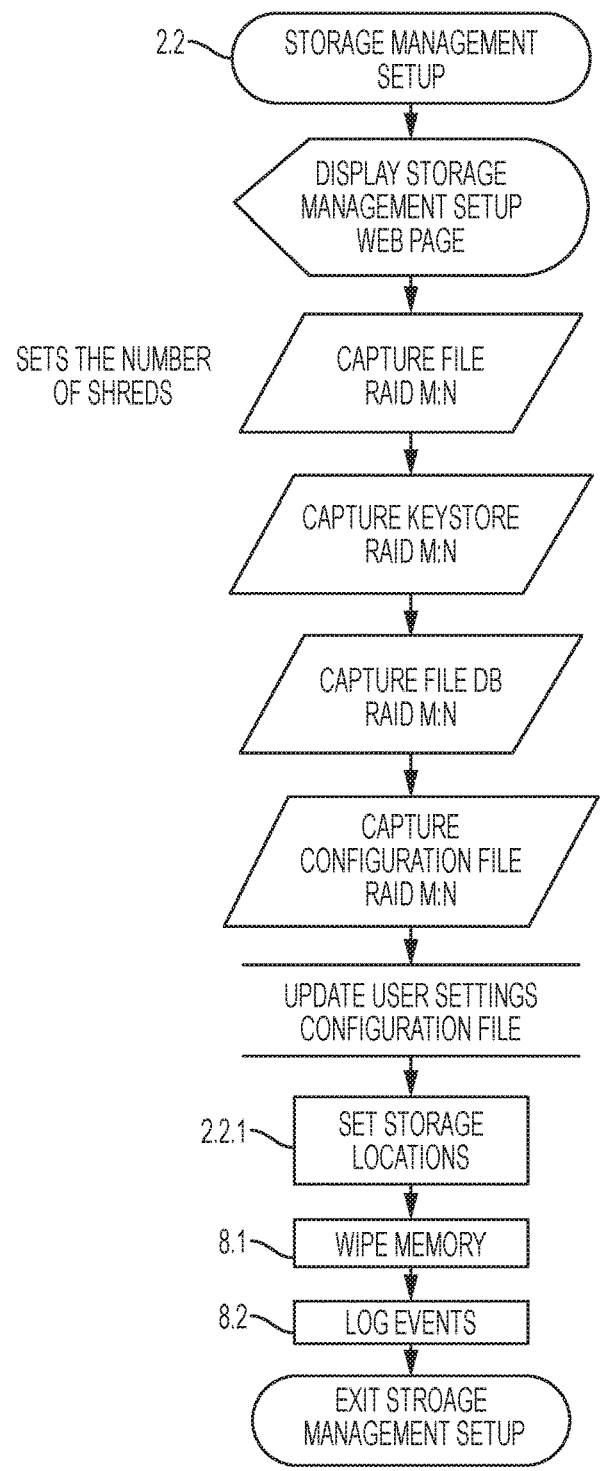
Figure 18:
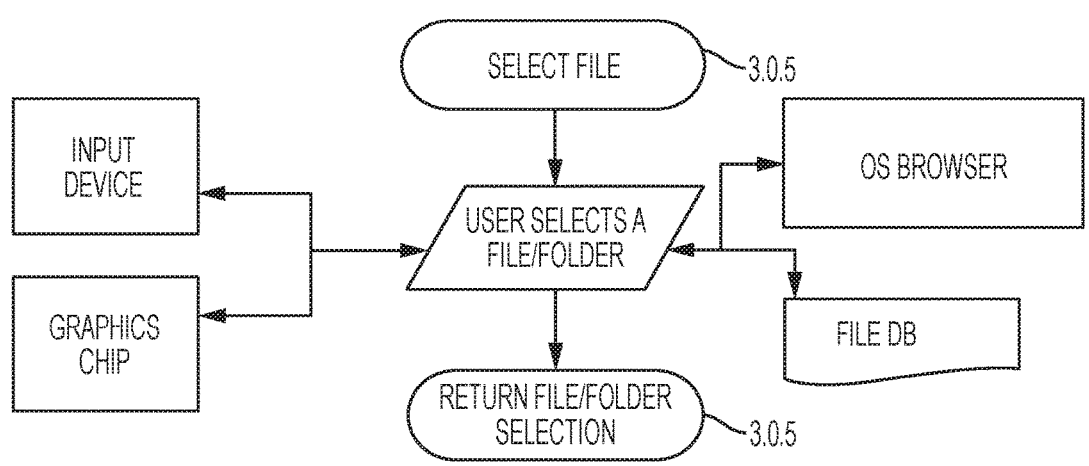
Figure 19:
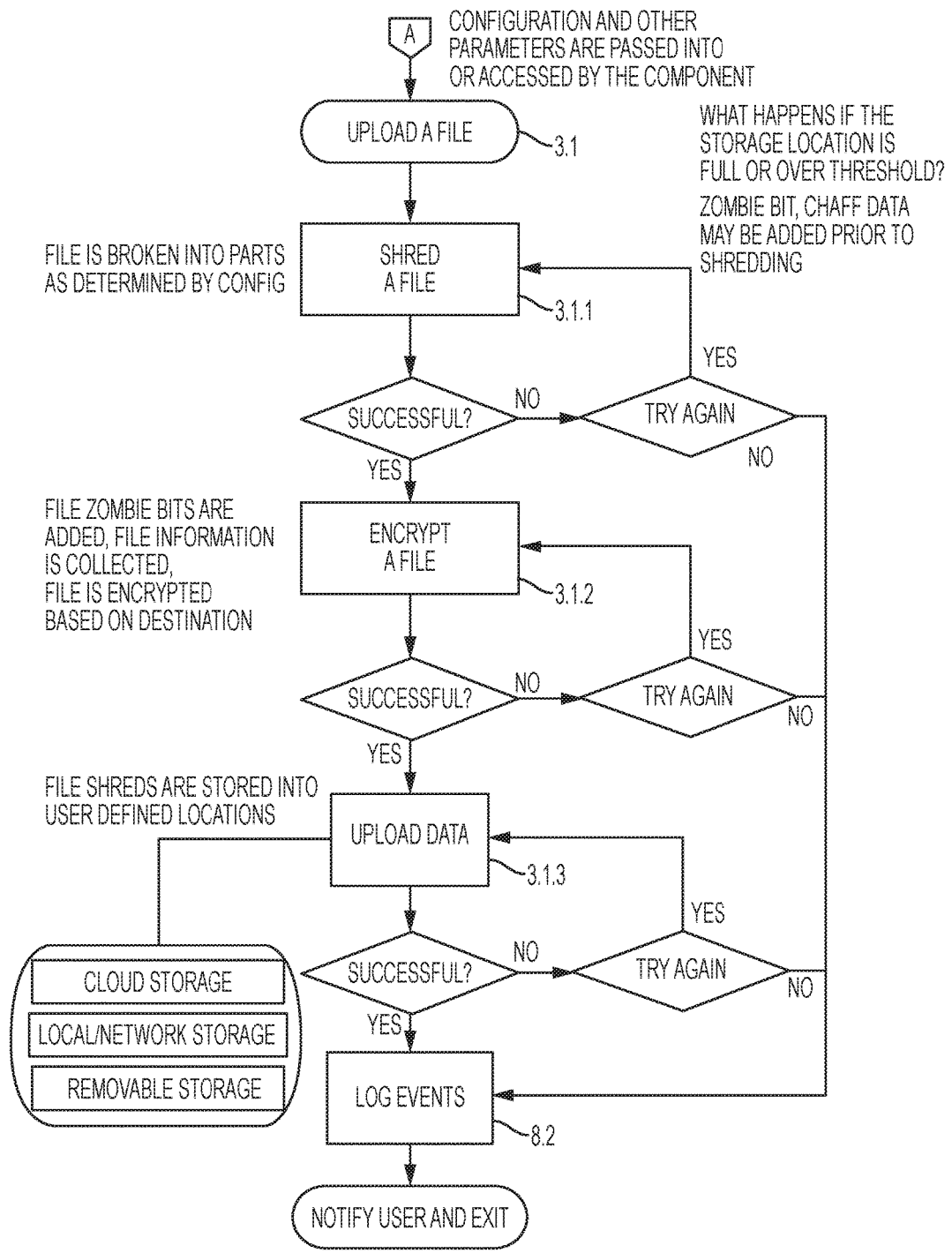
FIG. 19 shows an upload a file process 3.1 in accordance with certain aspects of the invention.

The application process for uploading a file can be seen in FIG. 19. The user begins by selecting "Upload" from the application menu navigating the well-known file explorer or OS system browser and selecting the file to be uploaded. See FIG. 18. Once selected, the application will shred the file into the set number of shreds determined by the setup configuration as set by the user in storage management setup process 2.2 of FIG. 6c. The shred process, process 3.1.1 (FIG. 19), begins by using the ALU to determine the necessary amount of "random zombie data" (i.e., miscellaneous and optionally randomly generated bits of data not forming a part of the intended complete file to which they are being added) and then using system memory, breaks the file into the defined number of shreds. After each shred is successfully created, the zombie bits of data are added to each file shred. Utilizing the ALU and system memory, each shred, in process 3.1.2 (FIG. 19), is encrypted with the set encryption for the storage location.

The ALU is the part of a computer processor (CPU) suitable for implementing the application in accordance with embodiments of the invention, which carries out arithmetic and logic operations on the operands in computer instruction words. In some processors, the ALU is divided into two units, an arithmetic unit (AU) and a logic unit (LU). Some processors contain more than one AU—for example, one for fixed-point operations and another for floating-point operations. (In personal computers floating point operations are sometimes done by a floating point unit on a separate chip called a numeric coprocessor.)

Typically, the ALU has direct input and output access to the processor controller, main memory (random access memory or RAM in a personal computer), and input/output devices. Inputs and outputs flow along an electronic path that is called a bus. The input consists of an instruction word (sometimes called a machine instruction word) that contains an operation code (sometimes called an "op code"), one or more operands, and sometimes a format code. The operation code tells the ALU what operation to perform and the operands are used in the operation. (For example, two operands might be added together or compared logically.) The format may be combined with the op code and tells, for example, whether this is a fixed-point or a floating-point instruction. The output consists of a result that is placed in a storage register and settings that indicate whether the operation was performed successfully. (If it isn't, some sort of status will be stored in a permanent place that is sometimes called the machine status word.)

Figure 12:
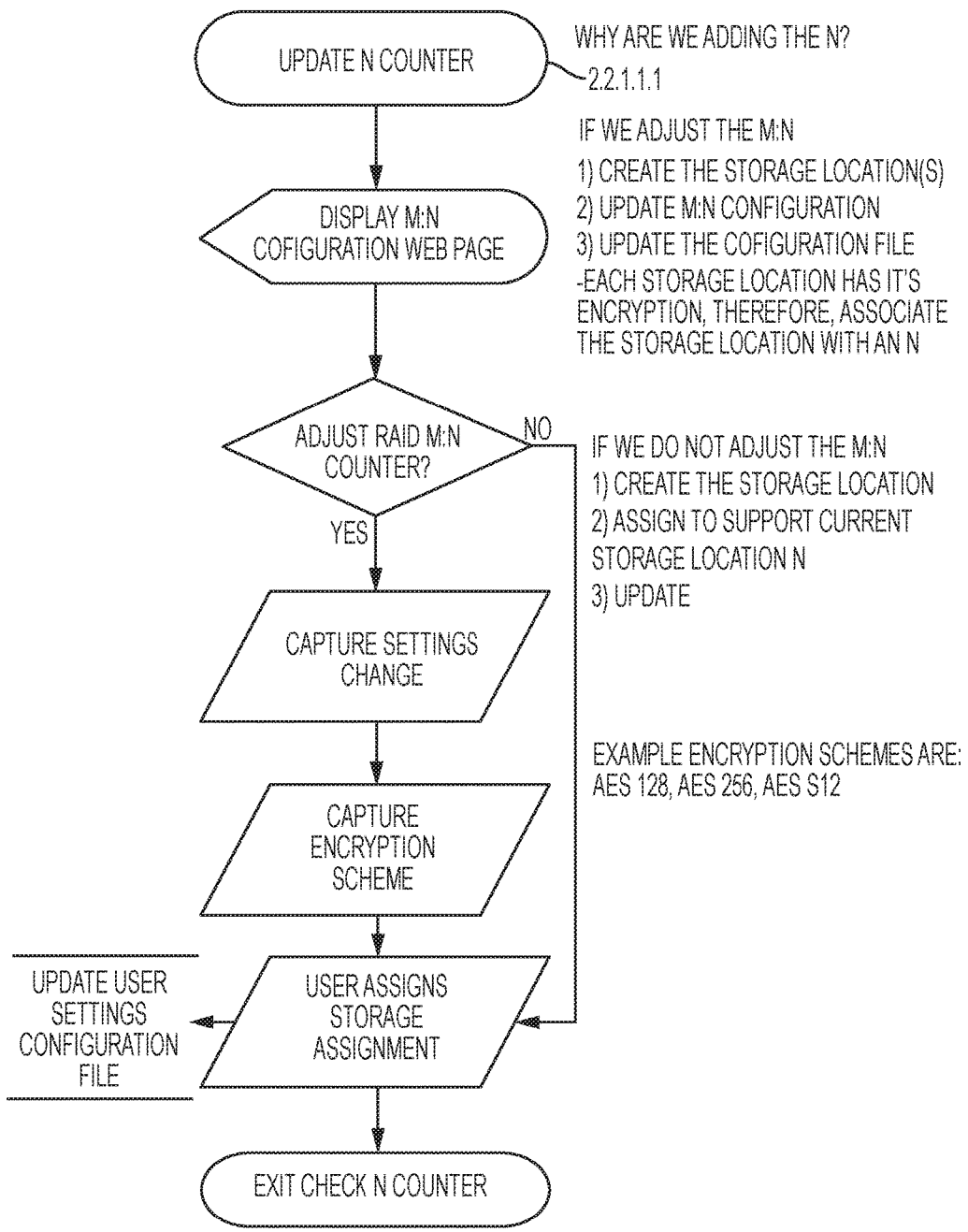

Example encryption types can be seen in the storage location setup of FIG. 12. Once each shred is encrypted, the application begins the upload data process, 3.1.3 in FIG. 19. To upload a shred, well-known network protocols and transport mechanisms are utilized, and defined interfaces with third party cloud providers are used to connect to the defined storage locations. If enough shred data can be copied into the storage locations and then subsequently be put back together to form a usable file, any shreds not uploaded will be held for upload at a later time. If, however, the application is unable to upload enough shreds to reconstitute the file, an error is returned to the user and the application presents a choice to cancel the operation or continue at a later date when connection can be established. If the upload is successful, the application will notify the user of the successful upload, update the File DB and return the menu selection for further action by the user after logging the event, as shown in FIG. 19 process 8.2.

Figure 20:
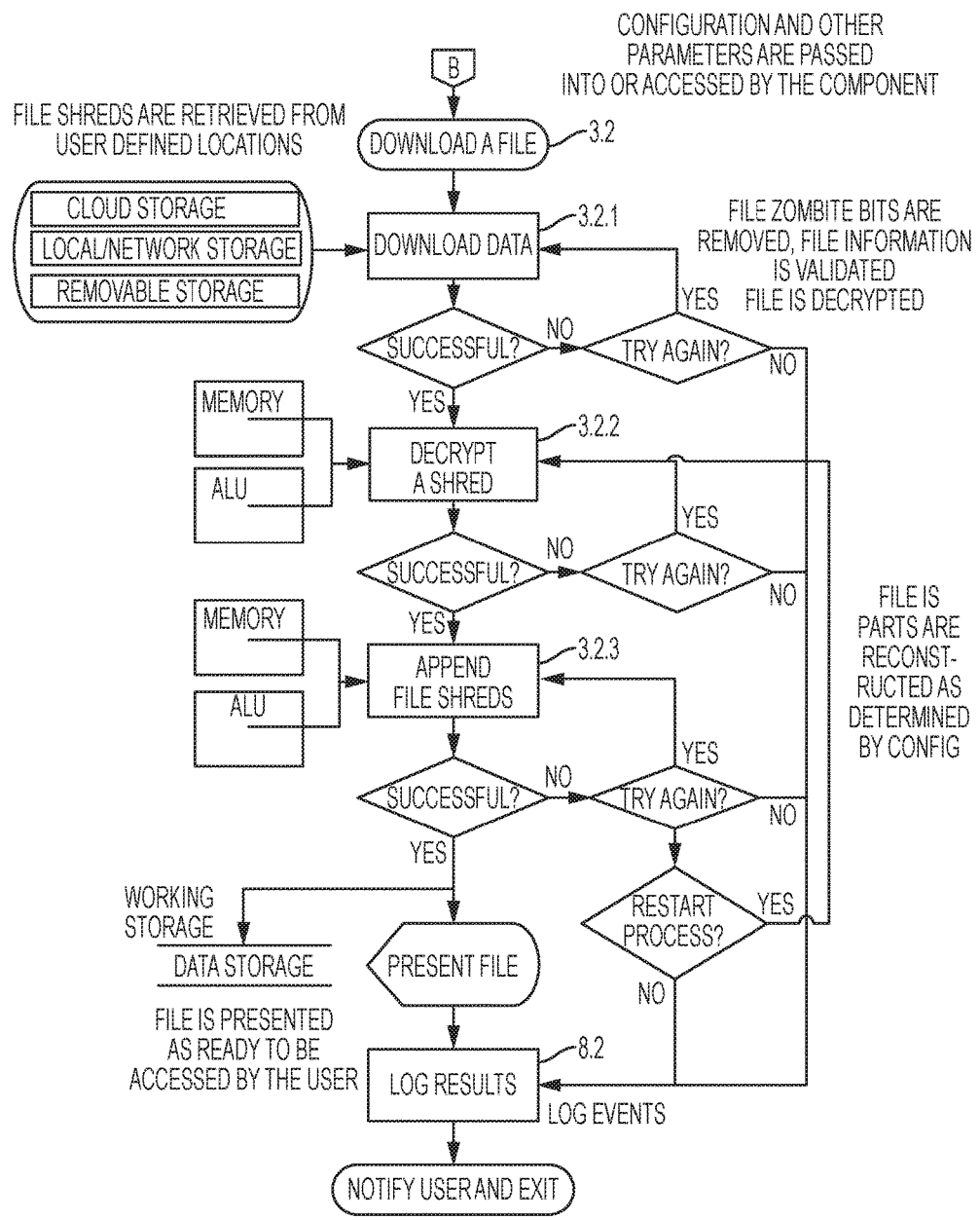
FIG. 20 shows a download a file process 3.2 in accordance with certain aspects of the invention.

To download a file, which will effectively place a copy of the file on the user system, the system state effectively presents the Menu list as shown at the end of FIG. 13*b*. In this case, the menu item chosen by the user is "Download". The system will utilize the process defined in FIG. 18, following the same process as described in the above process with the exception that the core file information is already present in the system in the File DB. Such information may include the file name, alias, m:n, size, checksum, storage locations, and encryption type. In this case, the selected file is presented to the download process, as depicted in FIG. 20. The software will accept the input File DB information into the download file process, process 3.2.1, connect to the data storage locations using well known protocols for cloud, removable, network and local storage and return enough shreds to begin reconstruction of the file. If not enough locations can be connected to download for reconstruction, the software will offer to try again. If accepted, the download will begin again. If not accepted the software will log the results, notify the user and exit. Once the download is complete, the software will decrypt each shred removing the zombie data based on the settings passed in, as seen in process 3.2.2. If not successful, the software will present the option to try again. If selected, the decryption process will try again; if not, the software will log the event and exit process 3.2. If successful, each shred will be appended together to reform the file and placed into the working directory as defined by the user in the settings in FIG. 6*b*. If successful, the application will use the graphics chip and the web API component to repopulate the user interface with the newly downloaded and decrypted file. If unsuccessful, the application will optionally retry appending the shreds or will restart the entire process of decrypting the selected file shreds. If the application is directed to exit, the normal user activities such as uploading a file and sharing a file are available via the application menu, such as upload a file, download a file, share a file, file open and file delete.

As used above, M:N, or "M of N," is associated with redundancy; redundancy is a system design in which a component is duplicated so that if it fails, there will be a backup.

Figure 11:
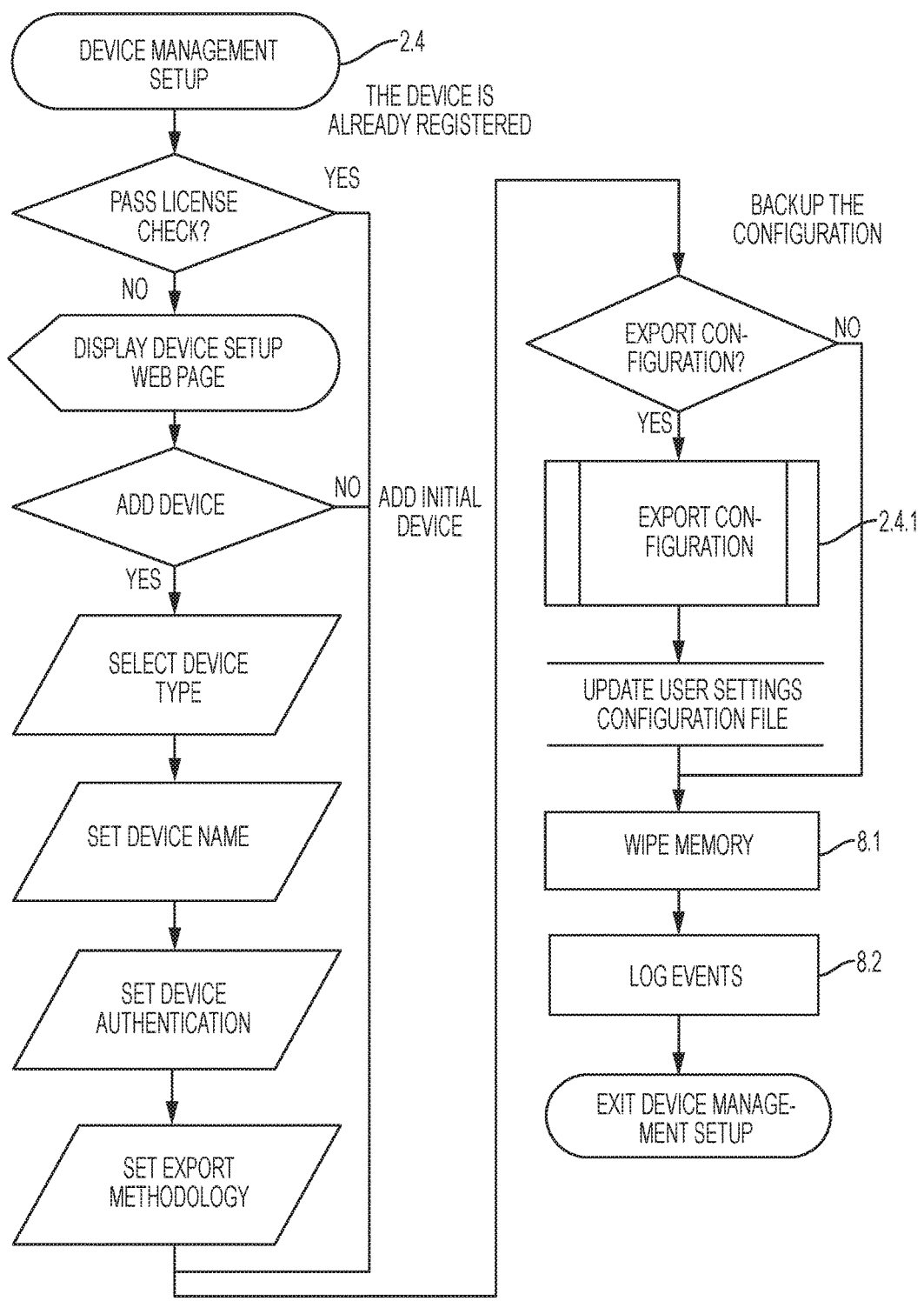
Figure 21:
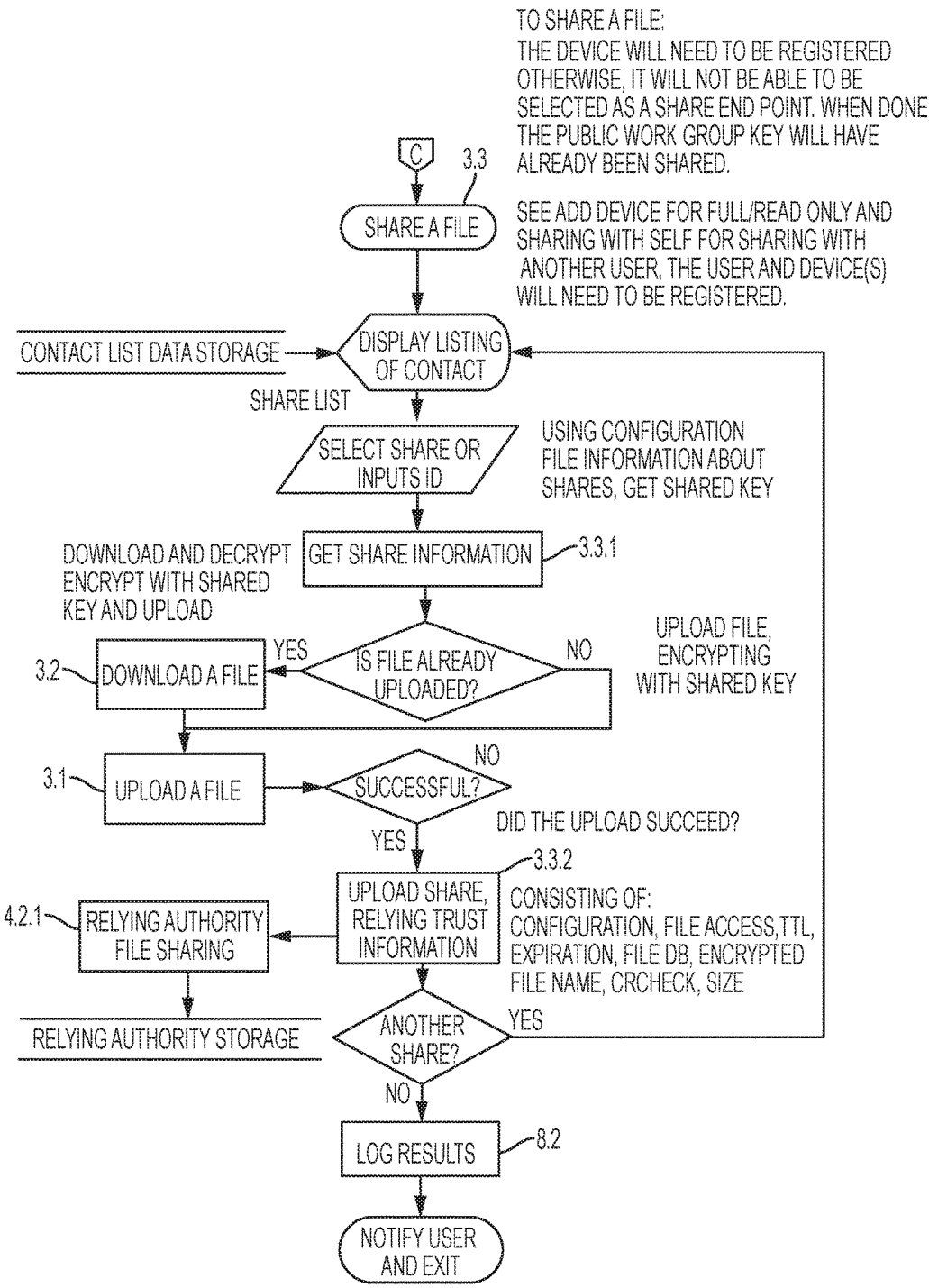
FIG. 21 shows a share a file process 3.3 in accordance with certain aspects of the invention.

In order to share a file with another device, that device must already be registered, per FIG. 11, and as can be seen at the beginning of FIG. 21. The API passes into FIG. 21 the name and path of the file to be shared. If the file needs to be uploaded, the process defined in FIG. 19 described above will be followed. Once successful, the contact list of devices is retrieved from the contact list data storage. The user will select from the list those devices with which to share the file. The list displays the identity associated with the device. Examples may include, but are not limited to, name and device type being shared. If the file is already uploaded, as determined by the location passed in, the file will be downloaded via the same process in FIG. 20, decrypted into the working directory, re-encrypted with the shared key associated with the registered device, and uploaded by the process defined above and in FIG. 19. If the file is not yet uploaded, the shared encryption key will be passed into the Upload A File process, 3.1, which will perform the calls necessary to shred, encrypt and upload the shared file. Once the upload is complete, the relying party trust storage is updated via process 4.2.1 (FIG. 24*b*) and is updated with information including, but not limited to, configuration file, file access, time to live (TTL), expiration, File DB, file name, alias, check sum, size, and encrypted file name.

The relying party trust allows federation, which comprises two sides, viz. the IDP (claims provider) (the owner of the identity repository) and the RP (relying party), which is another security token service ("STS") or application that wishes to outsource authentication to the IDP. Trusts are handled via certificates based on the ownership of private keys, e.g., SAML tokens are signed by the IDP. So the RP trust is the trust between the RP and the IDP—a token signed by the IDP must originate from the IDP and therefore the claims inside the token can be trusted.

Figure 43:
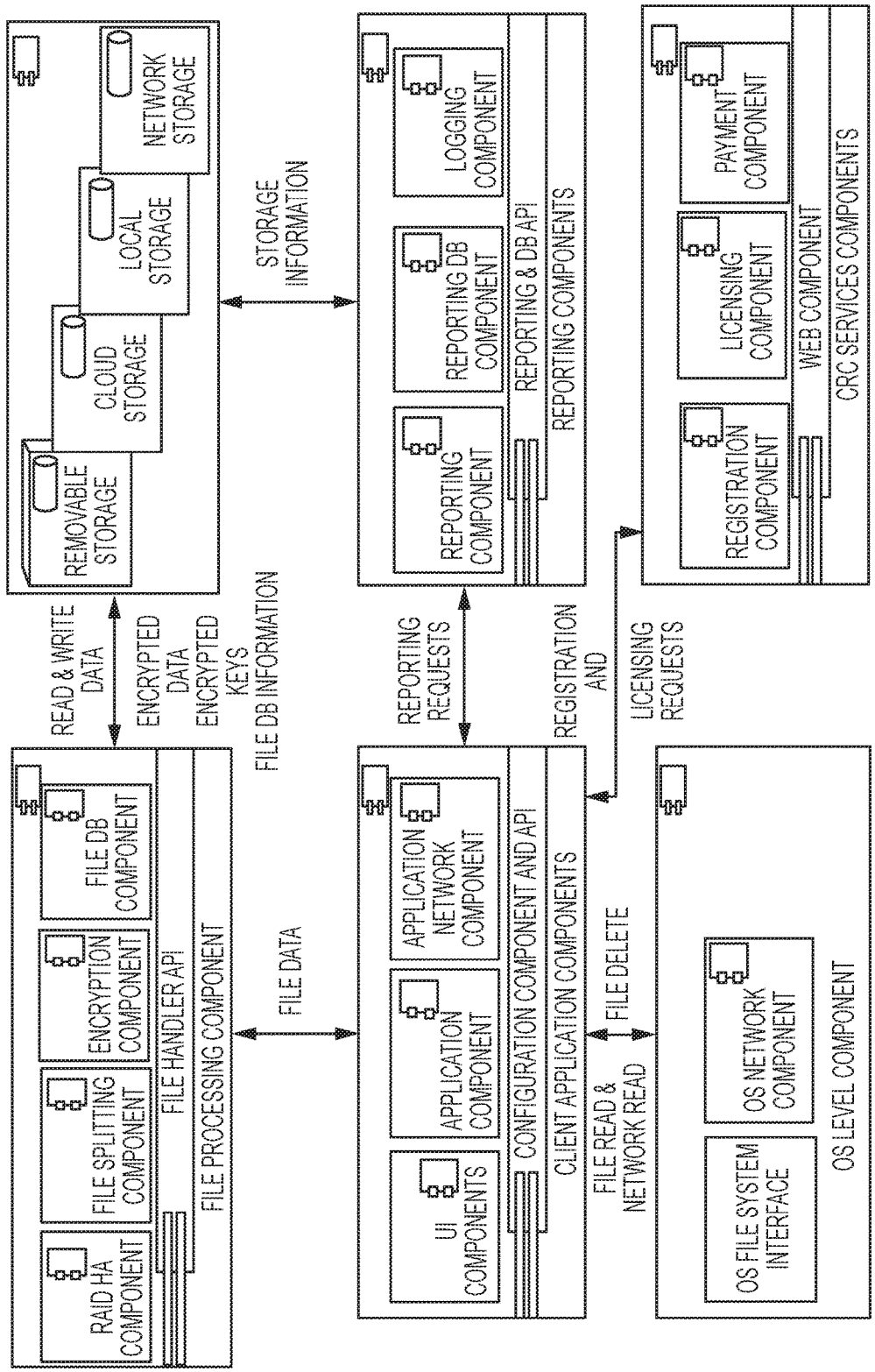
FIG. 43 is a high level, schematic view of a system according to certain aspects of the invention.
Figure 43:
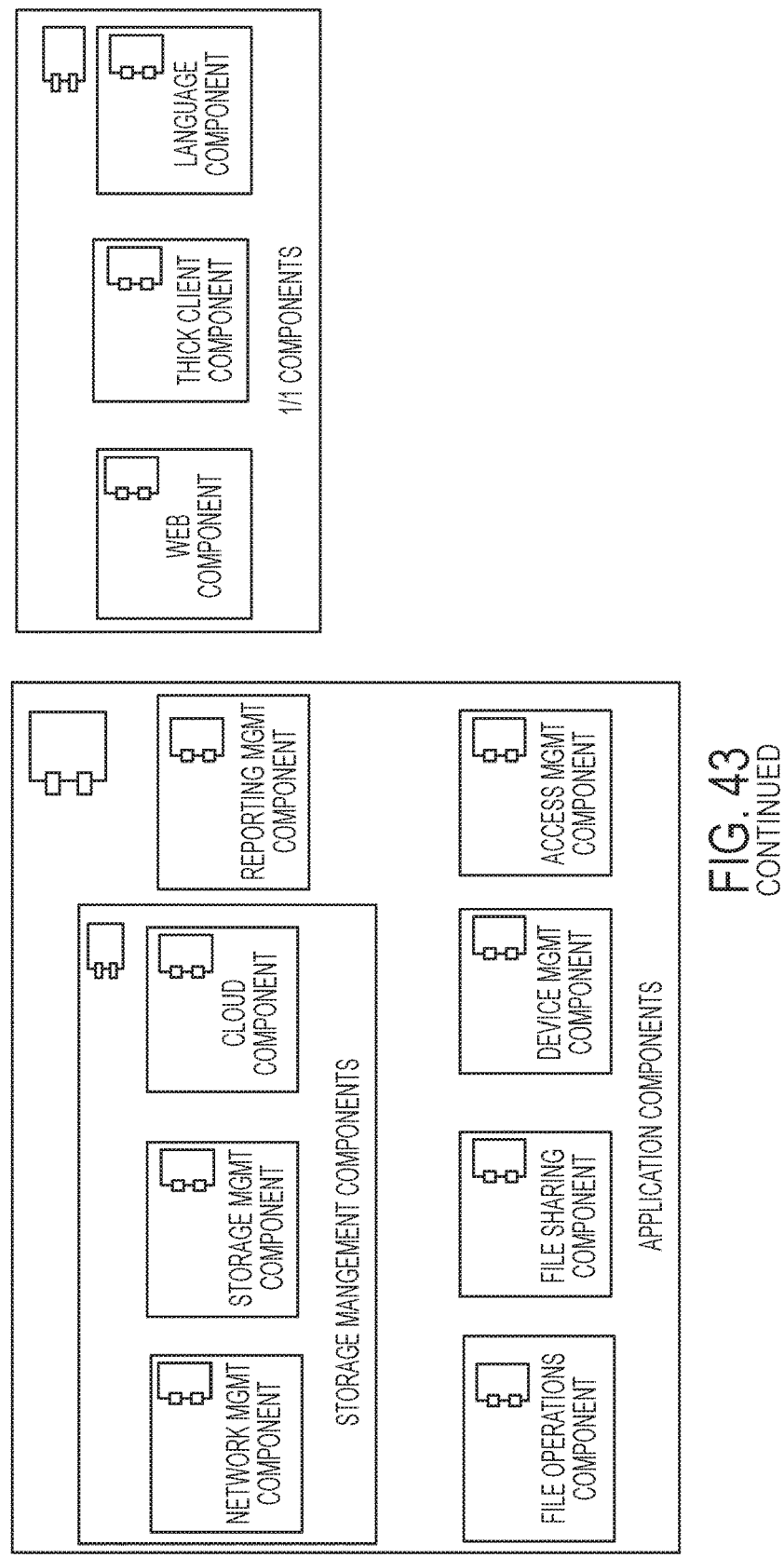
Figure 44:
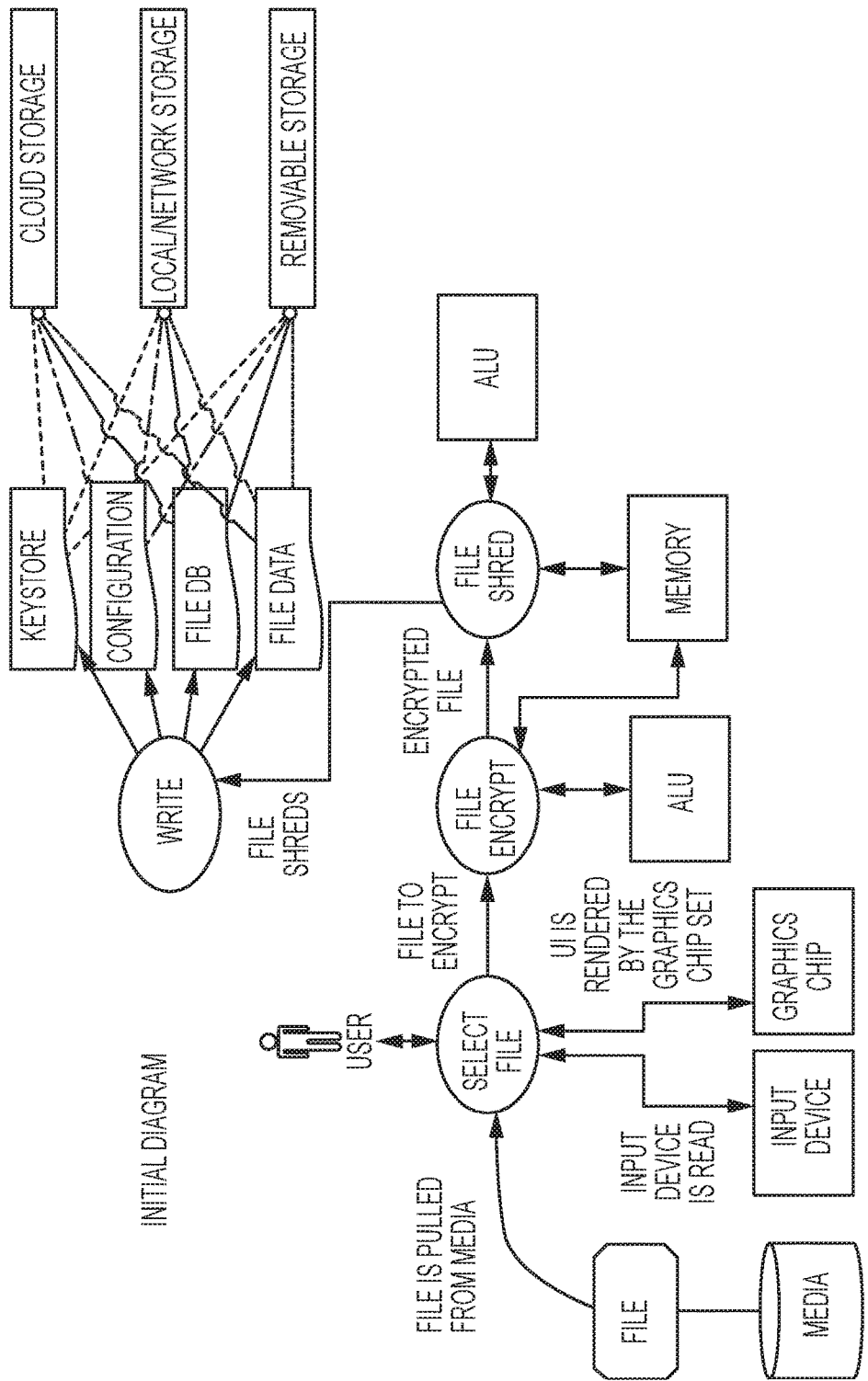
FIG. 44 is a high level, functional flow chart showing operation of a system according to aspects of the invention.
Figure 45:
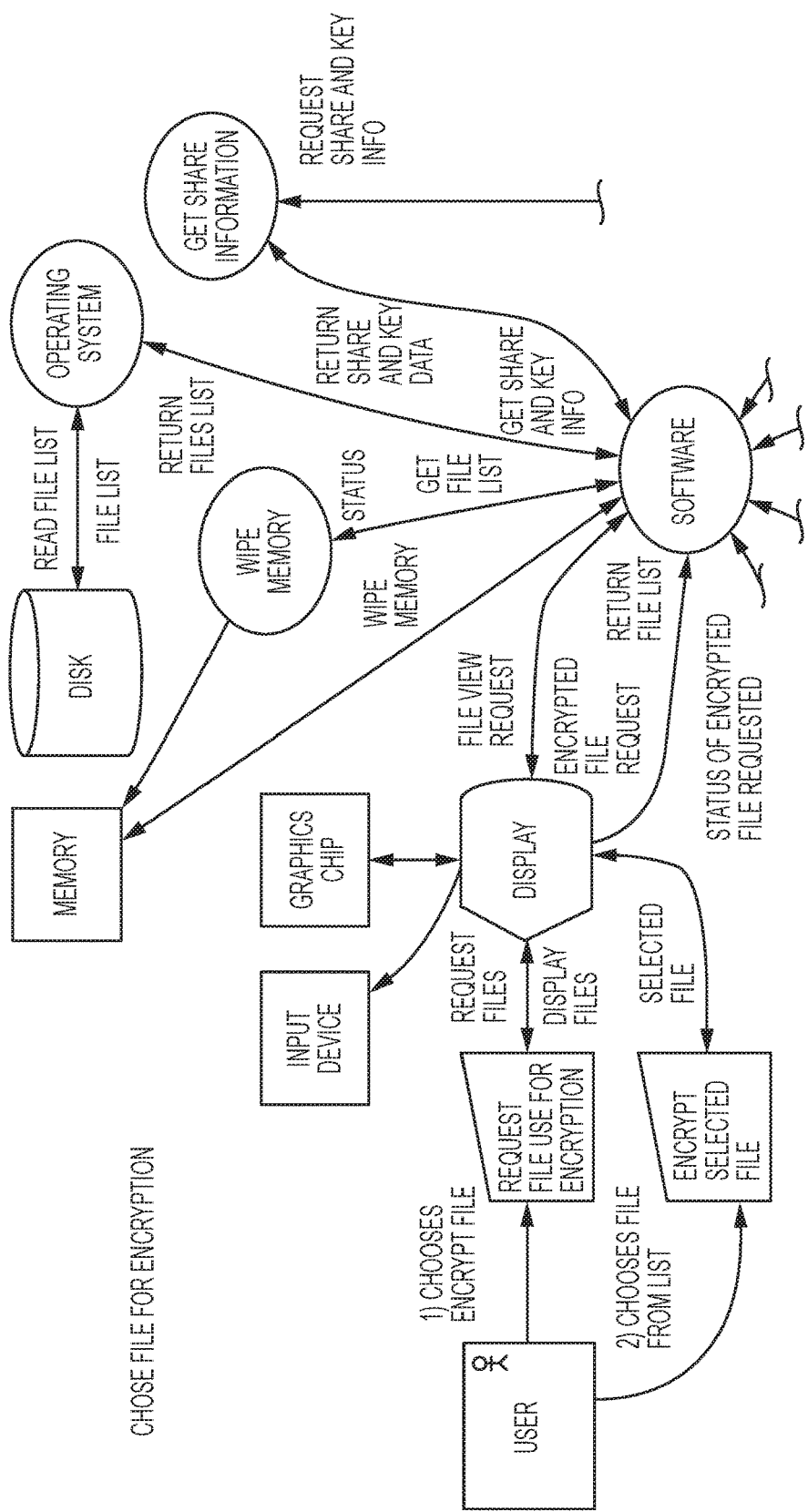
FIG. 45 is a data flow diagram according to aspects of the invention.
Figure 45:
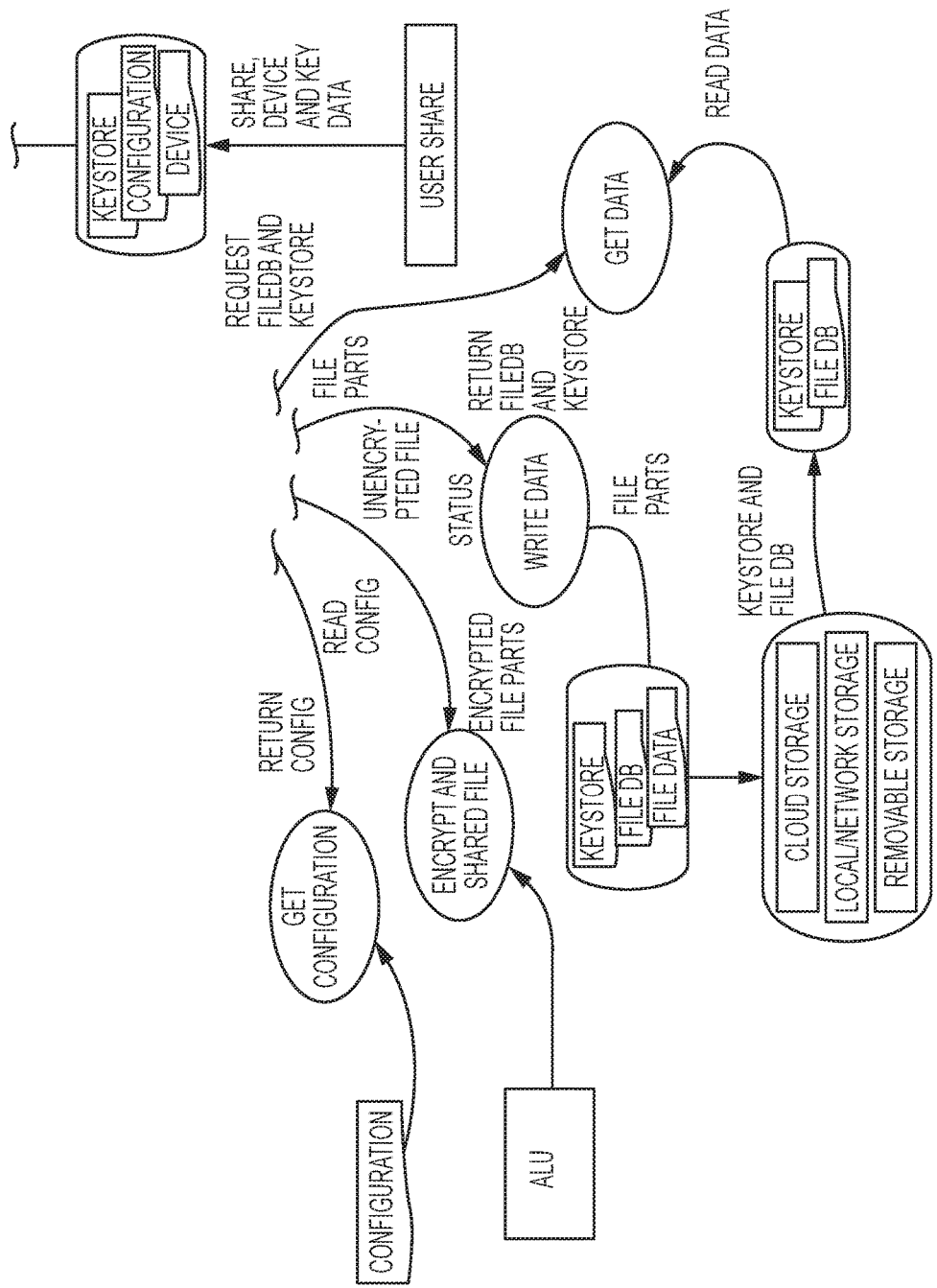

The application level components required regardless of the style of user interface or device used are (as shown in FIG. 43 providing a high level component architecture diagram):

1. Client Application Components
    a. Configuration Component API
    b. Application Components
      i. Storage Management
        1. Network Management
        2. Storage Management
        3. Cloud Management
      ii. Reporting Management
      iii. File Operations
      iv. File Sharing
      v. Device Management
      vi. Access Management
    c. UI Components
      i. Web Interface
      ii. Thick Client
      iii. Language 2. Application Network Components
3. Reporting Components
   a. Reporting API
   b. Reporting Component
   c. DB Component
   d. Logging Component
4. File Processing Components
   a. File Handling API
   b. RAID HA Component
   c. File Splitting Component
   d. Encryption Component
   e. File DB Component
5. Relying Trust Components (CRC Services)
   a. Web Components API
   b. Registration Components
      i. License and User Storage
   c. Licensing Component
   d. Payment Component For an example of basic file operations regardless of needed action, see the file operations of FIGS. 13a and 13b.

Figure 1A:
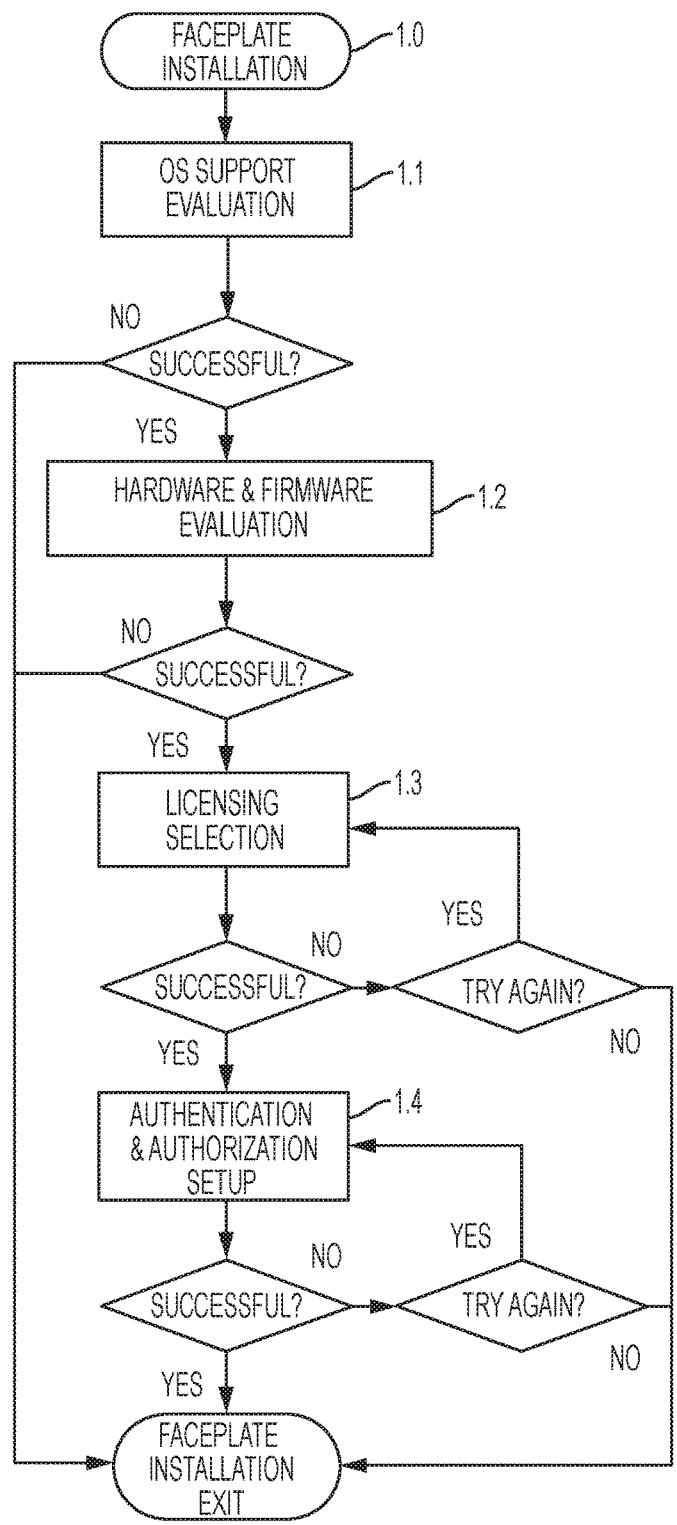
FIG. 1a shows an installation process 1.0 in accordance with certain aspects of the invention.
Figure 1B:
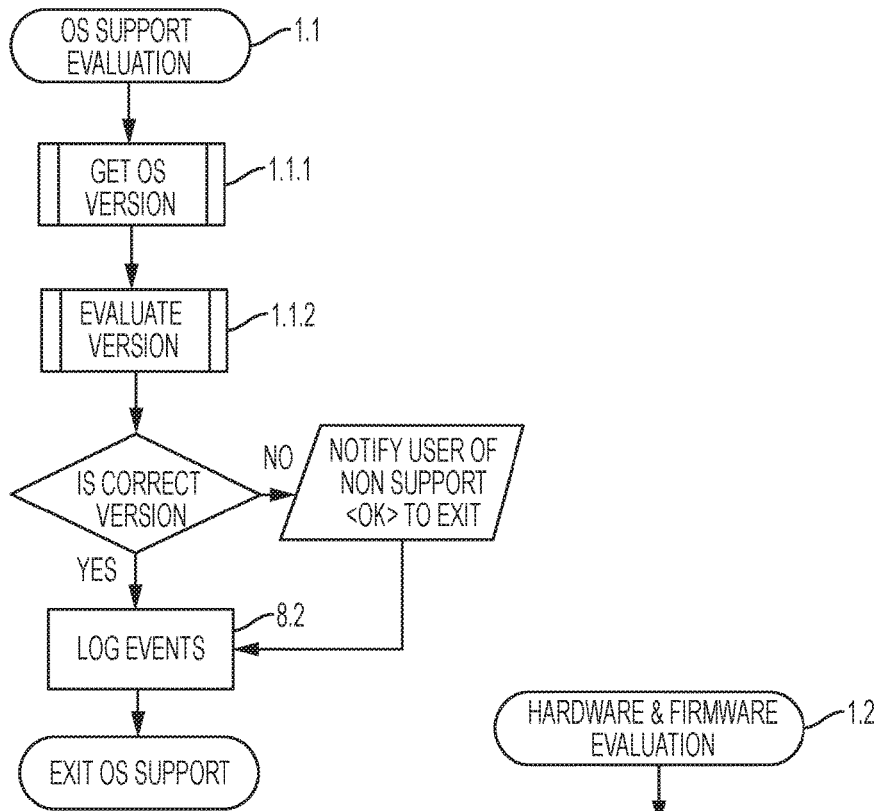
Figure 1C:
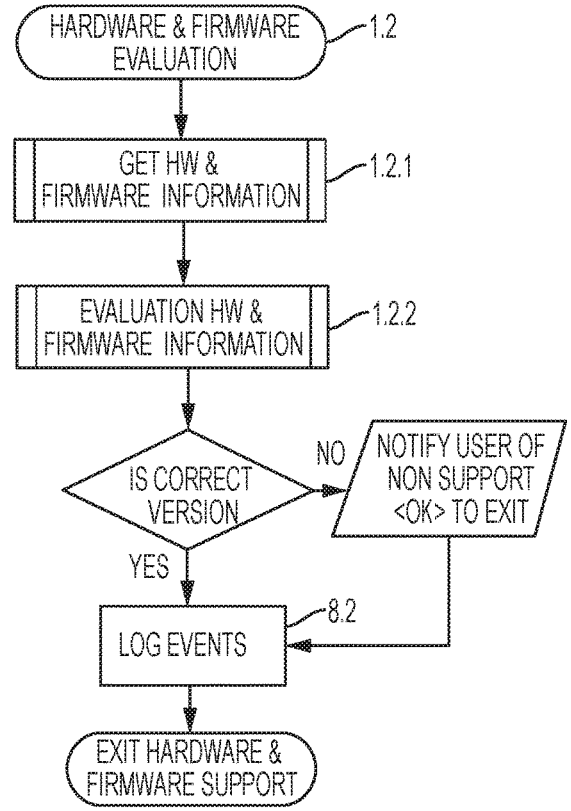
Figure 2A:
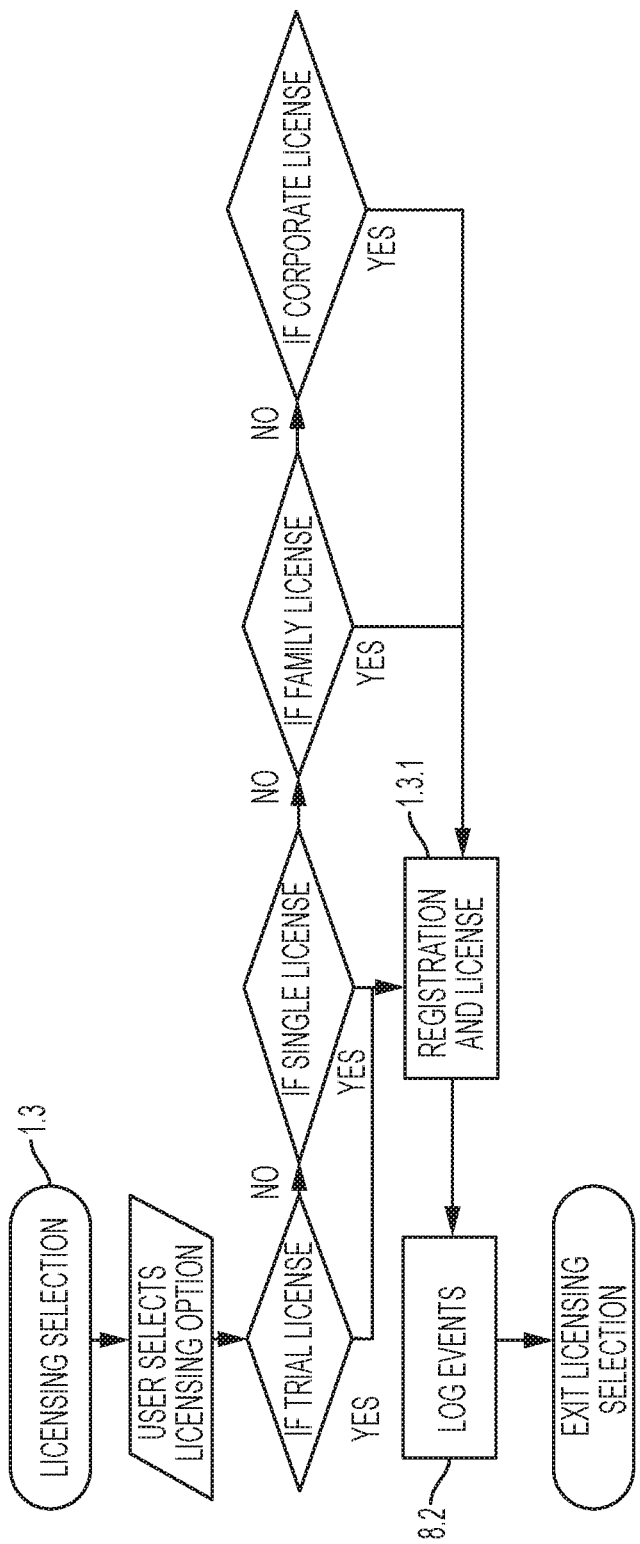
Figure 2B:
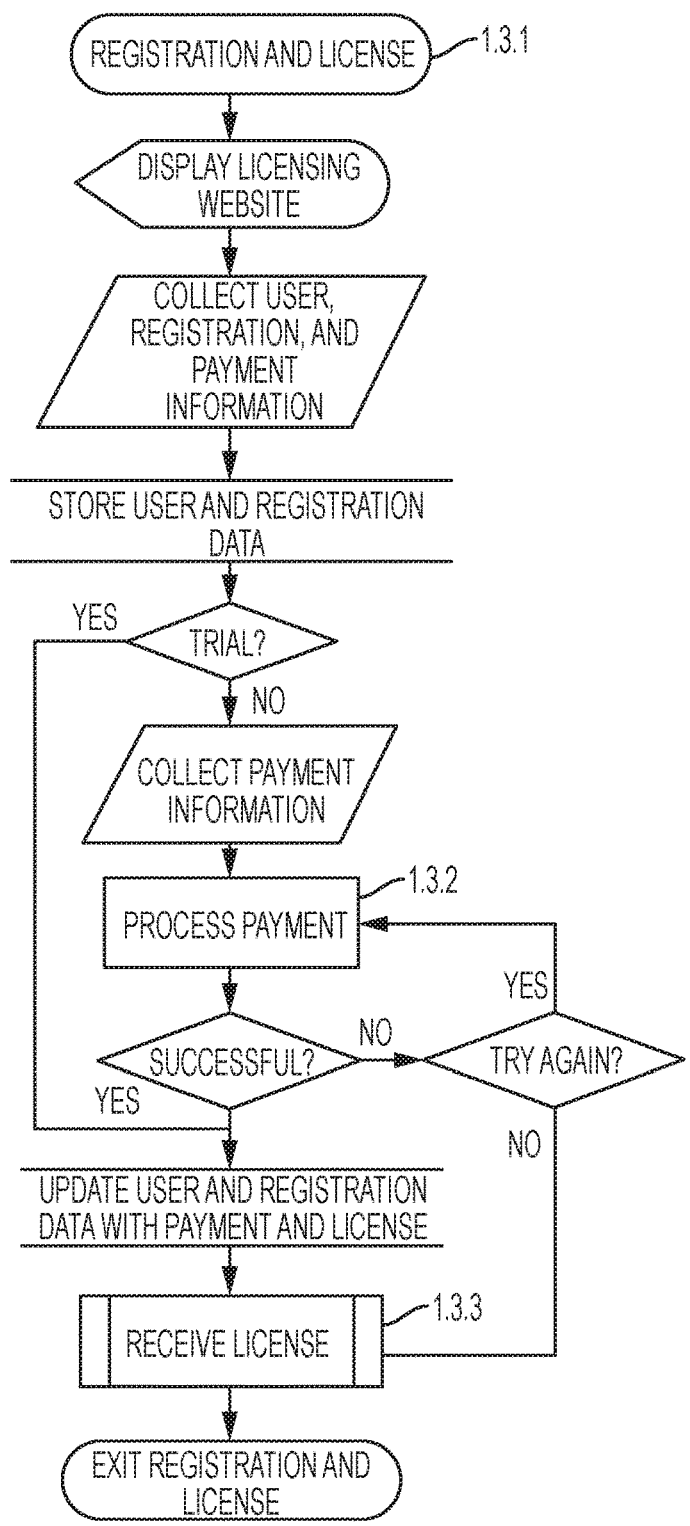
Figure 3:
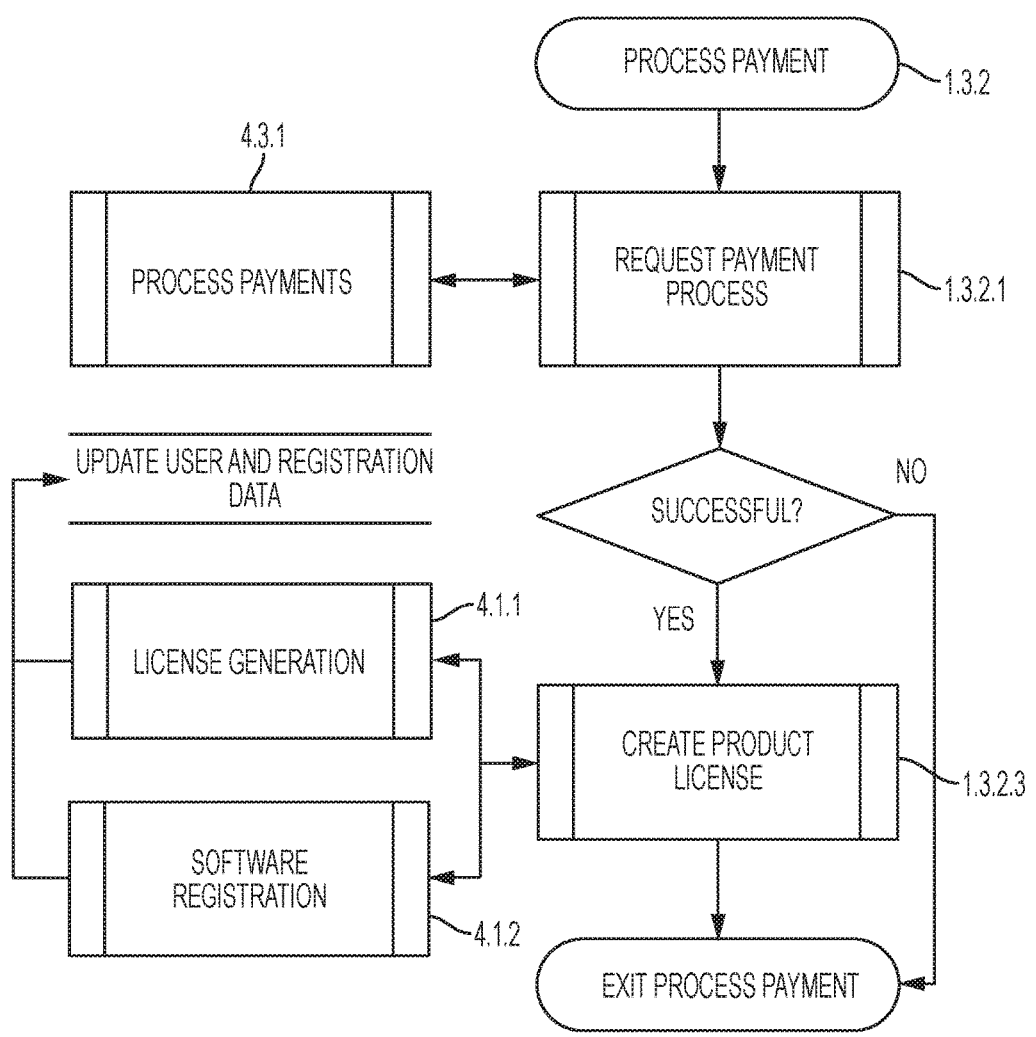
FIG. 3 shows a process payment process 1.3.2 for use in the registration and license process of FIG. 2b.
Figure 4:
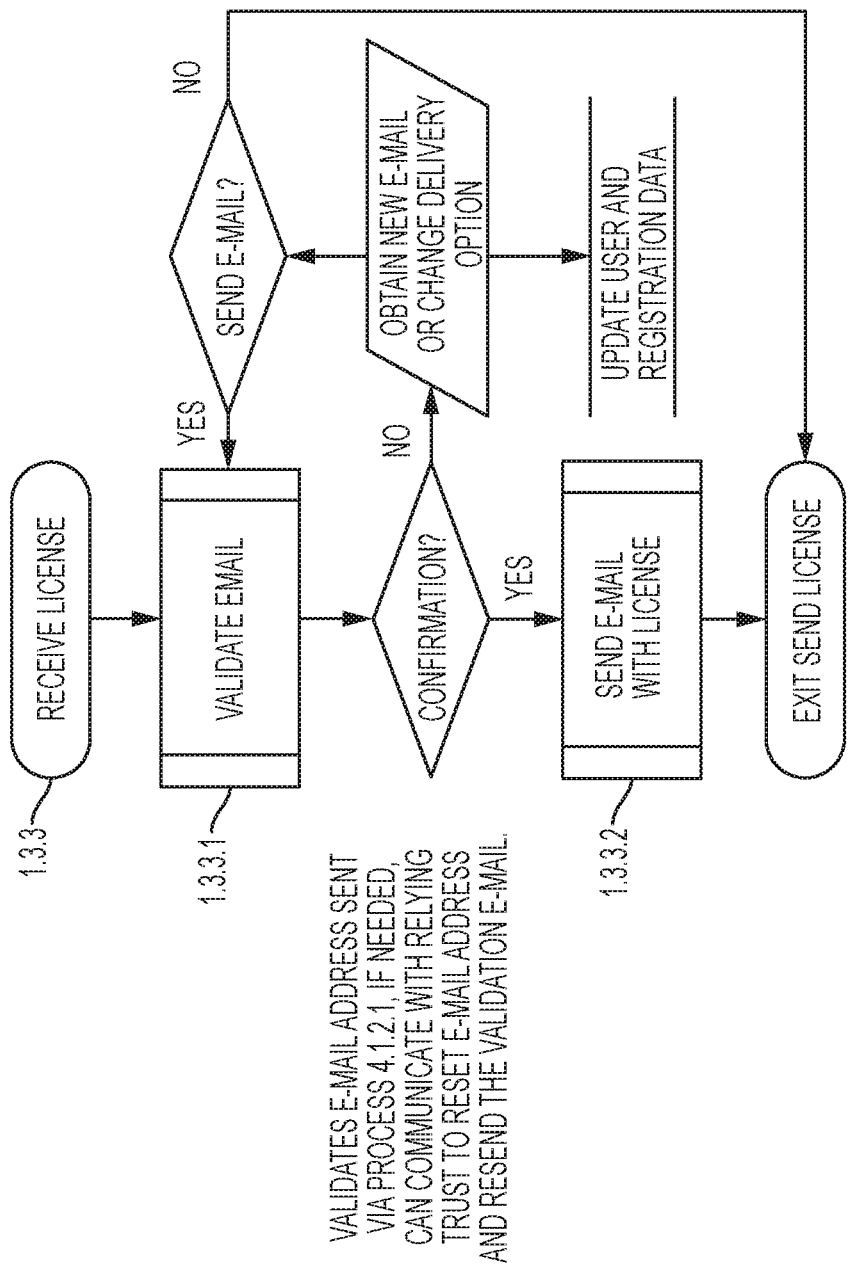
FIG. 4 shows a receive license process 1.3.3 for use in the registration and license process of FIG. 2b.
Figure 5:
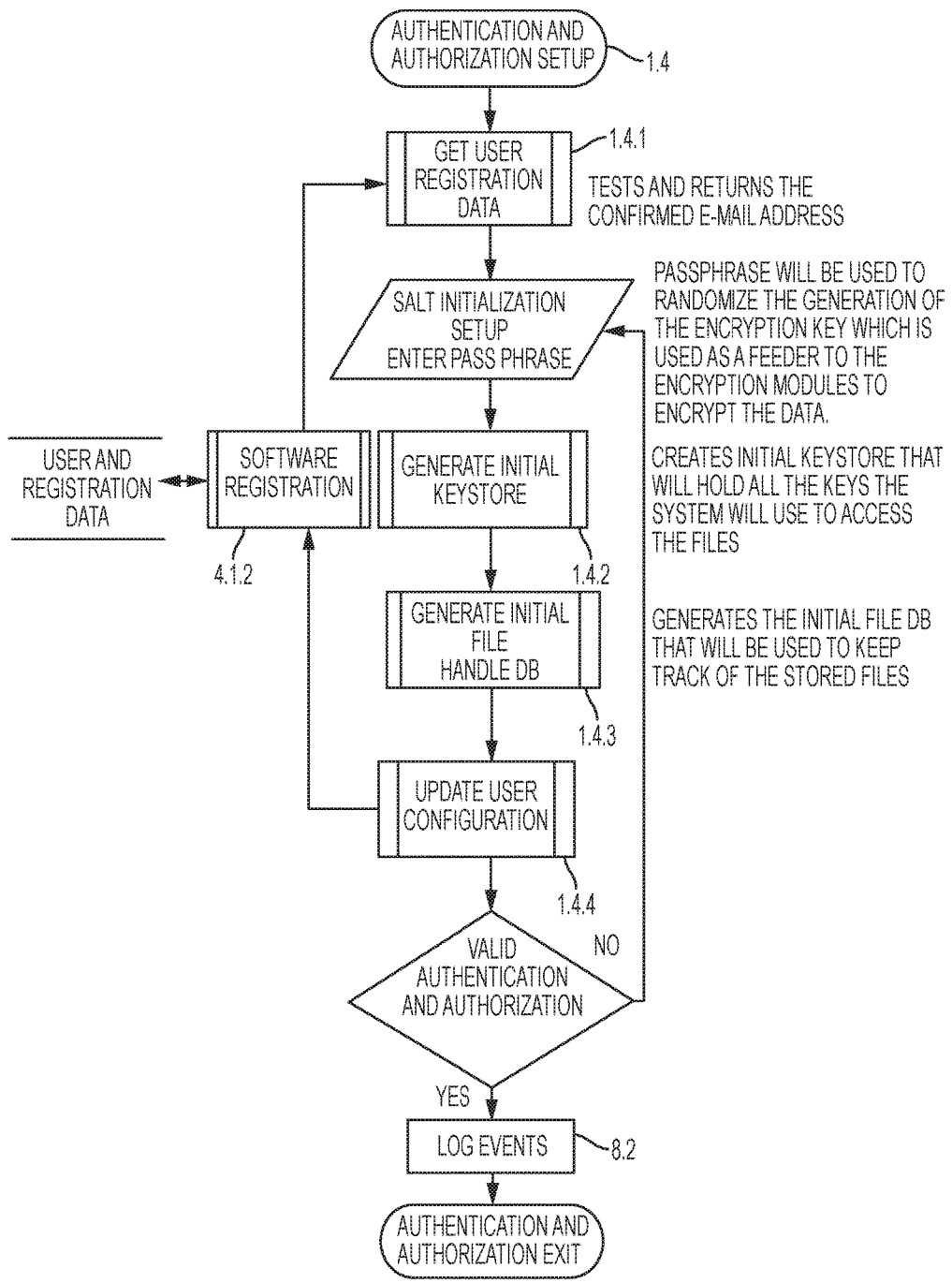
Figure 23C:
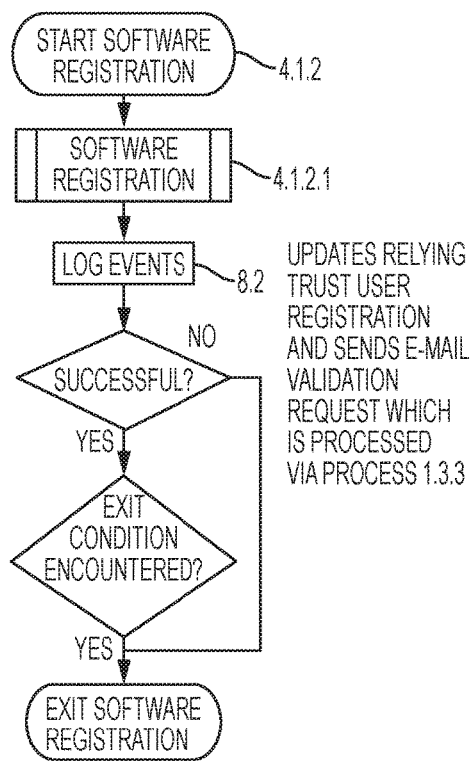
Figure 25B:
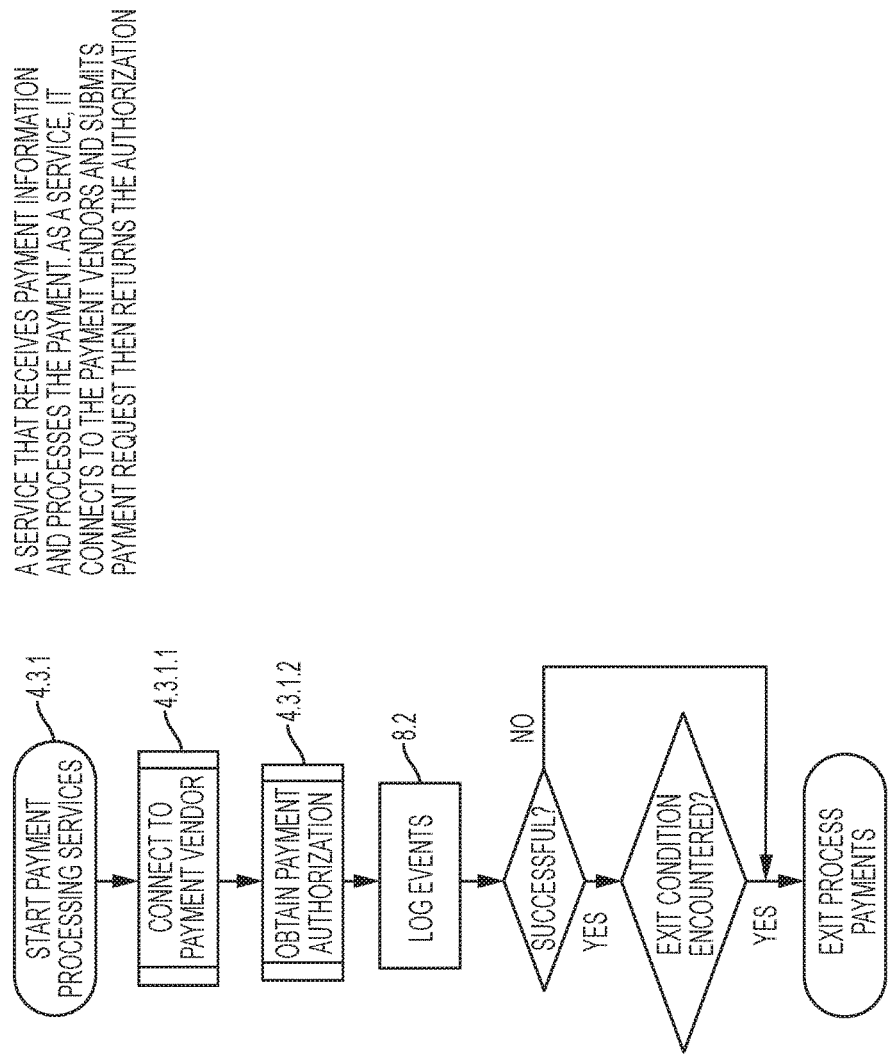
Figure 26A:
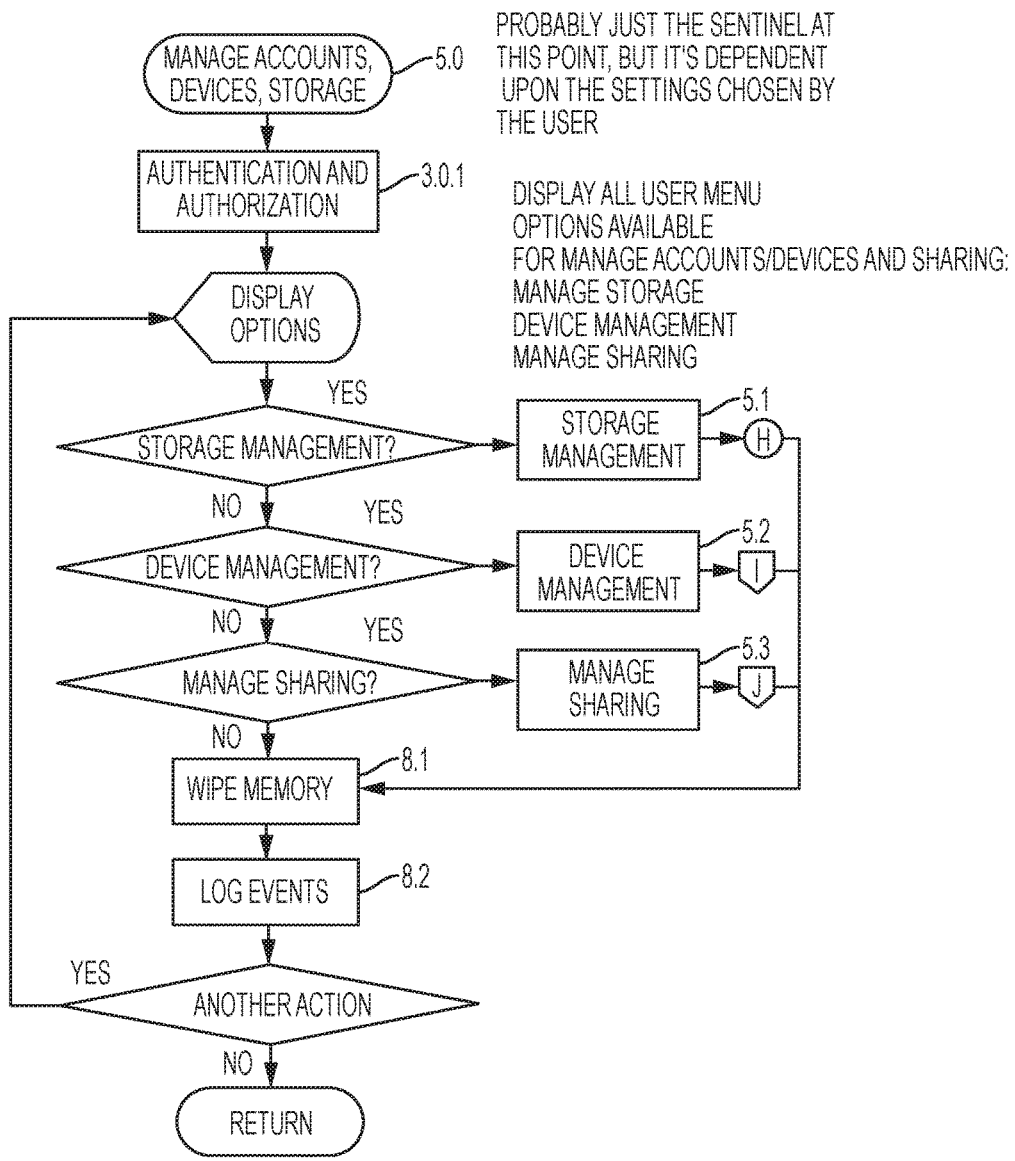
FIG. 26a shows a manage accounts, devices, and storage process 5.0 in accordance with certain aspects of the invention.

Next, as shown in FIGS. 1a and 26a, in order to install the software, a software distribution package is created using a tool that is capable of generating an RPM package and an executable file. The file, when installed on the appropriate device and launched by the user via the operating system ("OS"), will first perform the following functions: process 1.1, OS support evaluation. A web servlet based API will call to the OS to retrieve the current OS version. The version returned will be compared to known supported versions of the OS. If not satisfied, the software will notify the user and exit. If satisfied, the software will then evaluate the device as can be seen in process 1.2 of FIG. 1c. If not successful, the application will notify the user and exit. If successful, the application will continue with licensing selection, as shown in process 1.3 of FIG. 2a. Here, the user is presented with the option to choose, by way of non-limiting example, a trial license, single user license, a family license, a small business license or an enterprise license. FIG. 2b shows the flow of the licensing process. A person, utilizing a web API, is presented with the interface that will collect enough user information to satisfy licensing and registration. This includes, but is not limited to, user information and registration information. If the user has selected a trial license, the CRC services user and registration data store is updated. Process 1.3.3 of FIG. 4 is called to validate the user-supplied e-mail and, once confirmed, a license is generated and sent to the user. If unable to confirm, the user is presented with the option to change the e-mail address and retry the process. Should the user choose to purchase a license, the software will present a web-based UI to capture payment information and process that payment via the process 1.3.2 of FIG. 3. Utilizing the server process 4.3.1 of FIG. 25b, the information necessary to process the payment is received, the system connects to a payment vendor, process 4.3.1.1, obtains authorization of payment, process 4.3.1.2, and creates a product license, process 1.3.2.3 (FIG. 3). The create product license process interacts with the relying party trust to generate the license and register the license, storing and updating the information in the data store. Once complete, process 1.4 (FIG. 5) is executed to allow for the initialization of the software, including capturing the passphrase used for the salt value along with the license number just obtained, and generating the initial keystore, with the File DB storing and logging the events. Well known connection protocols of the network API are used to connect to the relying party trust, process 4.1.2 (FIG. 23c), which provides an external service to retrieve and update user and registration data.

Once the software is installed on the device, the setup process will launch. This process, defined in FIG. 6a, will optionally guide the user through the following default setup processes: file management, storage management, network management, device management, access management, and a review setup process. A person skilled in the art will ensure that each default item is well defined for the device and operating system combination being setup. Should the user choose to accept the default installation, the set of configuration items accepted may include, but are not limited to, the following:

File Management, process 2.1 (FIG. 6b), establishes the working directory, which is the location where the application will perform intermediate work when encrypting, decrypting and shredding files.

Storage Management, process 2.2 (FIG. 6c), sets the file storage RAID by default to RAID 1. This means that the file is encrypted and not split into parts, with redundancy applied. In short, an exact copy of the file is made, encrypted and stored. No RAID is applied to the keystore, FileDB, or configuration file when these default conditions are accepted. In order for RAID 1 to be accomplished, a person skilled in the art will set and create two different default locations for the files to be stored on the local device.

Figures 10A, 10B:
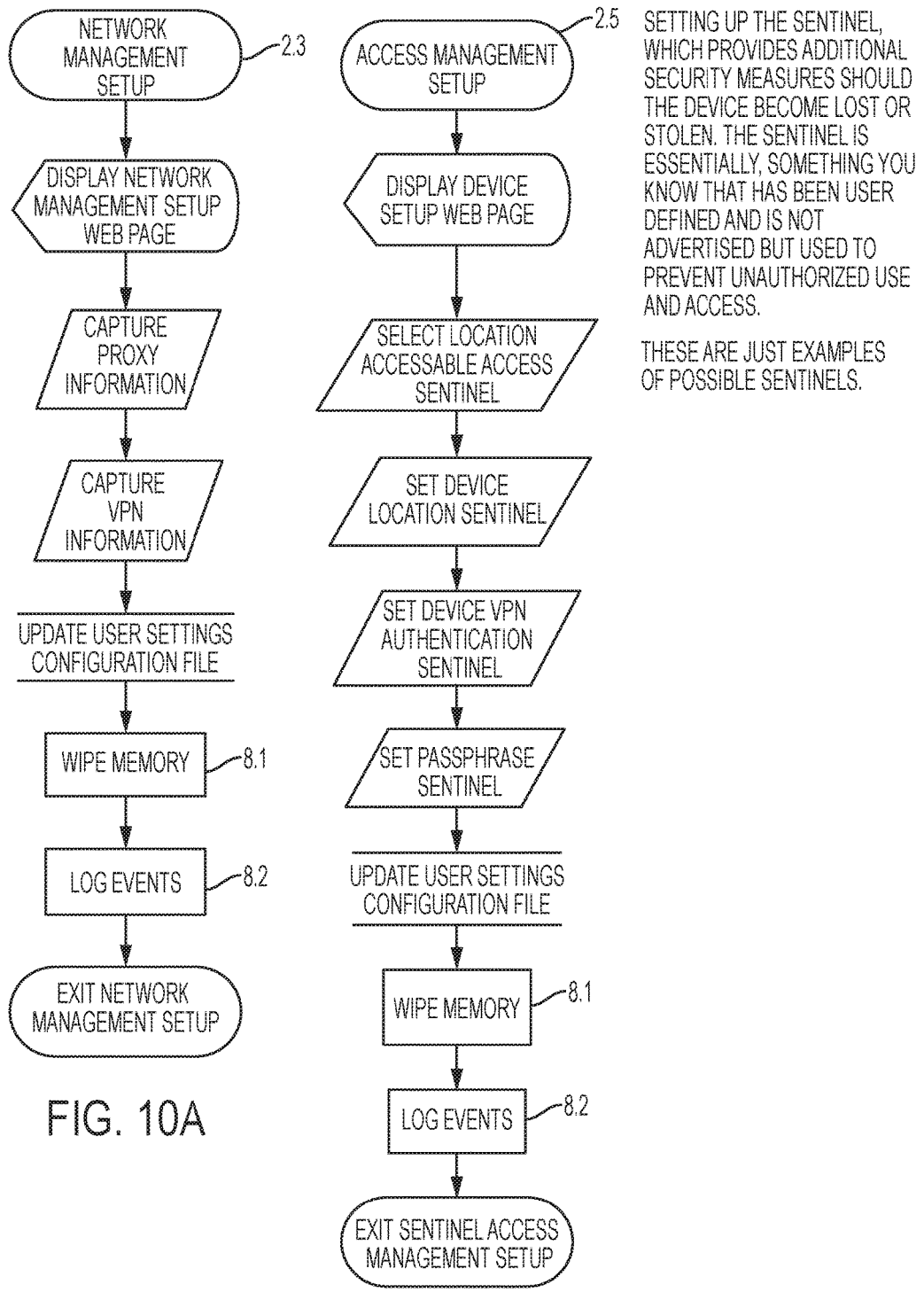
Figure 10C:
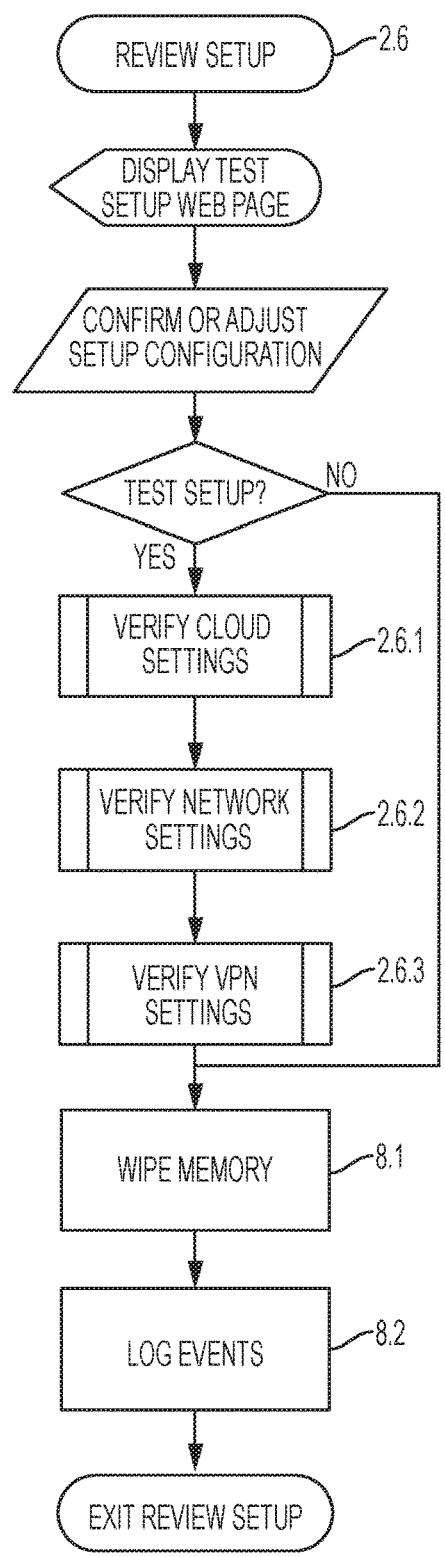

The setup process will then proceed to process 2.6 (FIG. 10c), in which the application will interact with the graphics chip to display the web page, summarizing the user selections and presenting the user with the option to test the setup. The selections are shown in editable form, allowing for changes to be made should the user so decide. A successful test will be displayed to the user, and the user will confirm their instruction to exit from the process. Should the test fail, the application flow, as in process 2.0 (FIG. 6a), will allow the choice of returning back to the test page or starting over with the setup process.

In the case that the user chooses not to accept the default setup, the system, using a web-based application using well known procedures and well known protocols, interacting with the graphics chip will walk the user through the setup process. The application will guide the user through the following processes:

File Management (process 2.1, FIG. 6b)—the web page will capture the user decisions for working directory or directories, and the clean wipe settings. Working directories have already been described above. Clean wipe, a yes/no toggle, instructs the application to remove any residual intermediate data that can be recovered by typical forensics processes or applications. This applies to disk use and memory use. Known techniques may be employed to scrub magnetic drives and zero out memory, specific to the device type in use by the user, by effectively writing over the data as needed to make it effectively useless. When the process completes, the application will wipe the memory (process 8.1), log events (process 8.2), exit file management setup and proceed to storage management.

Figure 7:
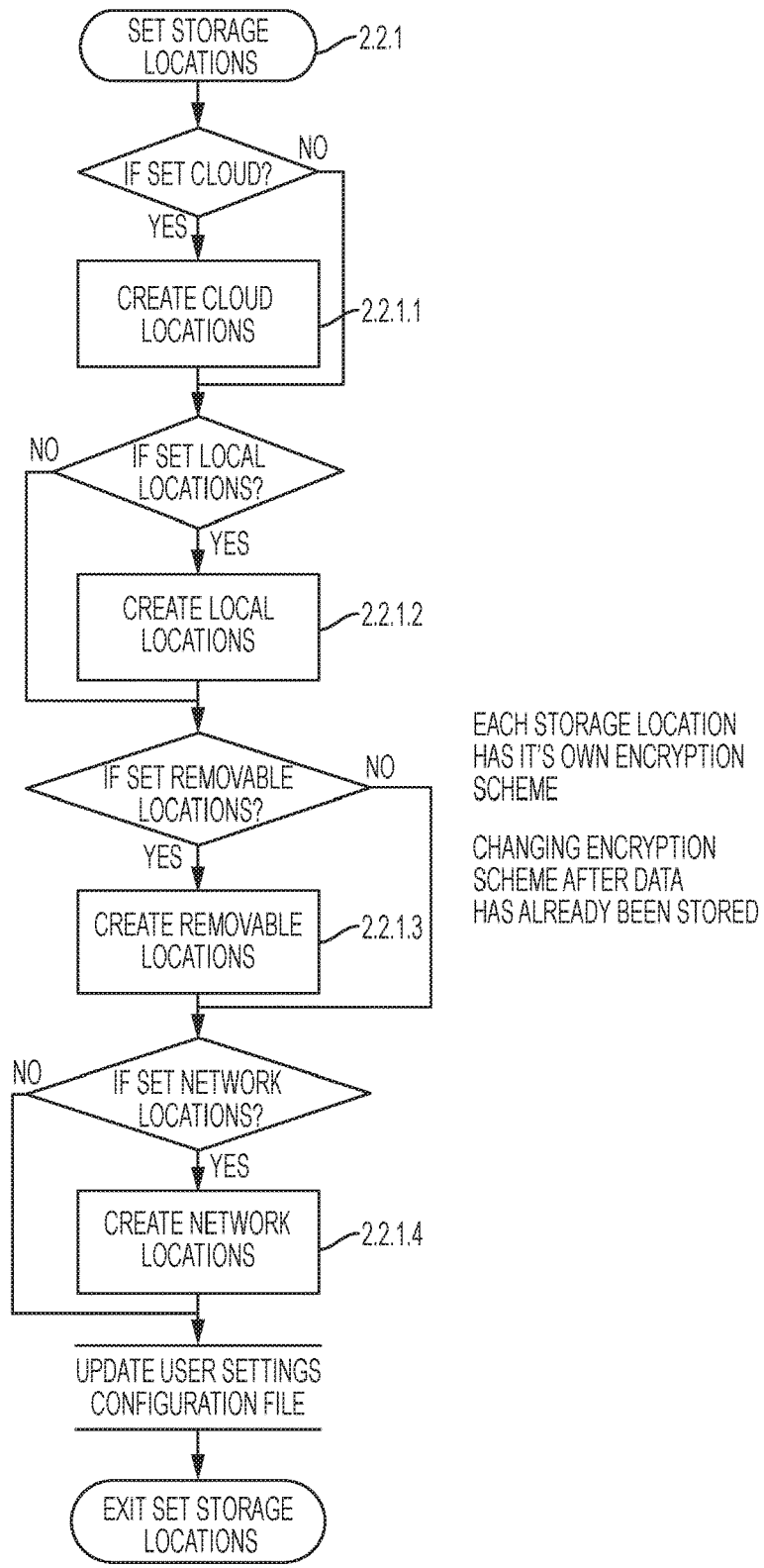
FIG. 7 shows a set storage locations process 2.2.1 for use in the storage management setup process of FIG. 6b.

Storage Management (process 2.2, FIG. 6c)—the web page will capture the RAID decisions for the following files: file, keystore, FileDB and configuration. Once set, the user configuration file is updated as seen in process 2.2. The user interface will then guide the setup of the storage locations as depicted in process 2.2.1 of FIG. 7. Optionally, the application will allow the following types of locations to be defined, including but not limited to: local storage (process 2.2.1.2 of FIG. 8b), removable storage (process 2.2.1.3 of FIG. 9a), network storage (process 2.2.1.4 of FIG. 9b), and cloud storage (process 2.2.1.1 of FIG. 8a). For each storage type defined, check N counter, process 2.2.1.1.1 (FIG. 12) is called to optionally adjust the RAID settings or add the new storage in support of the storage already allocated, optionally set the encryption scheme, allow the user to assign the storage, and store the settings changes to the configuration files. Upon exit, the system continues with the storage location setup. A person skilled in the art using the web interface in conjunction with the graphics chip will capture the relevant information for each storage type.

For creating cloud locations (process 2.2.1.1), the application captures the cloud name, type, URL and user credentials. The process validates connection to the new storage location and updates the N counter as necessary, and as shown in process 2.2.1.1.1, updates the configuration file and proceeds to the next storage location setup or exits.

For creating local locations (process 2.2.1.2), the application follows the same basic process as create cloud locations. The name of the local storage locations and the path to the local storage location are captured, optionally creating the storage location as needed specific to the device type, updating the N counter (process 2.2.1.1.1) and the user configuration file and proceeding to the next storage location or exits.

For creating removable locations (process 2.2.1.3), the application performs the same process as create local locations, but involves working with removable media storage. In short, this includes any device that can be connected to a device, be a location for storing data, removed, reconnected to the device and have its data retrieved. Examples include, but are not limited to, SD cards, USB connected thumb drives, USB connected hard drives, read/write CD/DVD/BR, optical disk, tape drives, and printer file storage.

For creating network locations (process 2.2.1.4), the application designates network storage devices. Examples may include network attached storage (NAS), disk arrays, local area network (LAN), and virtual private networks (VPN's). The principal distinction from removable locations is that the network locations are attached to the device via a network where there is usually some form of controlled access but are not actively managed by vendors such as those defined in cloud locations. The same process applies here as in process 2.2.1.3, but with the addition of optionally capturing user network credentials.

Network management (process 2.3 of FIG. 10*a*)—the necessary information for working with the device in a controlled environment is collected, such as those found in most corporations or businesses. The configuration items captured here setup access through the network traffic so that authorization is required, including but not limited to proxy information and VPN settings. The graphics chip and web API will display the web pages needed to collect the information and then subsequently store this information, and perform wipe memory process 8.1 and log events process 8.2.

Device management (process 2.4 of FIG. 11)—users may register their devices during the initial setup. The graphics chip and web interface will check for a previously licensed device in case of a reinstall. If not found, the process will collect the device type, device name, authentication and authorization and export methodology for the device configuration backup. The backup process 2.4.1 is optionally called and the user setting saved to the configuration file. The memory is wiped and events logged as previously defined.

Access management (process 2.5 of FIG. 10*b*)—the application sets up user defined sentinels that only the user knows about. They aid in preventing unauthorized use or action should the user's device become lost or stolen. Examples of a sentinel include but are not limited to set up of an access sentinel, network sentinel, passphrase or sharing sentinel. Through designating such a sentinel, prior to performing the action, the application will check to make sure that the sentinel is satisfied. This may or may not require user interaction with the application. In process 2.5, the graphics chip and web API will present and capture sentinel information and store it in the user configuration file.

Review setup (process 2.6 of FIG. 10*c*)—the graphics chip and web API present a summary of the settings to the user. The confirmation process verifies the cloud settings, network settings, and VPN settings if chosen. Verification involves expert knowledge of the different settings, such as connecting to the cloud or verification of the VPN settings by successfully logging into the VPN. The status of the test is displayed to the user, logged and wiped from memory. If successful, the setup exits. If not, the flow of the software, via process 2.0 (FIG. 6*a*), gives the user the opportunity to fix issues and proceed back through the testing of the setup.

Once the setup process is complete, the software can be managed as defined in process 5.0 of FIG. 26*a*. Process 1.0 (FIG. 1*a*) shows installation, process 2.0 (FIG. 6*a*) shows the setup of the application, and process 3.0 (FIG. 13*a*) shows the operational use of the software. The graphics chip, via the web API and CPU and system memory, will present the user with a web-based presentation tailored to the device in use by the user. The menu will provide the user the ability to perform functions including, but not limited to, manage storage, device management, and manage sharing, all as discussed further below. Upon completion of the action, the memory will be wiped as shown in process 8.1, and the events logged as shown in process 8.2. The user will then be returned to the main menu or allowed to exit.

Figure 26B:
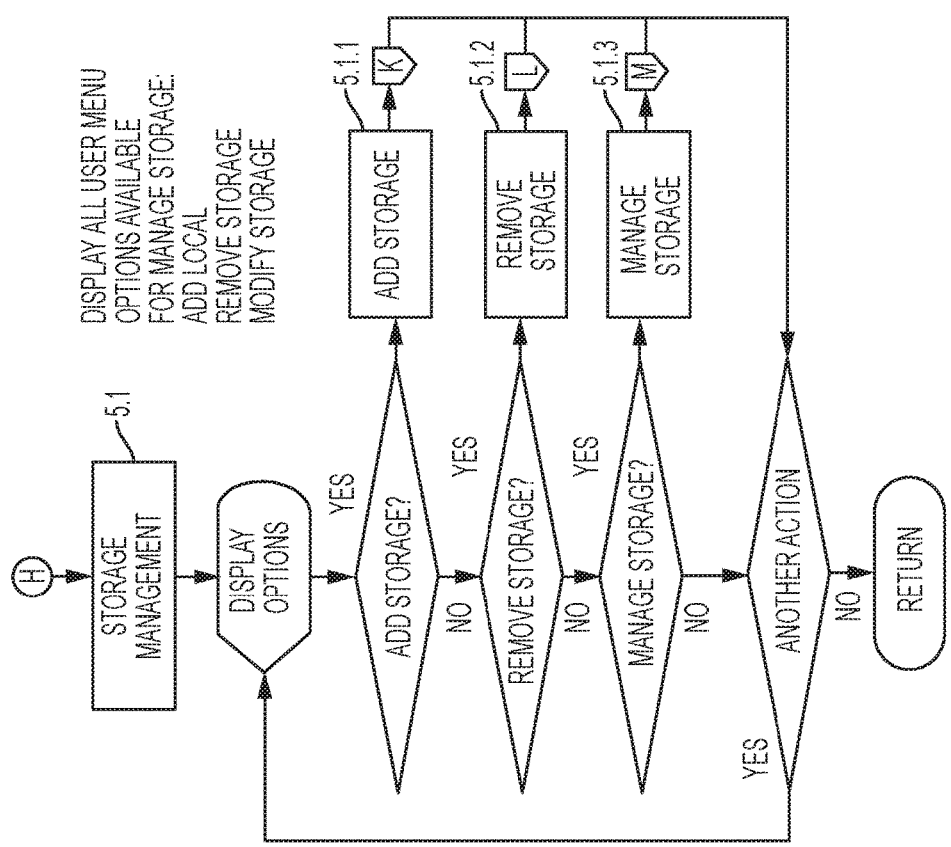
Figure 27:
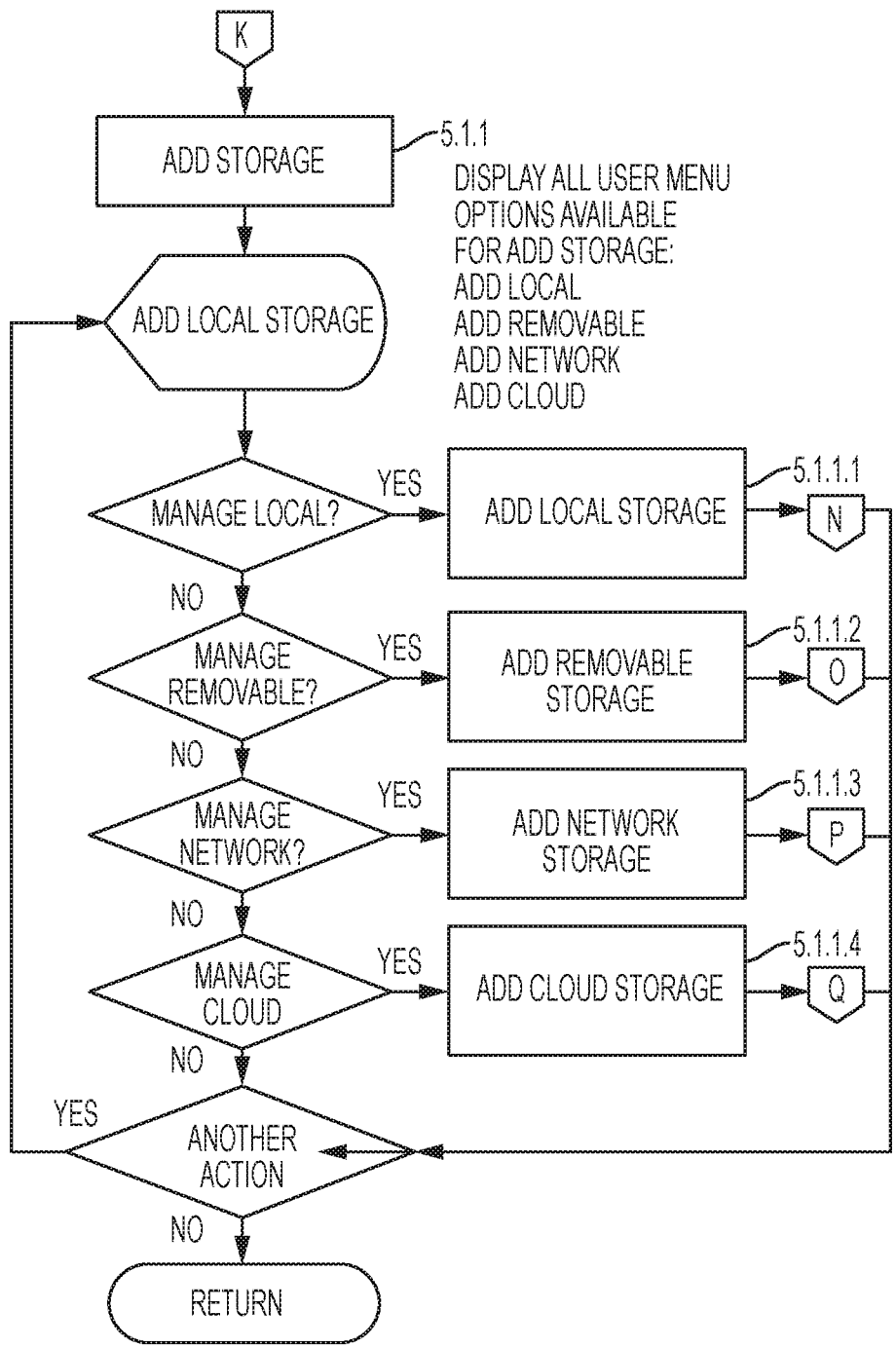
FIG. 27 shows an add storage process 5.1.1 for use with the storage management process of FIG. 26b.
Figure 30A:
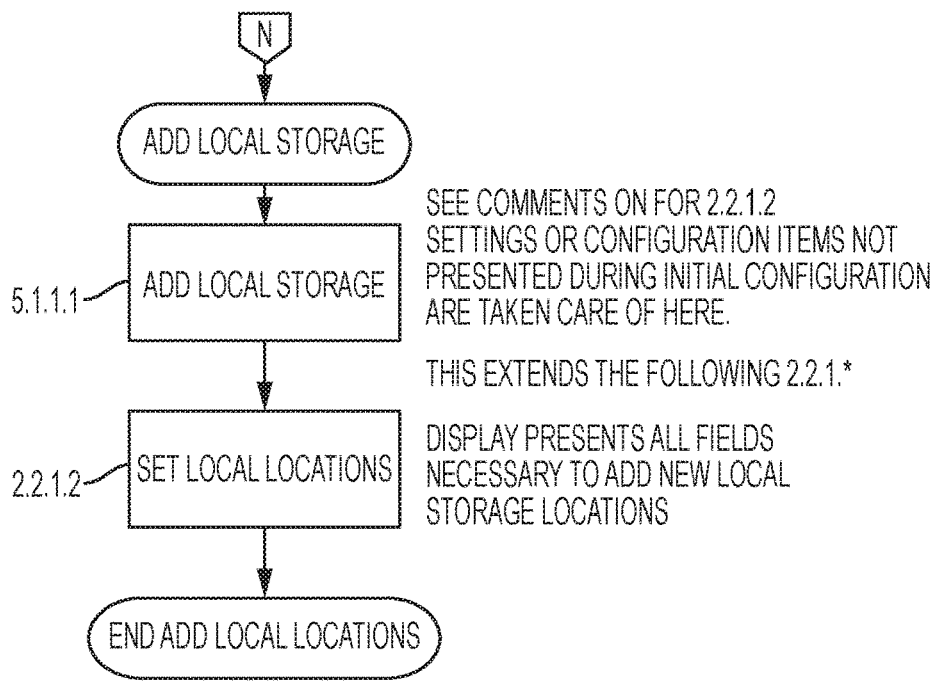
FIG. 30a shows an add local storage process 5.1.1.1 for use with the add storage process of FIG. 27.
Figure 30B:
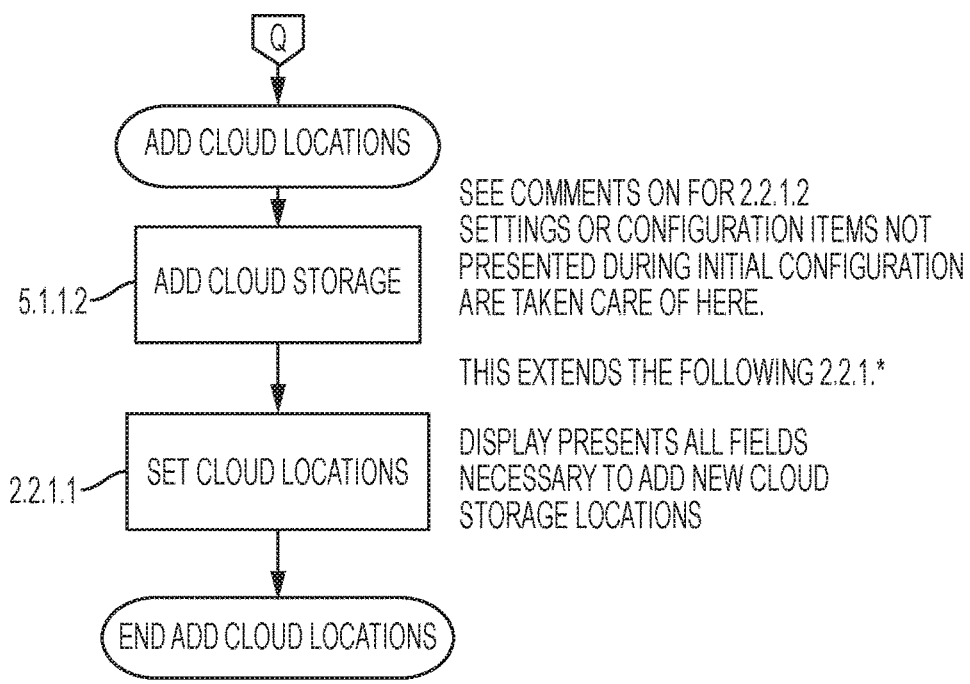
FIG. 30b shows an add cloud locations process 5.1.1.2 for use with the add storage process of FIG. 27.
Figure 30D:
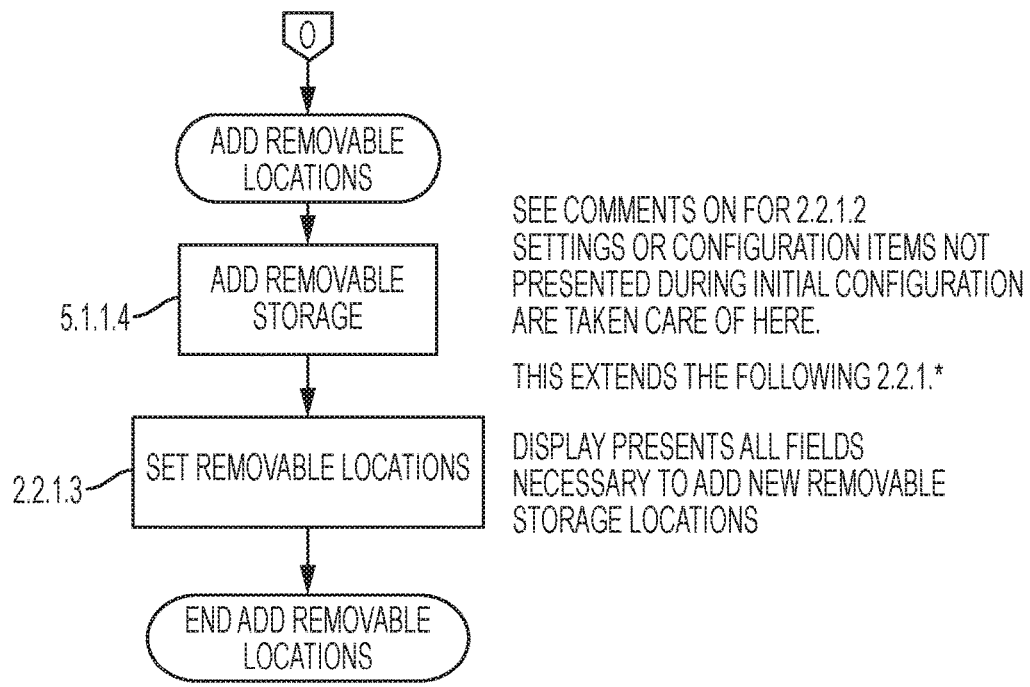
FIG. 30d shows an add removable locations process 5.1.1.4 for use with the add storage process of FIG. 27.
Figure 30C:
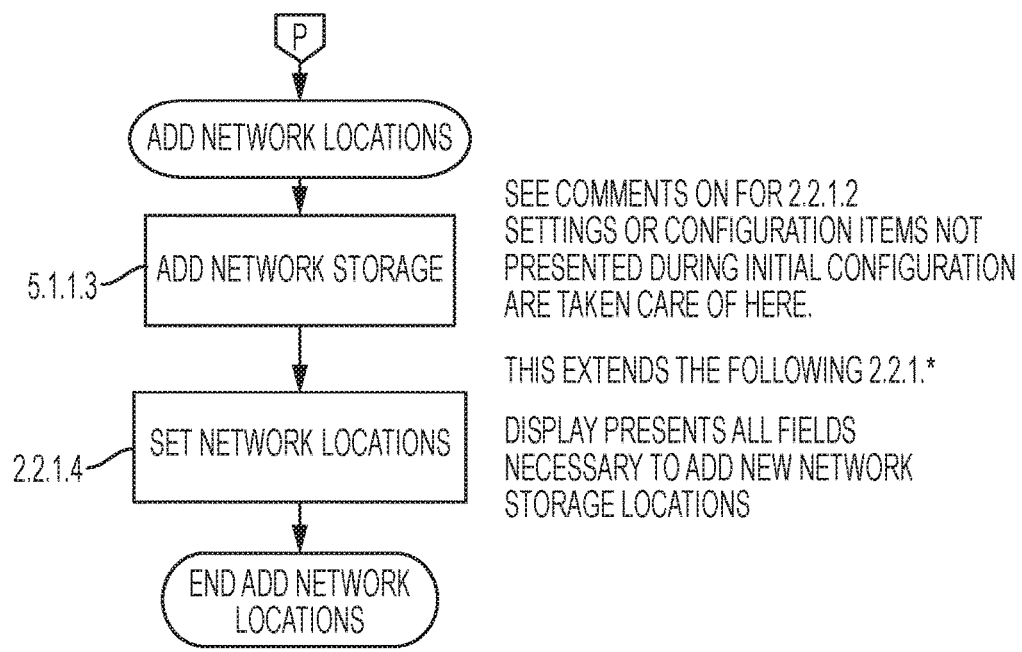
FIG. 30c shows an add network locations process 5.1.1.3 for use with the add storage process of FIG. 27.
Figure 31:
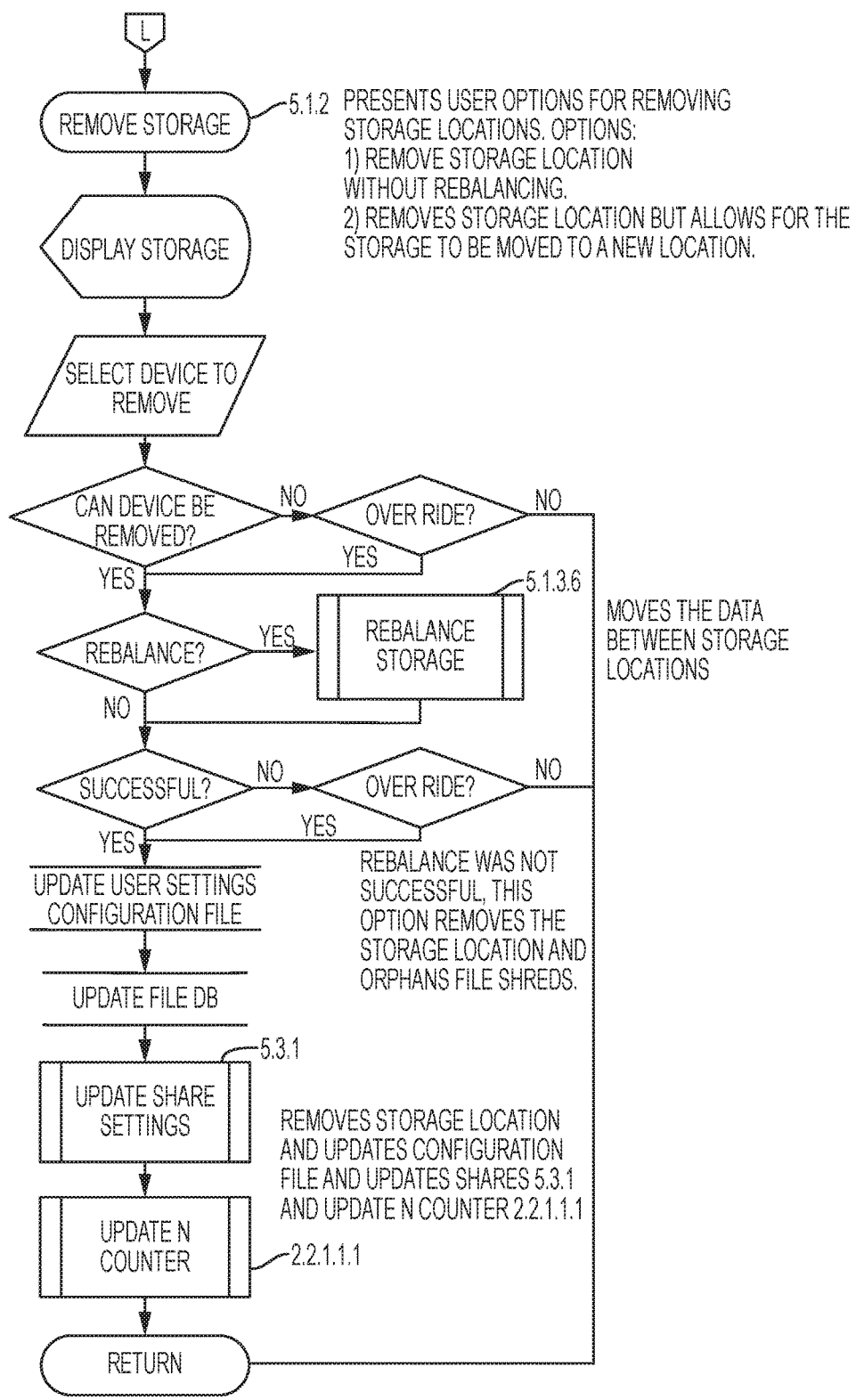
FIG. 31 shows a remove storage process 5.1.2 for use with the storage management process of FIG. 26b.
Figure 32:
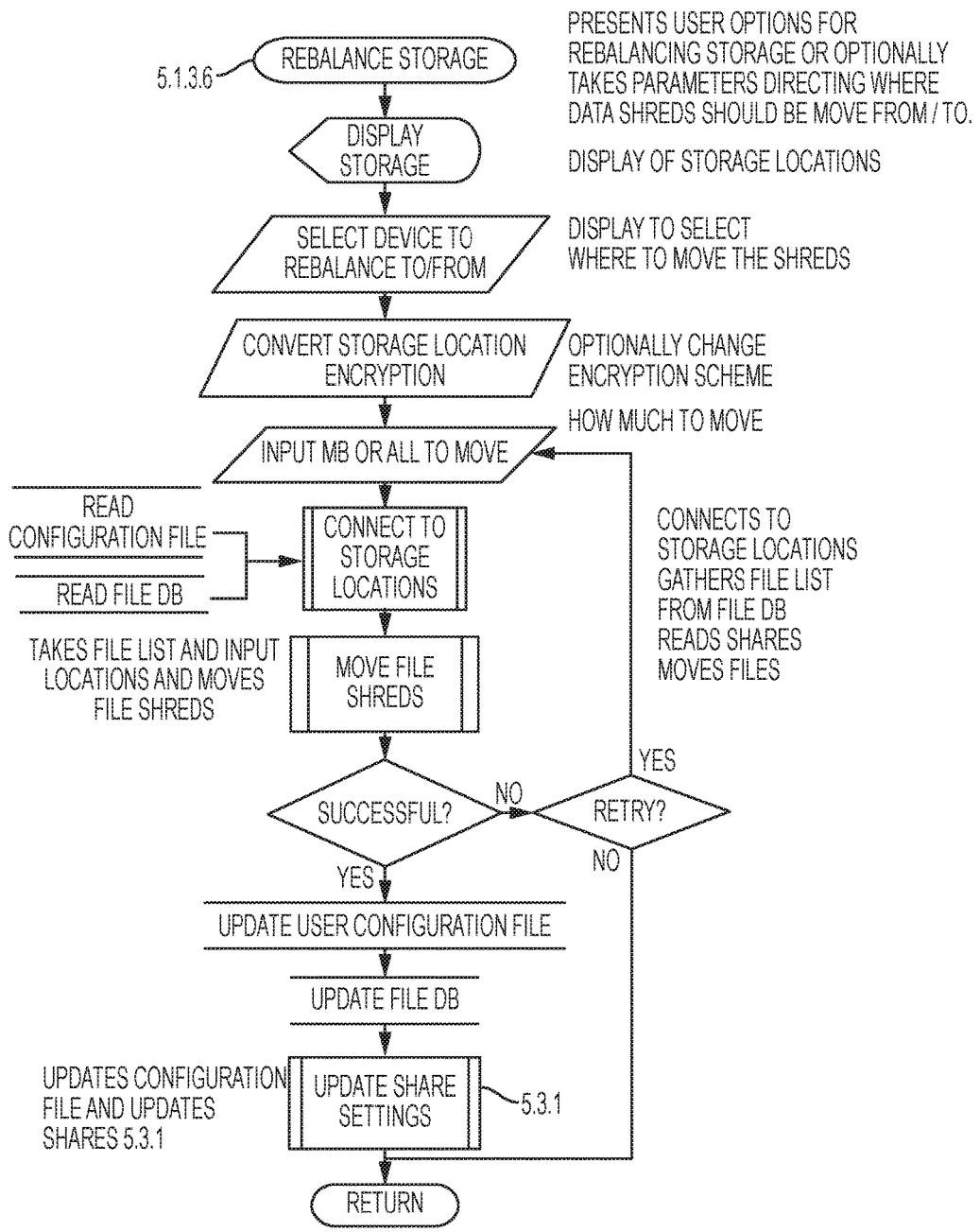
FIG. 32 shows a manage storage process 5.1.3 for use with the storage management process of FIG. 26b.
Figure 33:
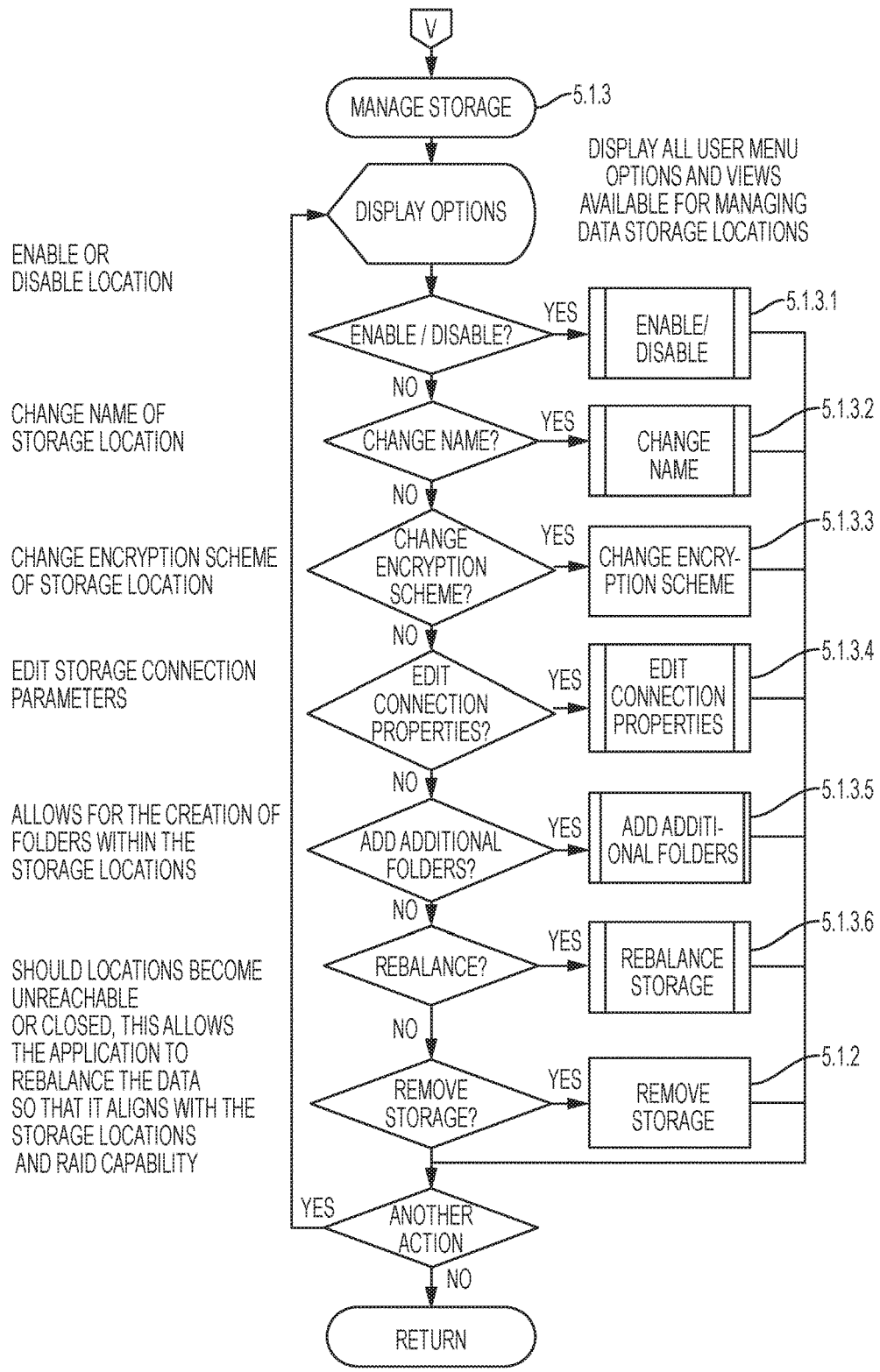
FIG. 33 shows a rebalance storage process 5.1.3.6 for use with the manage storage process of FIG. 32.

Managing storage, as shown in process 5.1 of FIG. 26*b*, presents the user with the ability to add storage (process 5.1.1 of FIG. 27), remove storage (process 5.1.2 of FIG. 31), and modify storage (process 5.1.3 of FIG. 32). Process 2.2.1.1.1 (FIG. 12) is called from all of the processes above, but from within the processes defined for the different storage types represented by add local storage process 5.1.1.1 (FIG. 30*a*), add cloud storage process 5.1.1.2 (FIG. 30*b*), add network storage process 5.1.1.3 (FIG. 30*c*), and add removable storage process 5.1.1.4 (FIG. 30*d*). A person skilled in the art may extend the 2.2.X storage locations for use here.

More particularly, add storage process 5.1.1 enables a user to perform the following processes.

Figure 8A:
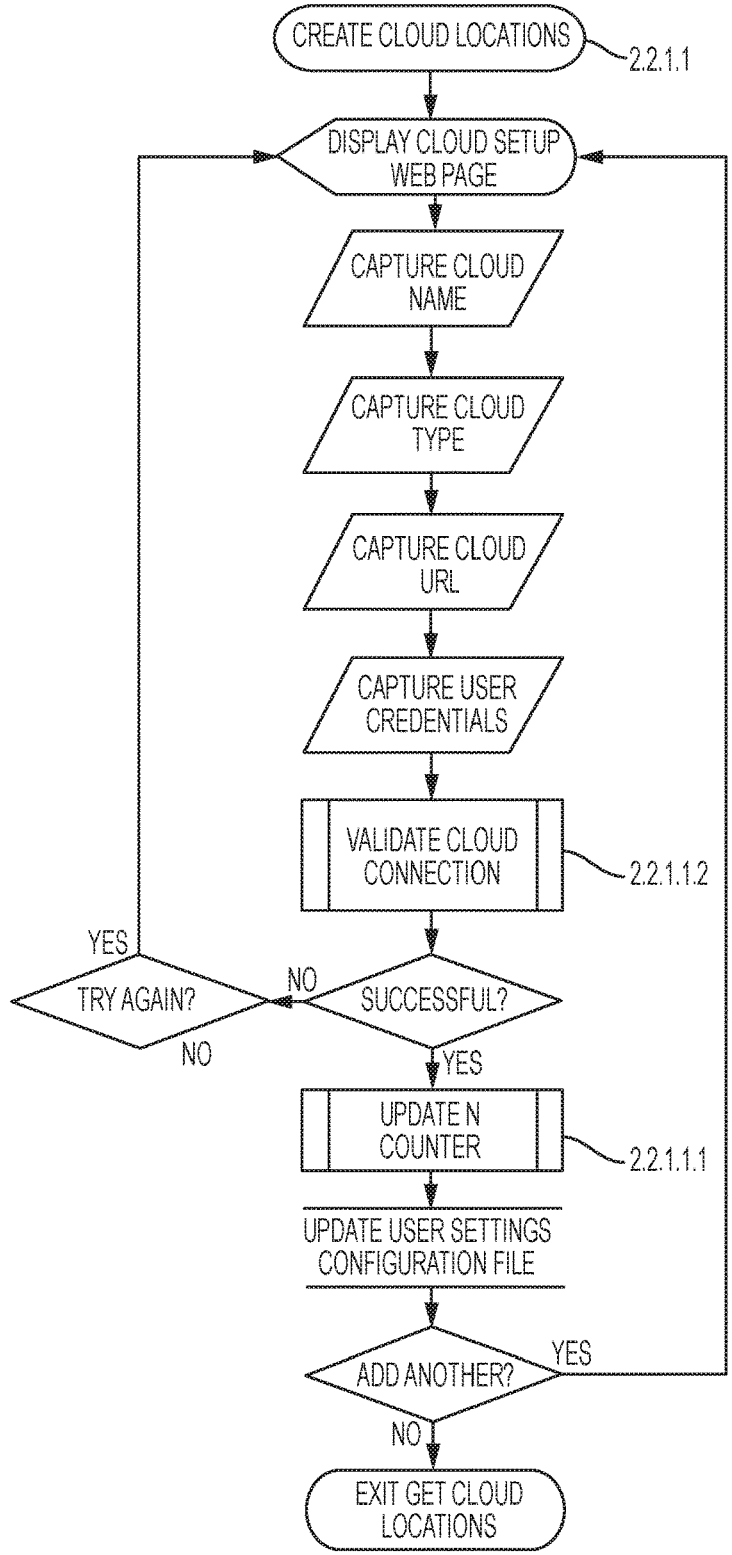
FIG. 8a shows a create cloud locations process 2.2.1.1 for use in the set storage locations process of FIG. 7.
Figure 8B:
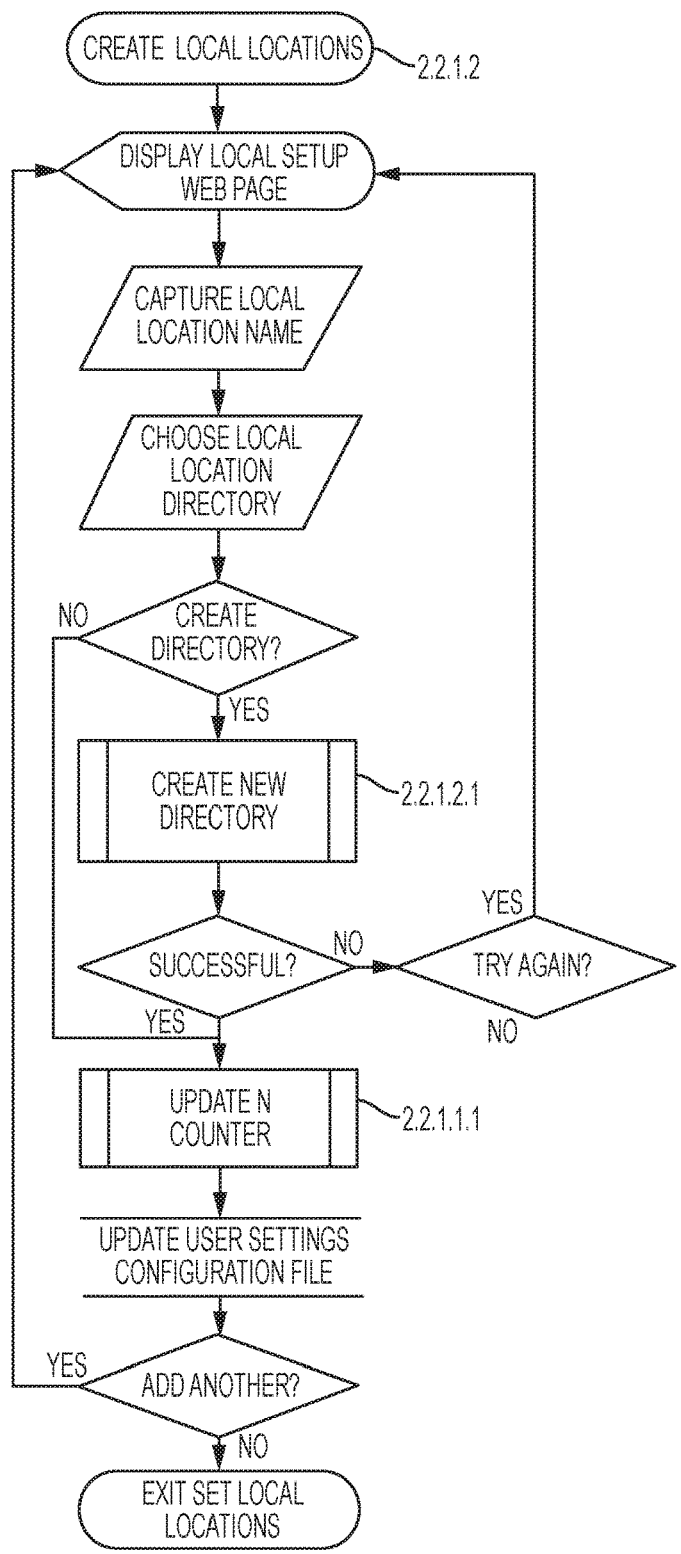
FIG. 8b shows a create local locations process 2.2.1.2 for use in the set storage locations process of FIG. 7.

Add local storage process 5.1.1.1 invokes the same web-based interface process as described in the previous section under process 2.2.1.2 (FIG. 8*b*). The web API and graphics chip display the local storage setup web page. The process captures the following attributes of the new local storage location: the name and the local directory. As needed, the directory may be created and the update N counter, process 2.2.1.1.1 (FIG. 12), is called to perform one of two actions: create a new storage location that increases the physical number of storage locations that data will be stored in, or adding the new storage locations as a data location to an existing storage location. The last step in the process updates the user configuration and optionally allows for further additions.

Figure 9A:
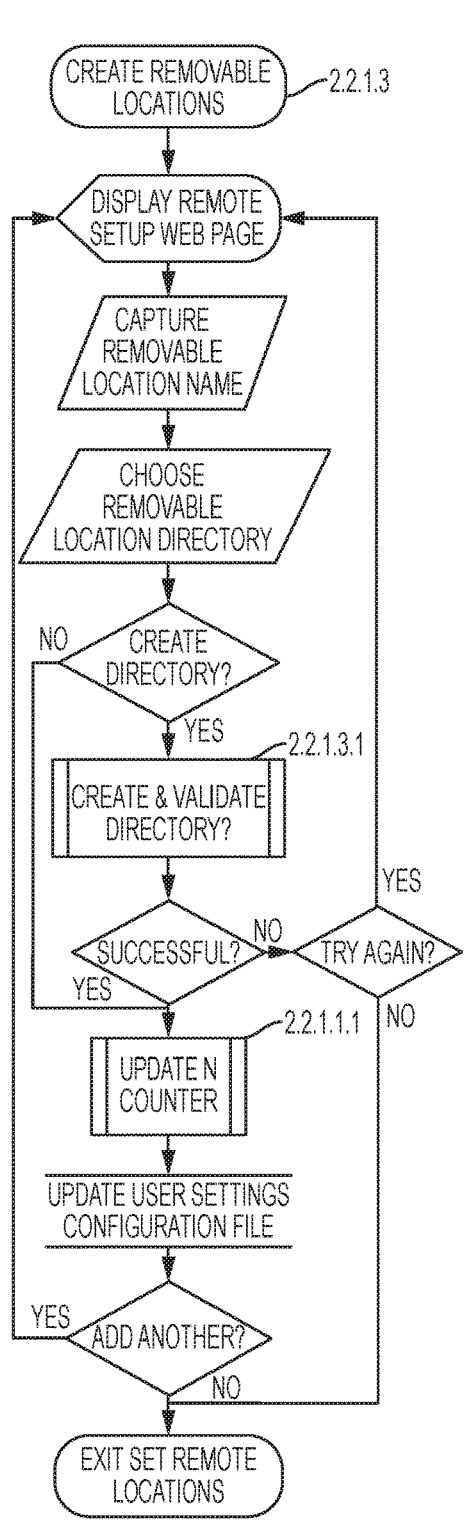
FIG. 9a shows a create removable locations process 2.2.1.3 for use in the set storage locations process of FIG. 7.

Add removable storage process 5.1.1.4 invokes the same web-based interface process as described in the previous section under process 2.2.1.3 (FIG. 9*a*). The web API and graphics chip display the removable storage setup web page. The process captures the following attributes of the new removable storage location: the name and the removable directory. As needed, the directory may be created and the update N counter, process 2.2.1.1.1 (FIG. 12), is called to perform one of two actions: create a new removable location that increases the physical number of storage locations that data will be stored in, or adding the new removable storage locations as a data location to an existing storage location. The last step in the process updates the user configuration and optionally allows for further additions.

Figure 9B:
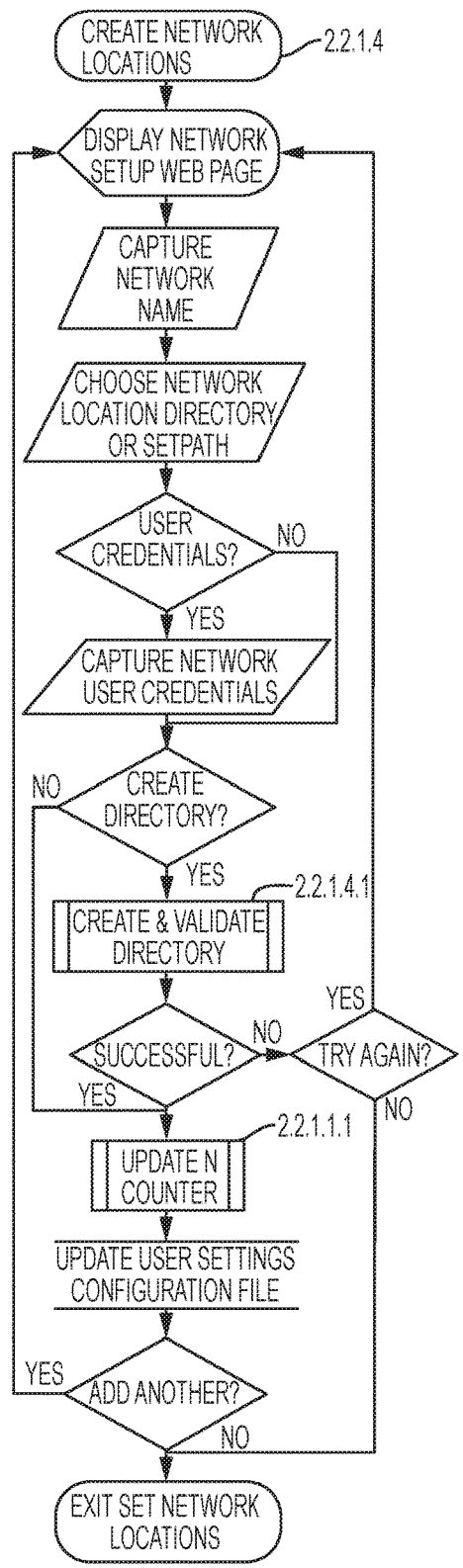
FIG. 9b shows a create network locations process 2.2.1.4 for use in the set storage locations process of FIG. 7.

Add network storage process 5.1.1.3 invokes the same web-based interface process as described in the previous section under process 2.2.1.4 (FIG. 9b). The web API and graphics chip display the network storage setup web page. The process captures the following attributes of the new network storage location: the name, the network directory and credentials needed for access. As needed, the directory may be created and the update N counter, process 2.2.1.1.1 (FIG. 12), is called to perform one of two actions: create a new network location that increases the physical number of storage locations that data will be stored in, or adding the new network storage locations as a data location to an existing storage location. The last step in the process updates the user configuration and optionally allows for further additions.

Add cloud storage process 5.1.1.2 invokes the same web-based interface process as described in the previous section under process 2.2.1.1 (FIG. 8a). The web API and graphics chip display the network storage setup web page. The process captures the following attributes of the new cloud storage location: the name of the storage location, the cloud directory for file storage, cloud URL and credentials needed for access. As needed, the directory may be created and the update N counter, process 2.2.1.1.1 (FIG. 12), is called to perform one of two actions: create a new network location that increases the physical number of storage locations that data will be stored in, or adding the new network storage locations as a data location to an existing storage location. The last step in the process updates the user configuration and optionally allows for further additions.

Figure 36:
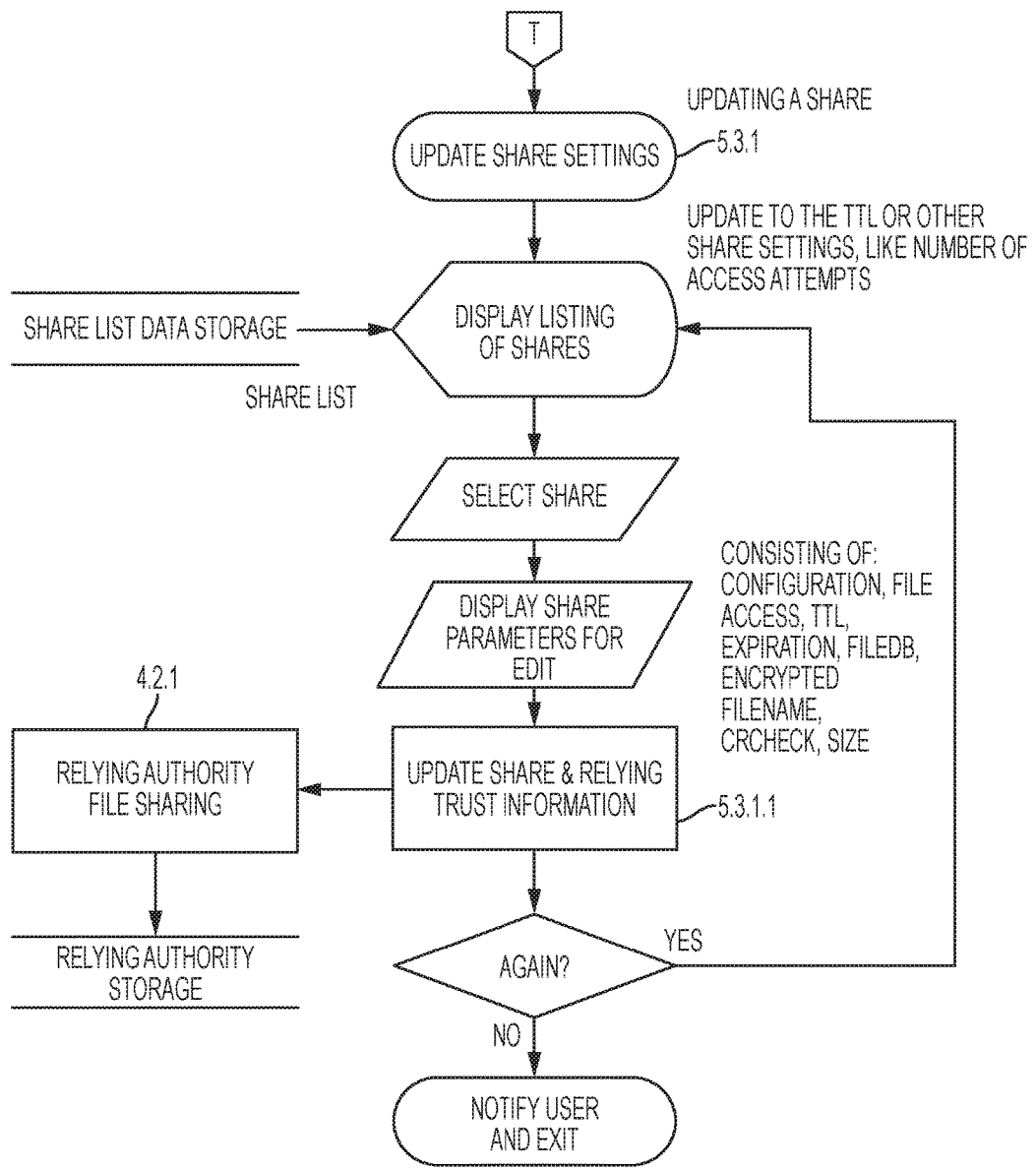
FIG. 36 shows an update share settings process 5.3.1 for use with the manage sharing process of FIG. 29.

Remove Storage process 5.1.2 (FIG. 31) allows the system to remove previously added storage locations. The web API and graphics chip displays a menu of selectable storage locations. Once selected, the storage location is evaluated for removal. If it is the last storage location or one that causes a change from RAID, the system presents a simple Yes/No override option. Yes results in the system continuing to request the option to rebalance. Rebalance allows the system to relocate stored shreds to a new storage location. A successful rebalance, or an override by the user, results in updates of the user configuration file, File DB and any file shares, as shown by process 5.3.1 (FIG. 36). Update N counter, process 2.2.1.1.1 (FIG. 12), updates the system RAID settings.

Manage Storage process 5.1.3 (FIG. 32) enables a user to manage storage locations. The web API and graphics chip display a menu item providing functions including but not limited to the following.

Enable and Disable, process 5.1.3.1, turns the storage on and off, from the application perspective. It updates the configuration file and shared configuration files. On successful completion, the application optionally returns to the manage storage menu, process 5.1.3.

Change Name, process 5.1.3.2, provides the user with the option to rename the storage location. Once entered and validated, the name of the storage location is updated in the configuration file, and optionally returns to the manage storage menu, process 5.1.3.

Change Encryption Scheme, process 5.1.3.3, provides the user with the ability to alter the encryption scheme of the slices of data stored inside the storage location in two ways. First, the user will have the ability to have all future files written to the stored location encrypted with the newly selected encryption methodology. Or optionally, it will change the encryption scheme of all current and future slices. Accomplishing the simple change of encryption types requires an update to the configuration file. To accomplish a change in all file slices currently stored in a storage location, the web API, file handle API, network components and ALU and memory, will read the File DB, returning a file list of all the files that will need encryption changed. Each file will be downloaded, decrypted, encrypted with the new encryption scheme and uploaded. After each file is successfully encrypted and stored, the configuration file is updated to reflect the change in encryption.

Edit Connection Properties, process 5.1.3.4, allows the system to change the connection parameters for each storage location. The web API, network API and graphics chip, displays the relevant UI sections from 2.2.X to present and allow the user to enter new connection parameters for storage locations. Upon successful test, the configuration file and share files are updated with the relying trust.

Add Additional Folders, process 5.1.3.5, allows the system to add folders for each storage location. The web API, network API and graphics chip, displays the relevant UI sections from 2.2.X to present and allow the user to add new folders to storage locations. Upon successful test, the configuration file and share files are updated with the relying trust.

Rebalance Storage, process 5.1.3.6, allows the system to move data shreds from one location to another. The web UI presents the active storage locations. Once the "from storage location" and "to storage location" is selected along with the amount of storage, the process reads the configuration file and File DB for a list of impacted files, shared files and connection parameters. The file shreds are moved and optionally converted to the encryption scheme of the receiving storage location. If not successful, the system presents an option to retry or exit. If successfully moved, the configuration file, File DB and the relying trust are updated.

Remove Storage is another way to invoke process 5.1.2 described above.

Figures 28, 29:
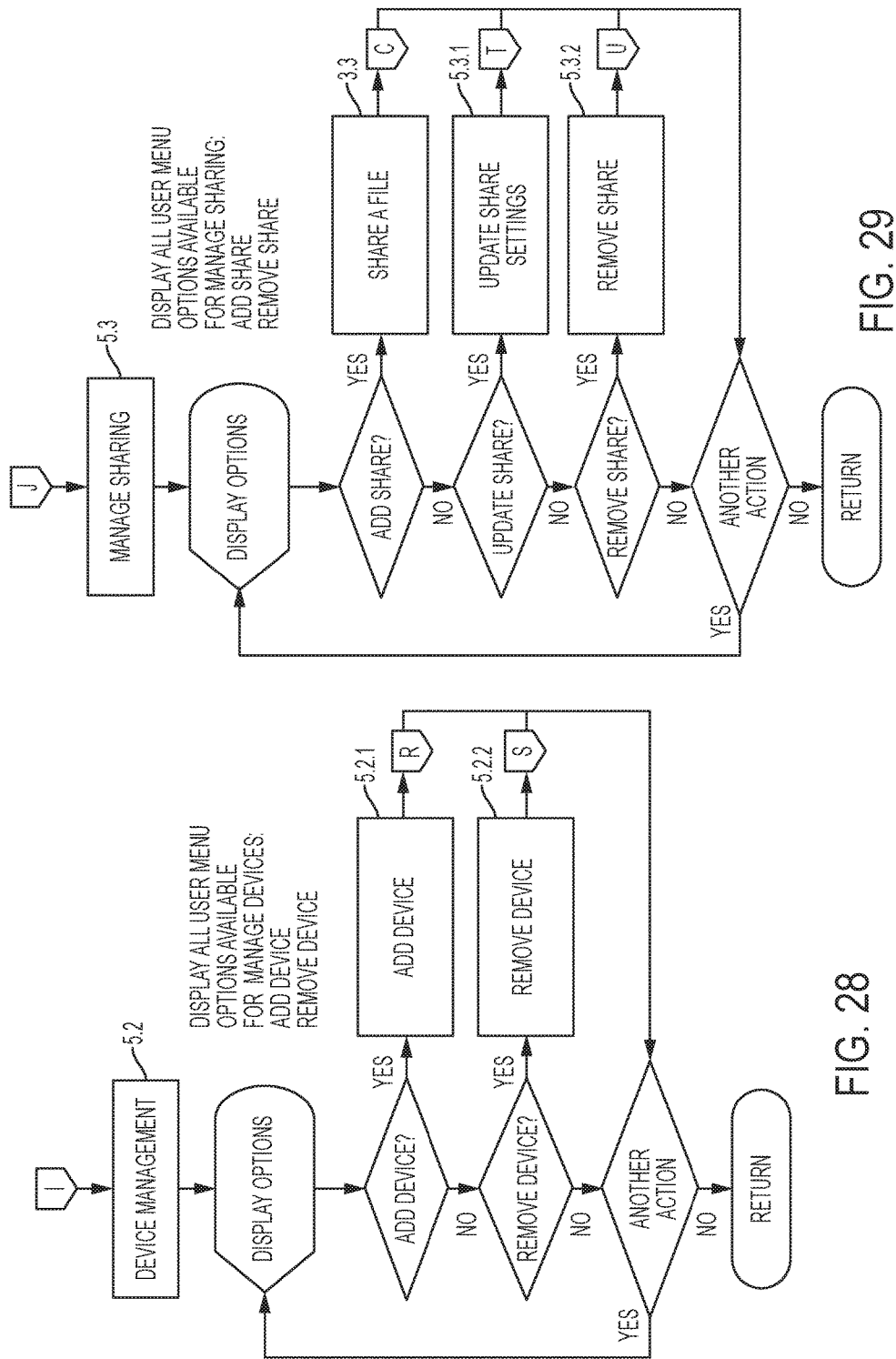

Next, device management, as shown in process 5.2 of FIG. 28, allows the user to add a device and remove a device for access or sharing, license permitting. The web UI, network API, and graphics chip displays a menu selection to add device, process 5.2.1 (FIG. 34), and remove device, process 5.2.2 (FIG. 35).

Figure 34:
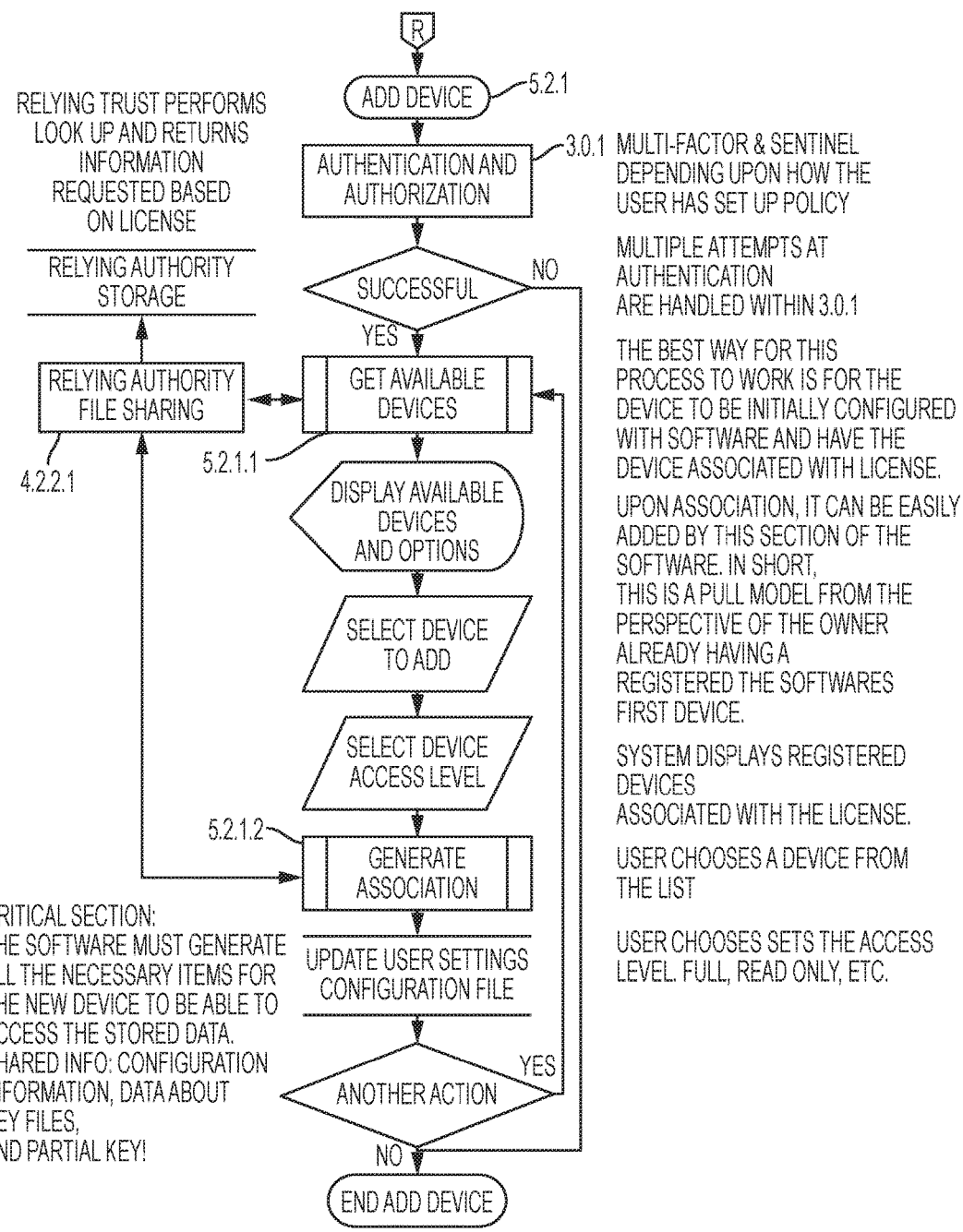
FIG. 34 shows an add device process 5.2.1 for use with the device management process of FIG. 28.

As shown in FIG. 34, process 5.2.1 officially adds the device access. It does this first by authenticating and authorizing the user via process 3.0.1 as discussed in Basic File Operations (FIG. 13a). If not successful, the process exits. If process 3.0.1 is successful, the Network API connects to the relying authority, process 4.2.2.1, to return sharing and licensing information. The information is gathered and the display shows the available devices and options the user may choose. In this case, Add Device tailors the display to indicate if the user has already registered a device based on current licensing. Registration takes place when the software is installed, process 1.3.1, and the licensing information is entered. Because of process 1.3.1, this process of adding the device is a matter of selecting the device and activating it for use. Other steps performed may include but are not limited to setting the access level, and updating the relying trust via process 5.2.1.2, and the configuration file for first access by the new device.

Figure 35:
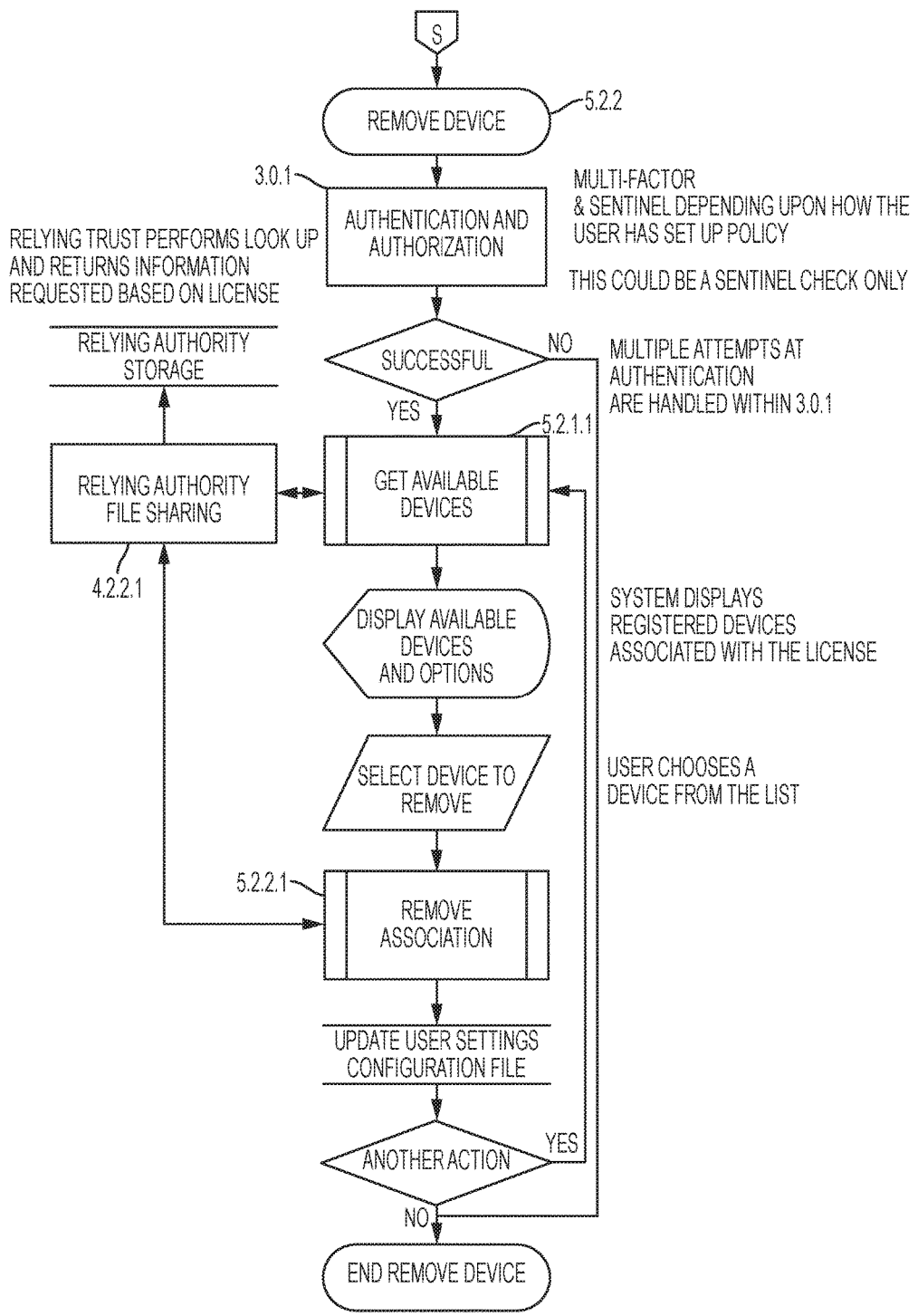
FIG. 35 shows a remove device process 5.2.2 for use with the device management process of FIG. 28.

Likewise, as shown in FIG. 35, process 5.2.2 effectively revokes access by a device and in the process frees a license for future use. Following similar procedures as 5.2.1, the web API, network API and graphics chip authenticate and authorize the user as defined in process 3.0.1. The software then connects to the relying trust, process 5.2.1.1 and 4.2.2.1, returning the available devices and displaying the list available for removal. If unable to connect, the last known configuration is used. Once a device is selected, the device license association is removed via 5.2.2.1 followed by an update of the configuration file.

Manage sharing, as shown in process 5.3 of FIG. 29, allows functions including but not limited to setting share information for a file and device, update share settings and removing a share. Share a file is already described in process 3.3. Updating consists of changing share settings for files already shared. Removing a share is the act of removing the share from the system, which terminates access to the share by the device sharing the file.

Process 5.3.1 (FIG. 36) updates a file share. The web API, network API and graphics chip reads a list of shares from the share data storage and presents the share list to the user for selection. Once a share is selected, process 5.3.2.1 connects to the relying trust and displays the list of parameters available for edit. Parameters include but are not limited to file access (read, write, no access), time to live, access attempts, and expiration date.

Figure 37:
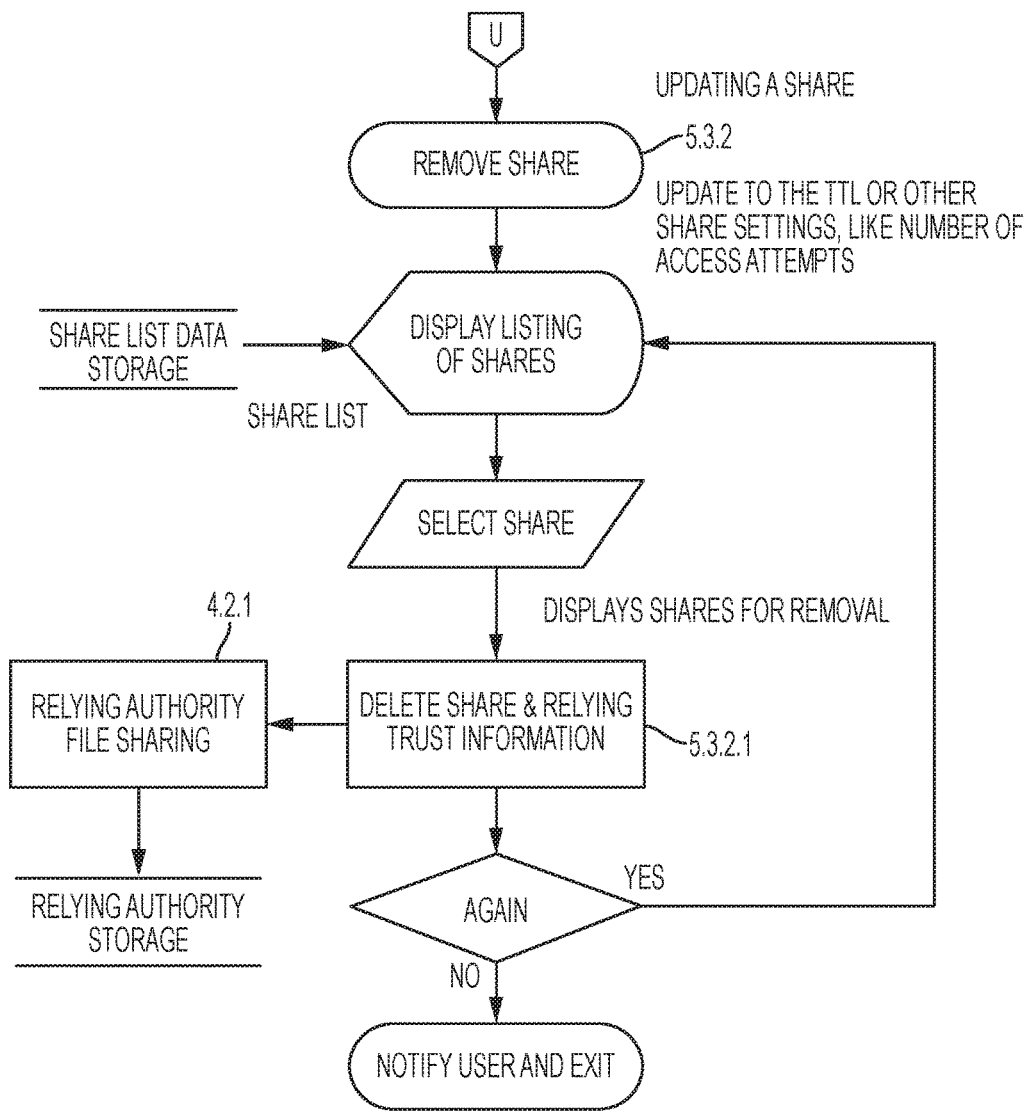
FIG. 37 shows a remove share process 5.3.2 for use with the manage sharing process of FIG. 29.

Process 5.3.2 (FIG. 37) removes a file share. The web API, network API and graphics chip read a list of shares from the share data storage and present the share list to the user for selection. Once a share is selected, process 5.3.2.1 connects to the relying trust and removes the share information.

Figure 22:
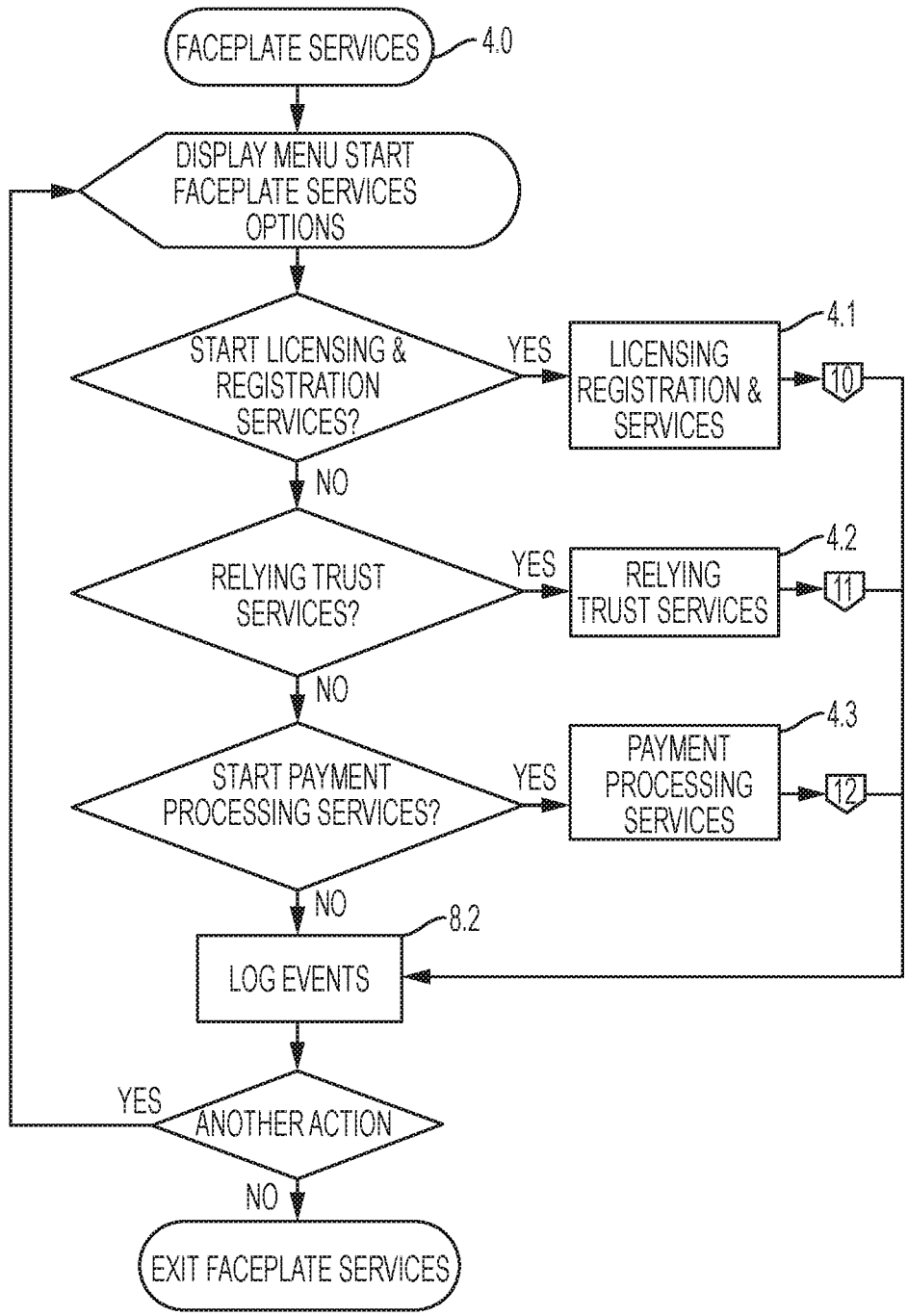
FIG. 22 shows various CRC services 4.0 that may be engaged by a user in accordance with aspects of the invention.
Figure 25A:
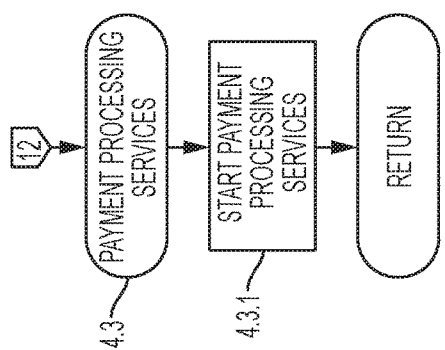
FIG. 25a shows payment processing services 4.3 for use with the CRC services of FIG. 22.

With reference to FIG. 22, relying trust services provide services including but not limited to licensing registration (process 4.1 of FIG. 23a), relying trust services (process 4.2 of FIG. 24a), and payment processing services (process 4.3 of FIG. 25a).

Figure 23D:
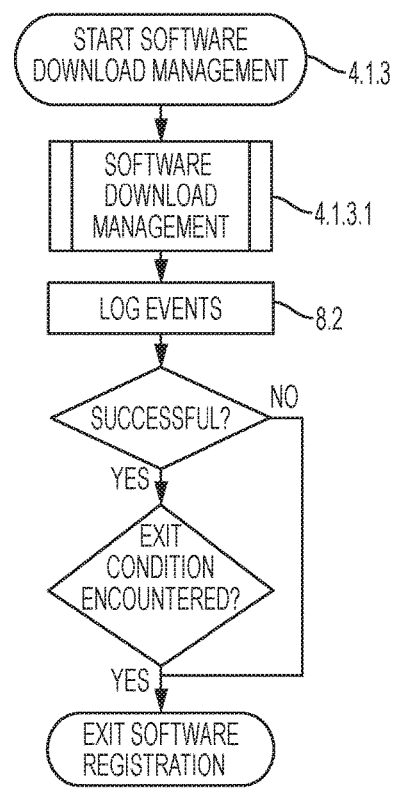

Licensing registration services (process 4.1) provide services including but not limited to the following. License generation, process 4.1.1 (FIG. 23b), is a 24×7 service created utilizing specific OS services and memory that generates license numbers and logs events. The installed application connects to the service to obtain license numbers by request. Software registration, process 4.1.2 (FIG. 23c), takes the generated license and user information and associates the information together. This process sends a validation e-mail, using well-known protocols, for user confirmation via process 1.3.3 previously described above. As a service, all events are logged via process 8.2 using well known logging techniques. Software download, process 4.1.3 (FIG. 23d), is a service that allows for the users to connect and download the software for installation. The OS, network API and system memory instantiates a service that allows outside services and users to connect via well-known protocols to download the latest software via the Internet. As a service, all events are logged via process 8.2 using well known logging techniques.

Relying trust services (process 4.2 of FIG. 24a) provide the services necessary for facilitating file sharing and assisting with device management. The OS, network API, well-known web protocols and system memory instantiate the service, allowing the user applications to connect over the web. Process 4.2.1 supports the request for file sharing from one user to another. Information flowing between the process includes but is not limited to configuration files and file sharing info. Process 4.2.2 supports the addition of devices by a user. Any new device desired to be added will contact this service and make the request to be added. The request is sent and verified, at which point the device is added as an authorized device. This process is detailed in process 5.2.1 described above.

Payment processing services (process 4.3 of FIG. 25a) provide the necessary services for handling payment requests for software purchases. The system using network API's, memory, and well known web and network protocols will submit credit authorization requests to third party vendors for payment. This service, 4.3.1.2, supports process 1.3.2 previously described above. The return from this is the confirmation of payment.

Figure 38:
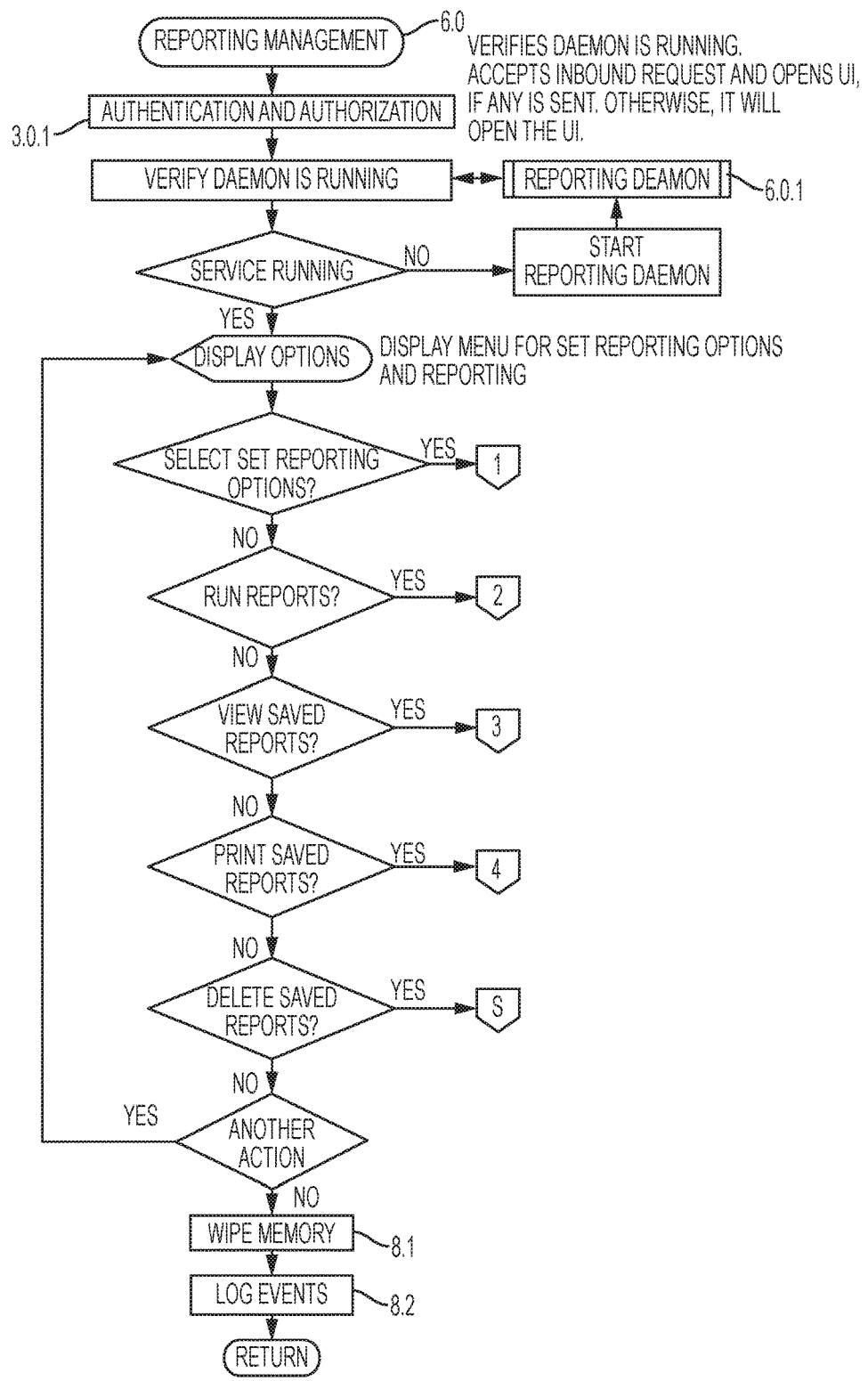
FIG. 38 shows a reporting management process 6.0 in accordance with certain aspects of the invention.
Figure 39:
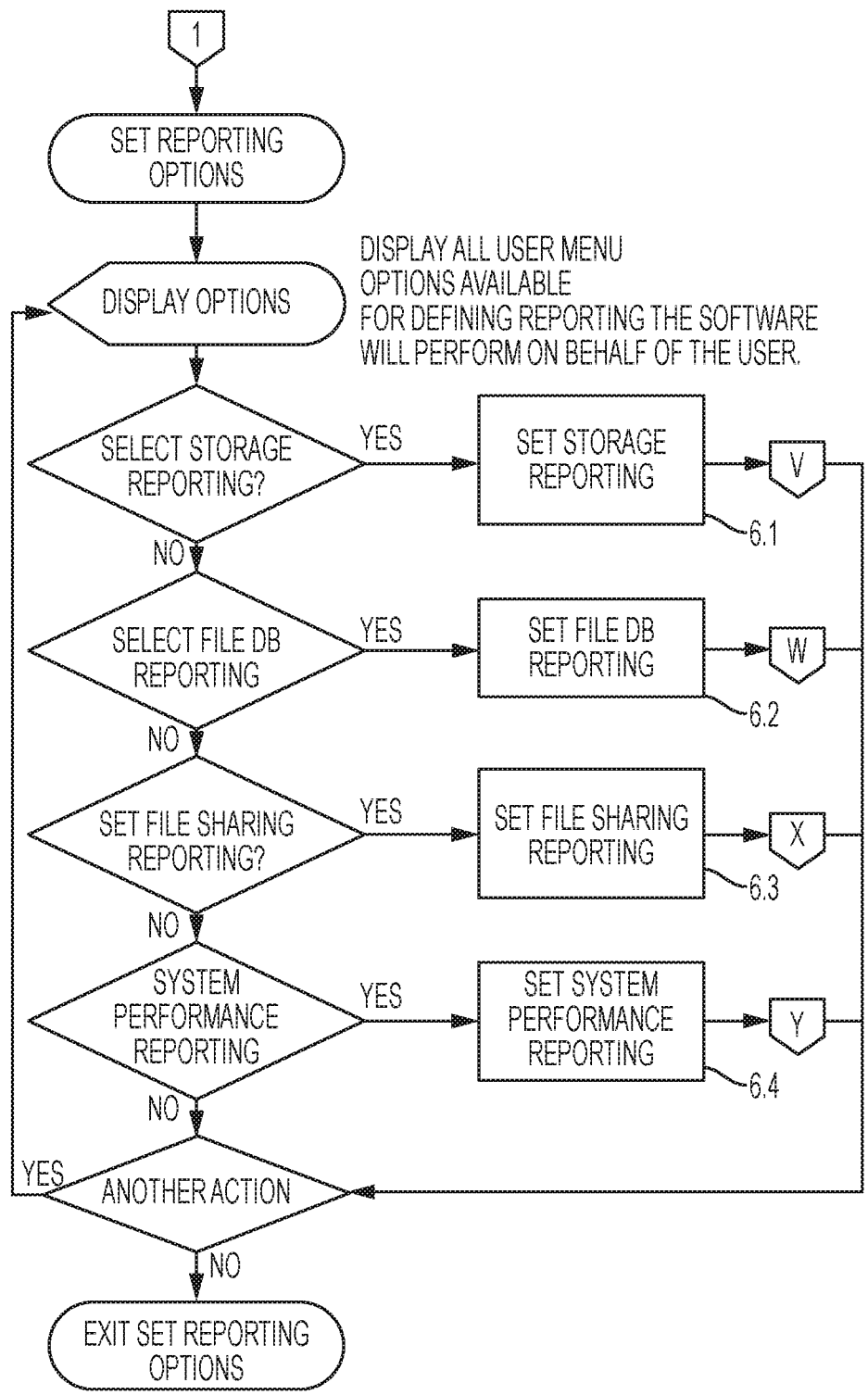
FIG. 39 shows a set reporting options process for use with the reporting management process of FIG. 38.

As shown in FIGS. 38 and 39, reporting management is preferably web-based and delivered with the installation. It comprises a reporting listener to accept and process reports. Also, it includes an integrated web UI allowing the user to navigate, schedule and request reports. Using well established web protocols, network API, web API, system memory and the graphics chip, process 6.0 (FIG. 38) begins by checking the authentication and authorization of the user in process 3.0.1. If authorized, it ensures the reporting listener is running and then displays a selection menu, providing functions including but not limited to: setting reporting options, running reports, view saved reports, print saved reports, and delete saved reports.

Set reporting options, once set, are reported on each time a given report is executed and consists of the following available reports.

Figure 40A:
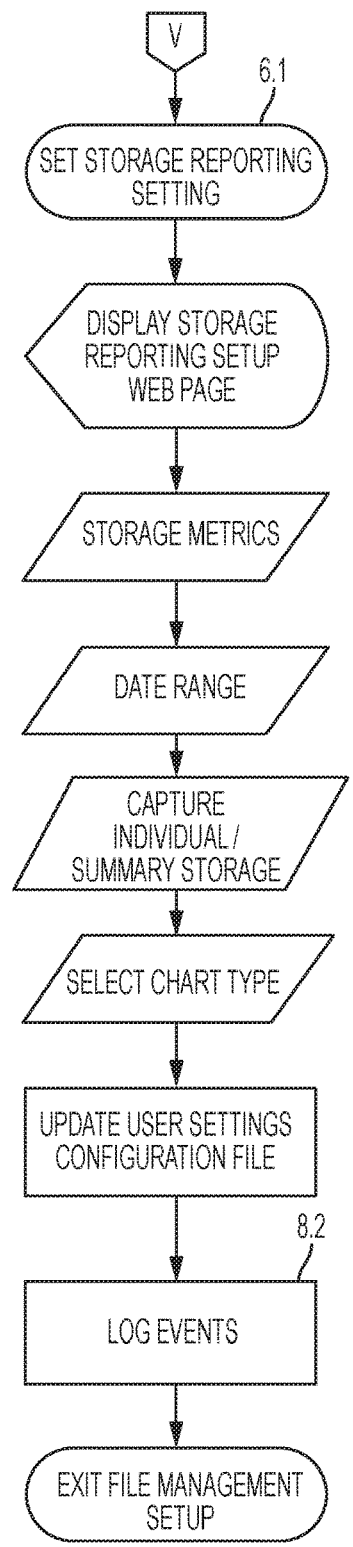
FIG. 40a shows a set storage report settings process 6.1 for use with the set reporting options process of FIG. 39.

Set Storage Reporting (process 6.1 of FIG. 40a)—the settings available to be set by the user include but are not limited to, storage locations in use, overall amount of storage consumed, overall amount of storage available free space, average storage used per storage location, and percentage of storage utilized by storage location.

Figure 40B:
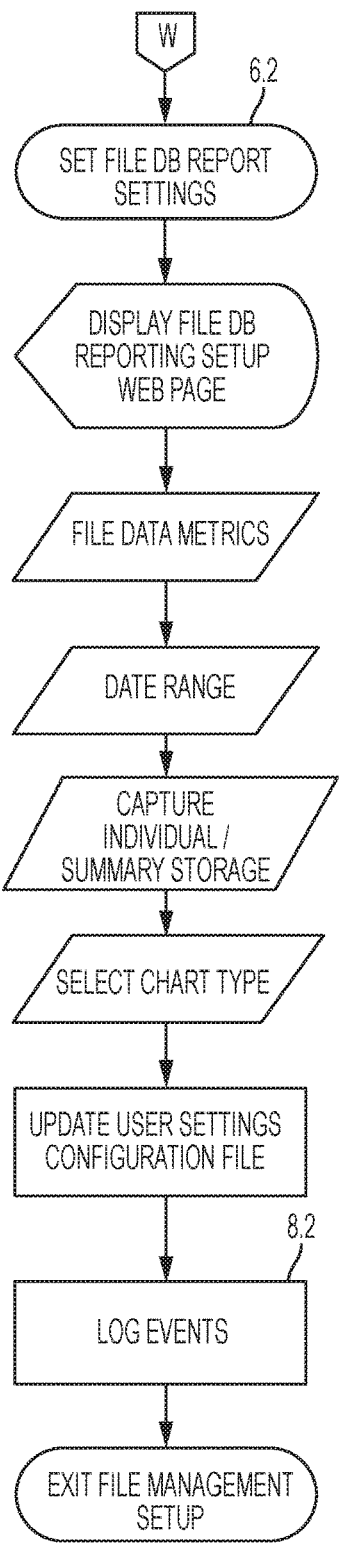
FIG. 40b shows a set File DB report settings process 6.2 for use with the set reporting options process of FIG. 39.

Set File DB reporting (process 6.2 of FIG. 40b)—the settings available to be set by the user include but are not limited to, total number of files stored, average file size, and average number of files per storage location.

Figure 40C:
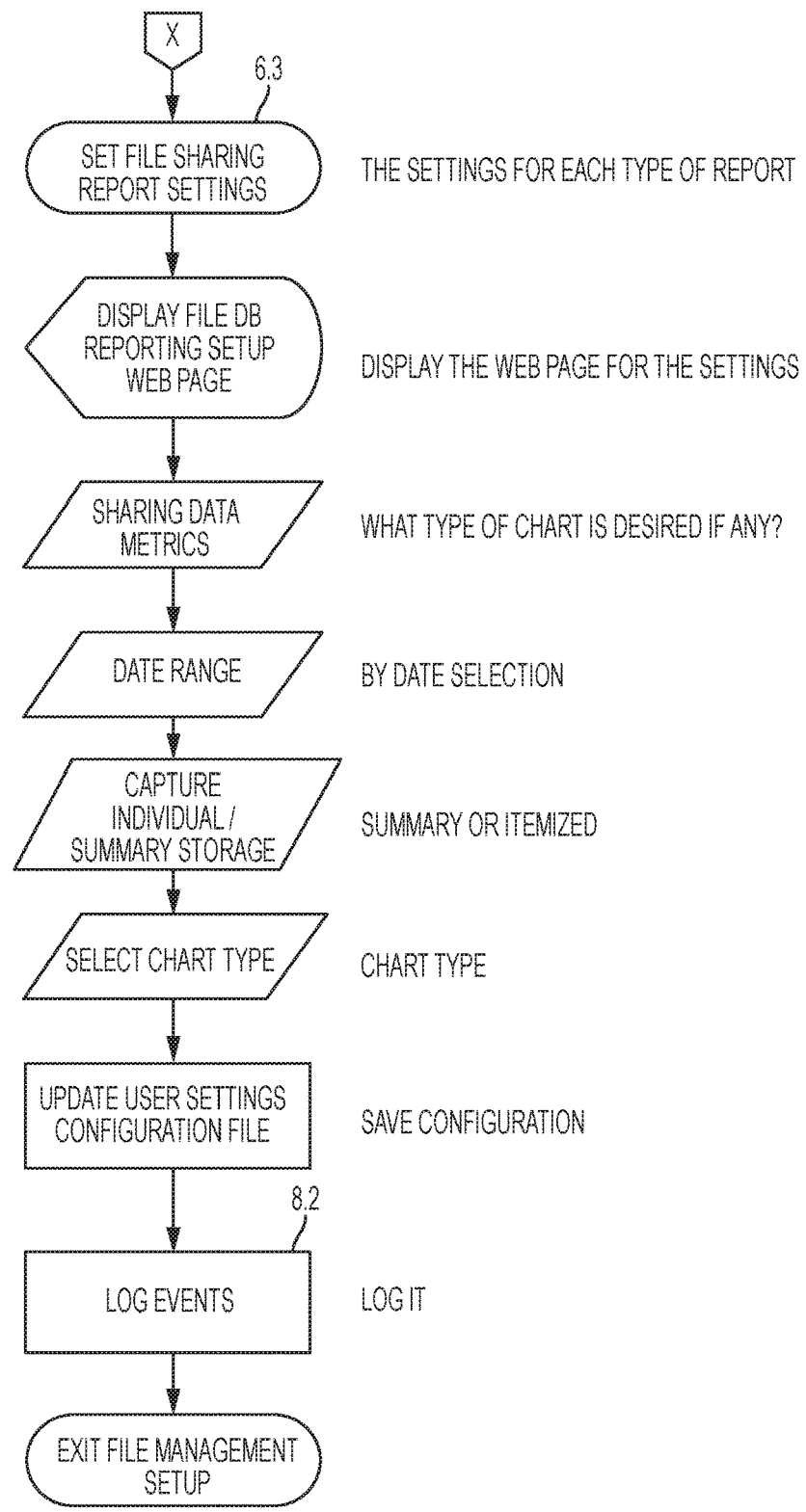
FIG. 40c shows a set file sharing report settings process 6.3 for use with the set reporting options process of FIG. 39.

Set file sharing reporting (process 6.3 of FIG. 40c)—the settings available to be set by the user include but are not limited to, total number of shared files outstanding, shared files by user, number of shared files no longer shared, and detailed list of files shared.

Figure 41A:
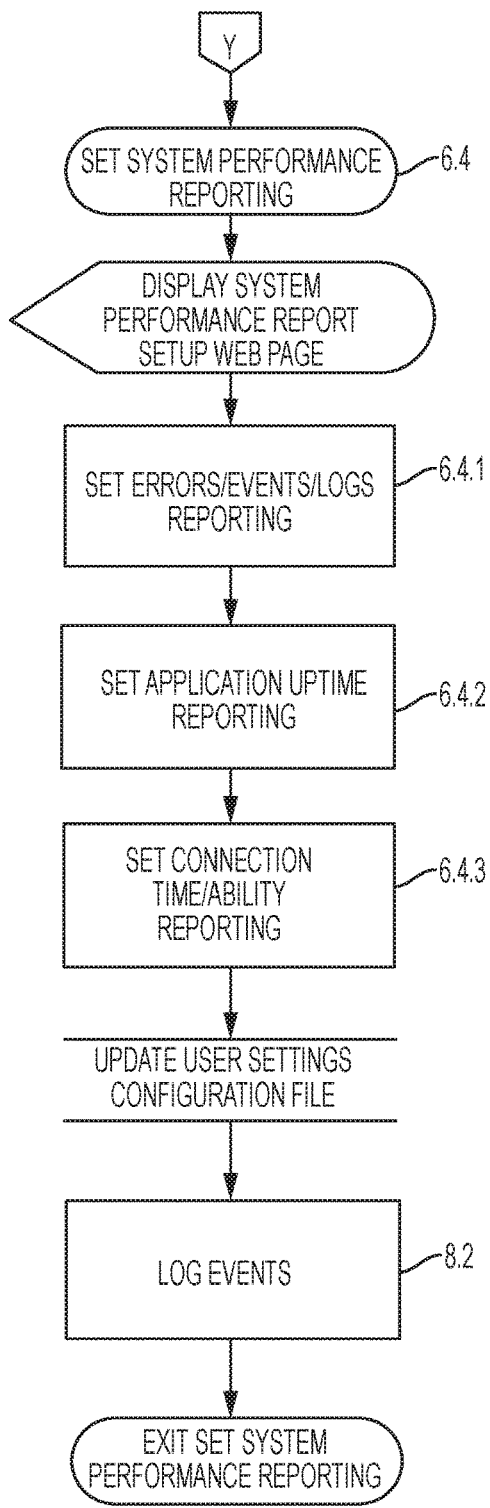
FIG. 41a shows a set system performance reporting process 6.4 for use with the set reporting options process of FIG. 39.
Figure 41B:
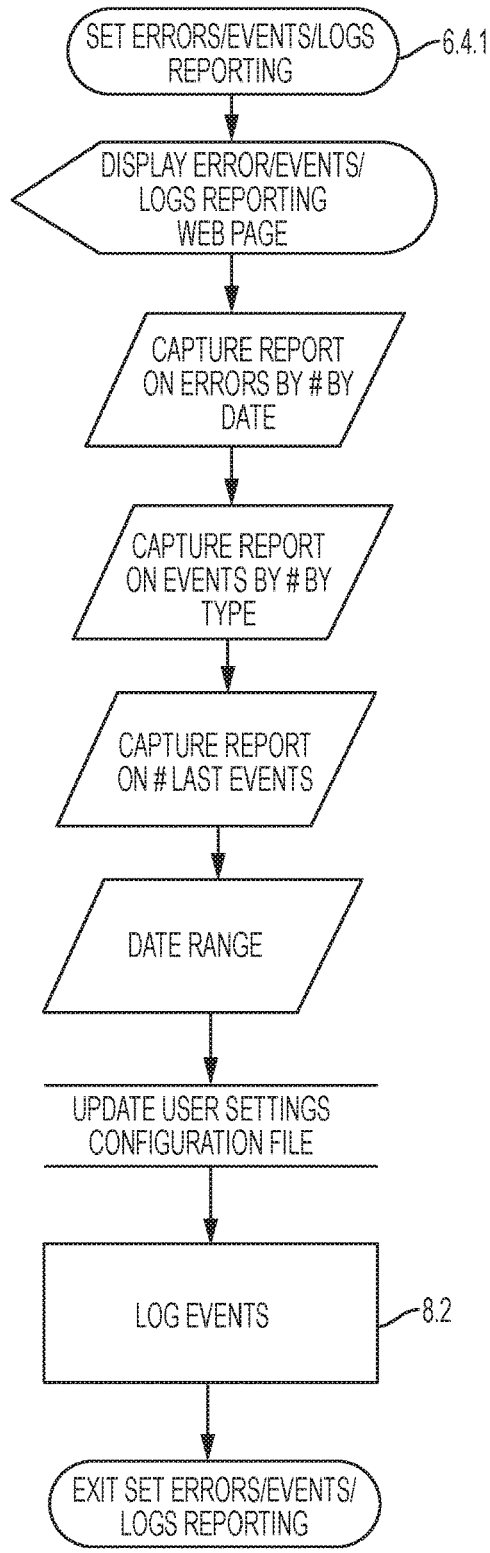
Figures 41C, 41D:
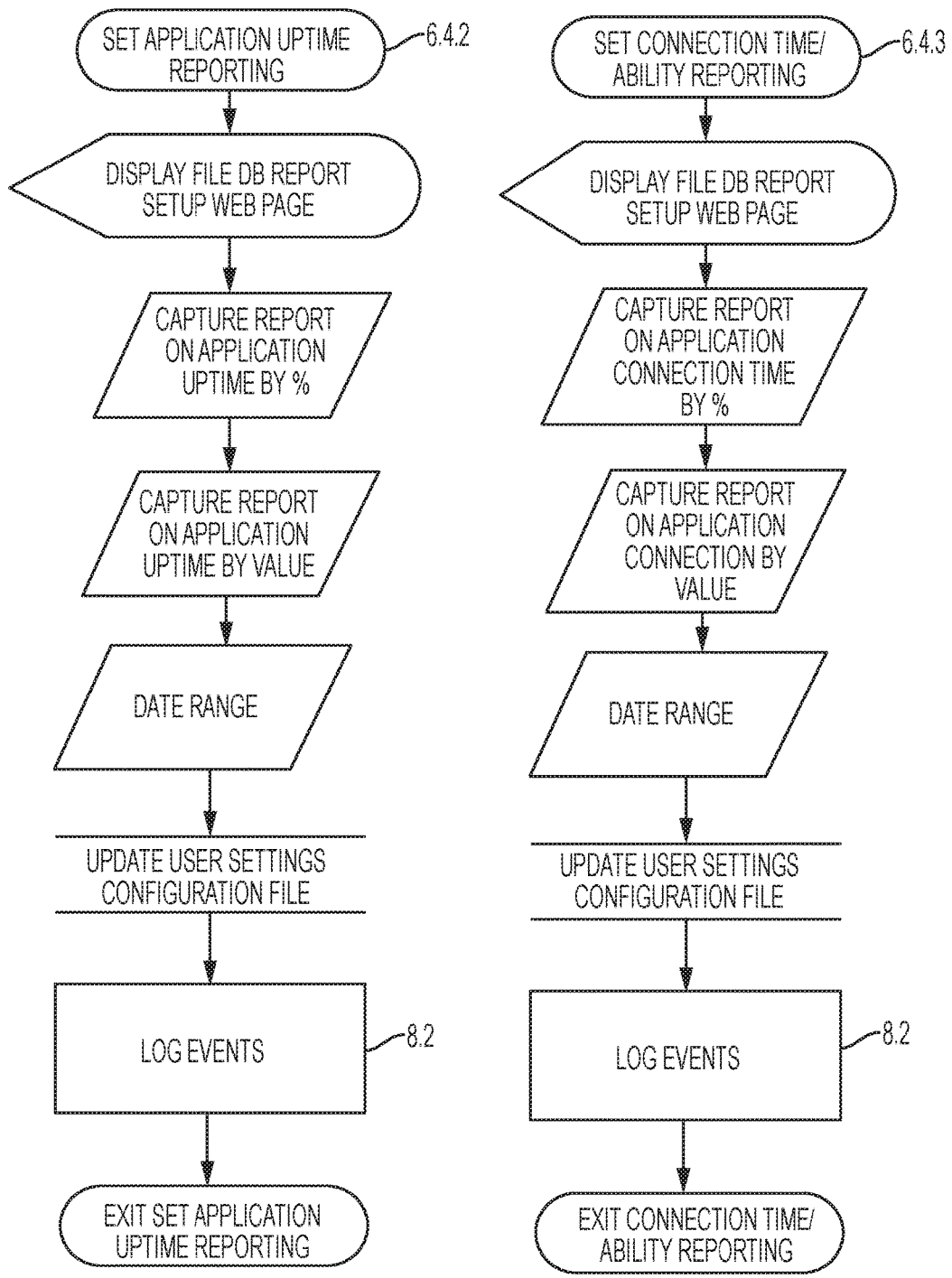

Set system performance reporting (process 6.4 of FIG. 41a)—provides menu items including preferably at least the following reports on system performance. Process 6.4.1 (FIG. 41b) reports on event/errors/log reporting. The settings available to be set by the user include but are not limited to, errors by date, events by type, and a detailed list of the most recent events/errors/logs by date. Process 6.4.2 (FIG. 41c) reports on application uptime. The settings available to be set by the user include but are not limited to, application uptime by value or percentage, and averaged over a given range. Process 6.4.3 (FIG. 41d) reports on connection time/ability. The settings available to be set by the user include but are not limited to, connection time by value or percentage, and averaged over a date range.

Figure 42A:
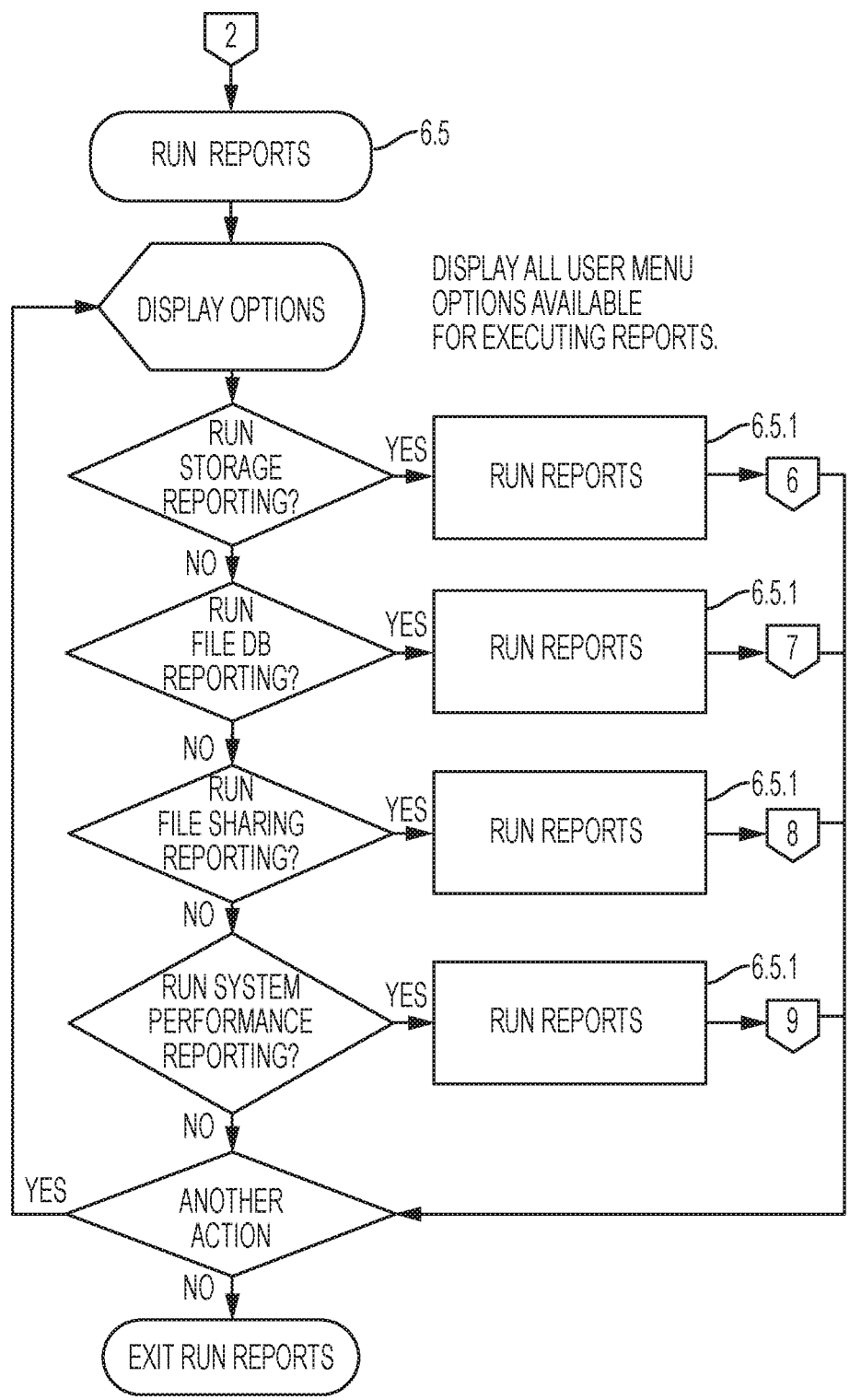
FIG. 42a shows a run reports process 6.5 for use with the reporting management processes of FIG. 38.

The run reports process 6.5 of FIG. 42a presents a menu selection of reports to run. If the report is already configured, the report is immediately executed if no changes are desired. If not, the menu items, process 6.4.X, for the given report are displayed for selection and executed. The system, utilizing well known web protocols, through the web API, network API, graphics chip, and memory passes into process 6.5.1 (FIG. 42*b*) the report requested. The menu items displayed may include run storage reporting, run File DB reporting, run file sharing reporting, and run system performance reporting. Once executed, the user configuration is read, which pulls in the storage locations, connection parameters and historical reports. If changes are desired, the options for the report type are displayed for edit. The edited changes are captured as the reporting system connects to the storage locations for the report. Process 6.5.1.1 starts the report generation process, which gathers the archive data from the reporting daemon, 6.0.1, and pulls new data from the data storage locations and file db. This data is then combined and reported on in the user specified settings for the given report. By way of non-limiting example, the system may execute a preconfigured file share report on the outstanding shared files grouped by user without graphs over the last month.

Figure 42B:
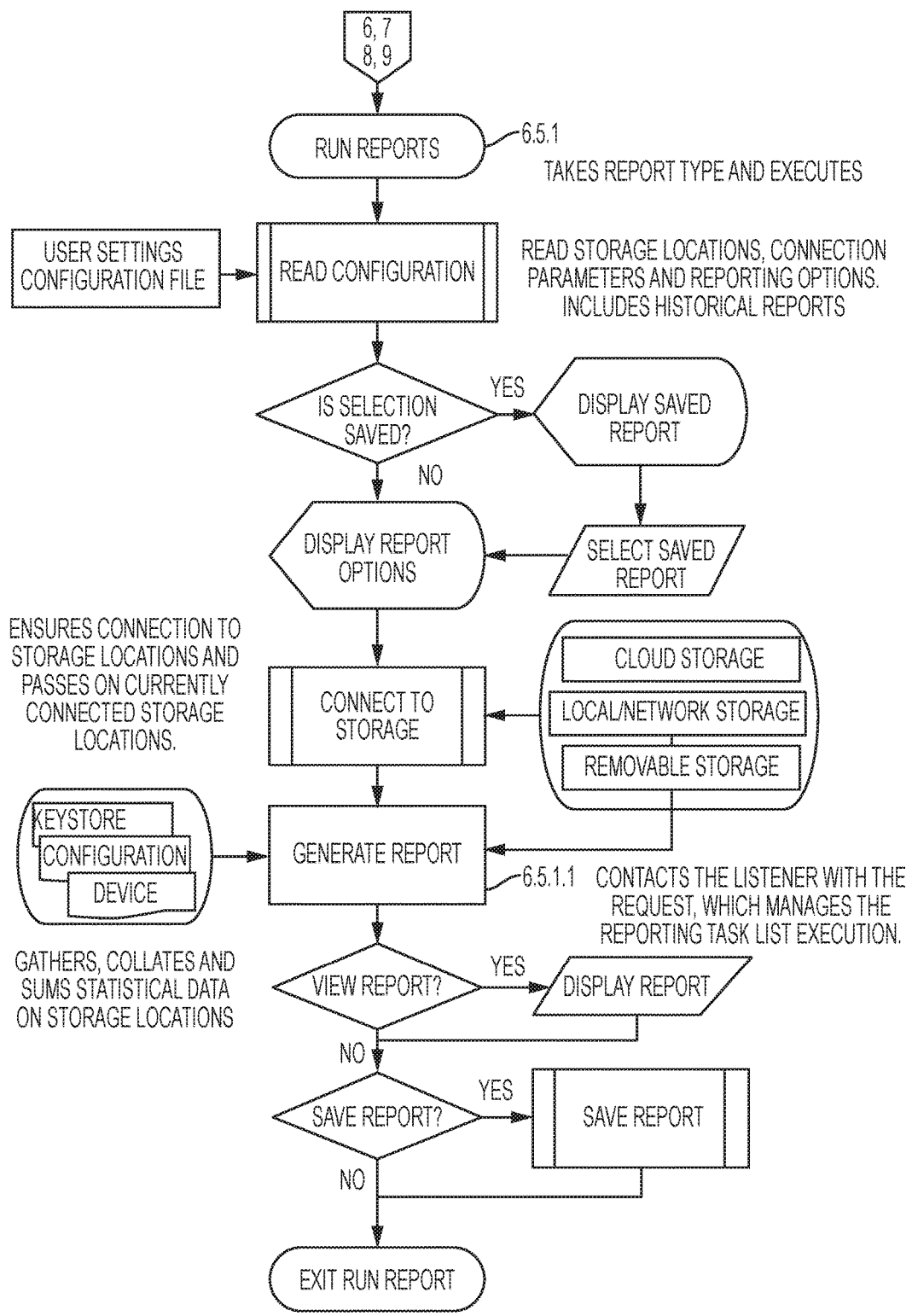
Figure 42C:
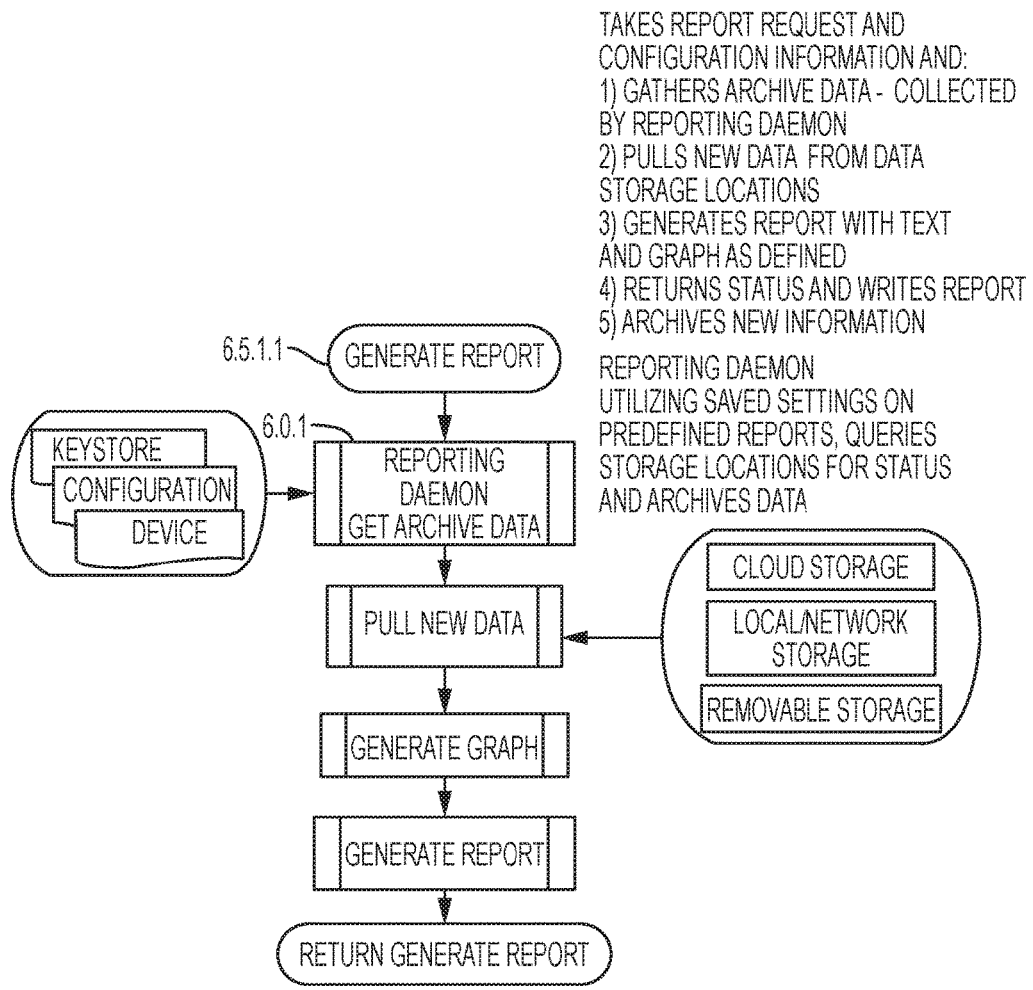
FIG. 42c shows a generate report process 6.5.1.1 for use with the run reports process of FIG. 42b.
Figure 42D:
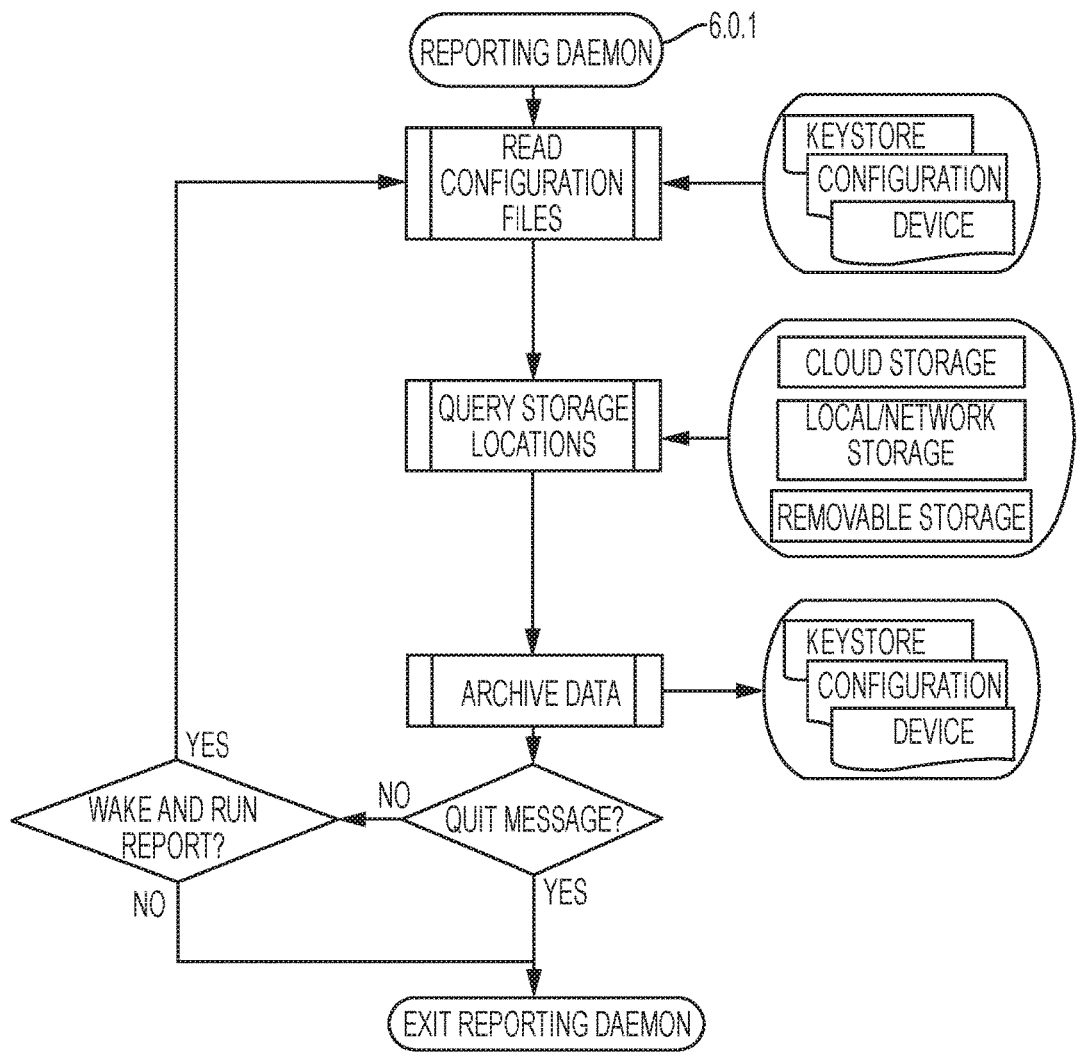
FIG. 42d shows a reporting daemon process 6.0.1 for use with the generate report process of FIG. 42c.

The user, interacting with the web UI main menu, selects reporting, which enters into process 6.0 (FIG. 38). The software, using user credentials or a stored sentinel, validates the user through the authentication and authorization process 3.0.1 (FIG. 14). Once complete, the software, using well-known networking protocols, validates that the reporting daemon, process 6.0.1, is running Once validated, the reporting sub-menu is displayed consisting of: set reporting options, run reports, view saved reports, print saved reports, and delete saved reports. In this example, the user selects run reports, which displays the sub-menu consisting of: run storage reporting, run File DB reporting, run file sharing reporting, and run system performance reporting. Upon selection of run file sharing reporting, the type is passed into run reports, process 6.5.1 (FIG. 42*b*). Run reports reads the user configuration file, and the saved reports for shares are displayed. The user will select from the list the Share Report to execute. Connection to the data storage is verified using well known network protocols, and the report executed via process 6.5.1.1 Generate Report. The process returns archived data, pulls new data, and generates a graph and report as specified by the user settings.

The various embodiments have been described herein in an illustrative manner, and it is to be understood that the terminology used is intended to be in the nature of words of description rather than of limitation. Any embodiment herein disclosed may include one or more aspects of the other embodiments. The exemplary embodiments were described to explain some of the principles of the present invention so that others skilled in the art may practice the invention. Obviously, many modifications and variations of the invention are possible in light of the above teachings. The present invention may be practiced otherwise than as specifically described within the scope of the appended claims and their legal equivalents.

What is claimed is:

1. A computer-implemented method of providing file level security, the method comprising:
    providing a network-based file storage and retrieval system comprising a server computer having at least one processor and memory storing instructions;
    providing at said server computer access to a plurality of data storage locations in data communication with said server computer, said data storage locations comprising at least two of cloud data storage, local data storage, network data storage, and removable data storage;
    receiving at said server computer as input a user instruction designating a number of file shreds into which a data file is to be shredded, wherein said number of file shreds is selected by said user;
    receiving at said server computer as input a user instruction designating a plurality of said data storage locations to which said designated number of shreds are to be copied, wherein said data storage locations are selected by said user;
    receiving at said server computer as input a user selection of a target upload file;
    causing said processor to shred said target upload file into said user designated number of file shreds;
    causing said processor to add non-operational bits of data to each said file shred;
    causing said processor to encrypt each said file shred; and
    causing said processor to copy said encrypted file shreds from said server computer to said user designated plurality of said data storage locations, and to maintain said encrypted file shreds in said user designated plurality of said data storage locations until receipt at said server computer as input a user instruction to download said encrypted file shreds to reform said data file.

2. The method of claim 1, further comprising:
    receiving at said server computer as input a user selection of a target download file that is stored as encrypted file shreds in said plurality of said data storage locations;
    receiving at said server computer said encrypted file shreds of said target download file;
    causing said processor to decrypt said encrypted file shreds of said target download file;
    causing said processor to remove non-operational bits of data from each file shred of said target download file;
    causing said processor to reform said target download file from said file shreds of said target download file; and
    causing said processor to present said reformed target download file to a user.

3. The method of claim 2, further comprising the step of causing said processor to identify a collection of data storage locations among said plurality of data storage locations that together contain sufficient file shreds that may be combined to form a functional reconstructed file, and causing said processor to establish data communication with each of said data storage locations within said collection.

4. The method of claim 2, wherein said step of causing said processor to reform said target download file further comprises appending each decrypted shred of said target download file to previously downloaded shreds of said target download file.

5. The method of claim 4, further comprising the step of causing said processor to place a reformed target download file into a working directory accessible by said user.

6. The method of claim 2, further comprising:
    receiving at said server computer as input a user selection of a target share file and a target share device;
    causing said processor to download said target share file into a working directory accessible by said user;
    causing said processor to re-encrypt said target share file with a shared key associated with said target share device; and
    uploading from said server computer said target share file.

7. The method of claim 6, further comprising:
    causing said processor to confirm that said user selection of a target share device identifies a device that is contained on a list of approved devices maintained by said system.

8. The method of claim 6, further comprising:
    causing said processor to confirm that said user selection of a target share file identifies a file that has previously been uploaded.

9. The method of claim 6, further comprising:
prior to receiving a user selection of a target share file and a target share device, causing said processor to present a list of devices available for secure file sharing to said user.

10. The method of claim 6, further comprising:
causing said server computer to update a relying party trust with information relating to said uploaded target share file.

11. The method of claim 1, wherein said step of causing said processor to encrypt each file shred further comprises applying an encryption process to each said file shred that is particularly selected on the basis of the data storage location to which said file shred is to be uploaded.

12. The method of claim 1, wherein said step of causing said processor to copy said encrypted file shreds further comprises:
causing said processor to establish data communication with said user designated plurality of data storage locations; and
causing said processor to copy at least some of said encrypted file shreds among said user designated plurality of data storage locations.

13. The method of claim 12, wherein said step of causing said processor to copy at least some of said encrypted file shreds further comprises copying at least as many encrypted file shreds as are necessary to enable subsequent file reconstruction to form a usable file.

14. The method of claim 12, wherein said step of causing said processor to copy at least some of said encrypted file shreds further comprises storing said at least some of said encrypted file shreds in more than one independent data storage location.

15. The method of claim 1, further comprising:
causing said processor to establish data communication with a relying party trust;
receiving at said server computer from a user data store keystore and configuration file shreds;
causing said processor to decrypt and recombine said keystore and configuration file shreds; and
causing said processor to generate a display of (i) file and share information available in user-defined locations, and (ii) available application functions.

16. The method of claim 15, wherein said available application functions further comprise uploading a file, downloading a file, sharing a file, opening a file, and deleting a file.

* * * * *